(12) United States Patent
Matsumoto et al.

(10) Patent No.: US 10,294,315 B2
(45) Date of Patent: May 21, 2019

(54) POLYACRYLIC ACID (SALT)-BASED WATER ABSORBENT RESIN AND METHOD FOR PRODUCING SAME

(75) Inventors: Satoshi Matsumoto, Hyogo (JP); Kunihiko Ishizaki, Hyogo (JP); Kazushi Torii, Hyogo (JP); Shin-ichi Fujino, Hyogo (JP); Kazuhiko Sakamoto, Hyogo (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 943 days.

(21) Appl. No.: 13/499,037

(22) PCT Filed: Sep. 30, 2010

(86) PCT No.: PCT/JP2010/067158
§ 371 (c)(1),
(2), (4) Date: Mar. 29, 2012

(87) PCT Pub. No.: WO2011/040575
PCT Pub. Date: Apr. 7, 2011

(65) Prior Publication Data
US 2012/0189861 A1    Jul. 26, 2012

(30) Foreign Application Priority Data

Sep. 30, 2009 (JP) .................... 2009-227861
Jul. 13, 2010 (JP) .................... 2010-158981
Aug. 18, 2010 (JP) .................... 2010-183011

(51) Int. Cl.
*C08F 20/00* (2006.01)
*C08F 20/06* (2006.01)
*C08J 3/24* (2006.01)

(52) U.S. Cl.
CPC ............. *C08F 20/06* (2013.01); *C08J 3/245* (2013.01); *B01J 2219/00006* (2013.01); *C08J 2333/02* (2013.01); *Y10T 428/31859* (2015.04)

(58) Field of Classification Search
CPC ............................. C08F 220/00; A61L 15/60
See application file for complete search history.

(56) References Cited

U.S. PATENT DOCUMENTS 4,093,776 A    6/1978    Aoki et al.
4,199,410 A    4/1980    Ohrui et al.
(Continued)

FOREIGN PATENT DOCUMENTS

CA    2319786    8/1999
EP    0349240    1/1990
(Continued)

OTHER PUBLICATIONS

Translation of JP 7242709 (1995).*
(Continued)

*Primary Examiner* — Hoa (Holly) Le
(74) *Attorney, Agent, or Firm* — Dickinson Wright PLLC

(57) ABSTRACT

A method for producing a polyacrylic acid (salt)-based water absorbent resin, sequentially including the steps of: storing or producing acrylic acid; mixing acrylic acid containing a polymerization inhibitor with water, a crosslinking agent, and optionally, a basic composition, and/or neutralizing them, to prepare an aqueous monomer solution; polymerizing the aqueous monomer solution; drying an obtained water-containing gel-like crosslinked polymer; and optionally carrying out surface crosslinking, wherein the acrylic acid containing the polymerization inhibitor has a water content of not higher than 1,000 ppm (by mass; the same
(Continued)

applies hereinafter), and/or the aqueous monomer solution has a formic acid content of 1 to 700 ppm, relative to the monomer.

18 Claims, 2 Drawing Sheets

(56) References Cited

U.S. PATENT DOCUMENTS

| | | | |
|---|---|---|---|
| 4,286,082 A | 8/1981 | Tsubakimoto et al. | |
| 4,367,323 A | 1/1983 | Kitamura et al. | |
| 4,446,261 A | 5/1984 | Yamasaki et al. | |
| 4,507,436 A | 3/1985 | Axelrod et al. | |
| 4,507,438 A | 3/1985 | Obayashi et al. | |
| 4,625,001 A | 11/1986 | Tsubakimoto et al. | |
| 4,683,274 A | 7/1987 | Nakamura et al. | |
| 4,693,713 A | 9/1987 | Chmelir et al. | |
| 4,698,404 A | 10/1987 | Cramm et al. | |
| 4,873,299 A * | 10/1989 | Nowakowsky | A61L 15/60 526/73 |
| 4,893,999 A | 1/1990 | Chmelir et al. | |
| 4,950,692 A | 8/1990 | Lewis et al. | |
| 4,970,267 A | 11/1990 | Bailey et al. | |
| 4,973,632 A | 11/1990 | Nagasuna et al. | |
| 4,985,518 A | 1/1991 | Alexander et al. | |
| 5,051,259 A | 9/1991 | Olsen et al. | |
| 5,064,582 A | 11/1991 | Sutton et al. | |
| 5,124,416 A | 6/1992 | Haruna et al. | |
| 5,145,906 A | 9/1992 | Chambers et al. | |
| 5,210,298 A * | 5/1993 | Shimomura et al. | 562/598 |
| 5,244,735 A | 9/1993 | Kimura et al. | |
| 5,250,640 A | 10/1993 | Irie et al. | |
| 5,264,495 A | 11/1993 | Irie et al. | |
| 5,281,340 A | 1/1994 | Sato et al. | |
| 5,338,810 A * | 8/1994 | Shimomura et al. | 526/75 |
| 5,342,899 A | 8/1994 | Graham et al. | |
| 5,350,799 A | 9/1994 | Woodrum et al. | |
| 5,380,808 A | 1/1995 | Sumiya et al. | |
| 5,385,983 A | 1/1995 | Graham | |
| 5,409,771 A | 4/1995 | Dahmen et al. | |
| 5,455,284 A | 10/1995 | Dahmen et al. | |
| 5,462,972 A | 10/1995 | Smith et al. | |
| 5,478,879 A | 12/1995 | Kajikawa et al. | |
| 5,527,869 A * | 6/1996 | Fuchigami et al. | 526/329.7 |
| 5,574,120 A | 11/1996 | Heidel et al. | |
| 5,597,873 A | 1/1997 | Chambers et al. | |
| 5,610,220 A | 3/1997 | Klimmek et al. | |
| 5,633,316 A | 5/1997 | Gartner et al. | |
| 5,669,894 A | 9/1997 | Goldman et al. | |
| 5,674,633 A | 10/1997 | Saunders et al. | |
| 6,071,976 A | 6/2000 | Dairoku et al. | |
| 6,107,358 A | 8/2000 | Harada et al. | |
| 6,228,930 B1 | 5/2001 | Dairoku et al. | |
| 6,241,928 B1 | 6/2001 | Hatsuda et al. | |
| 6,254,990 B1 | 7/2001 | Ishizaki et al. | |
| 6,335,406 B1 | 1/2002 | Nagasuna et al. | |
| 6,359,049 B1 | 3/2002 | Carrico et al. | |
| 6,388,000 B1 | 5/2002 | Irie et al. | |
| 6,444,744 B1 | 9/2002 | Fujimaru et al. | |
| 6,458,921 B1 | 10/2002 | Dairoku et al. | |
| 6,472,478 B1 | 10/2002 | Funk et al. | |
| 6,503,979 B1 | 1/2003 | Funk et al. | |
| 6,605,673 B1 | 8/2003 | Mertens et al. | |
| 6,620,889 B1 | 9/2003 | Mertens et al. | |
| 6,710,141 B1 | 3/2004 | Heide et al. | |
| 6,987,151 B2 | 1/2006 | Gartner et al. | |
| 6,998,447 B2 | 2/2006 | Irie et al. | |
| 7,078,458 B2 | 7/2006 | Irie et al. | |
| 7,157,141 B2 | 1/2007 | Inger et al. | |
| 7,307,132 B2 | 12/2007 | Nestler et al. | |
| 7,473,739 B2 | 1/2009 | Dairoku et al. | |
| 7,528,291 B2 | 5/2009 | Herfert et al. | |
| 7,582,705 B2 | 9/2009 | Dairoku et al. | |
| 7,629,428 B2 | 12/2009 | Daniel et al. | |
| 7,683,220 B2 | 3/2010 | Matsunami et al. | |
| 7,935,774 B2 | 5/2011 | Ikeuchi et al. | |
| 7,939,597 B2 | 5/2011 | Bub et al. | |
| 8,071,202 B2 | 12/2011 | Furno et al. | |
| 8,552,134 B2 * | 10/2013 | Fujimaru | C08F 220/06 526/318 |
| 2001/0025122 A1 | 9/2001 | Hirao et al. | |
| 2002/0161132 A1 | 10/2002 | Irie et al. | |
| 2003/0153887 A1 | 8/2003 | Nawata et al. | |
| 2004/0110913 A1 | 6/2004 | Kanto et al. | |
| 2005/0013865 A1 | 1/2005 | Nestler et al. | |
| 2005/0070671 A1 | 3/2005 | Torii et al. | |
| 2005/0085604 A1 | 4/2005 | Handa et al. | |
| 2005/0113542 A1 | 5/2005 | Irie et al. | |
| 2005/0113605 A1 * | 5/2005 | Benderly et al. | 562/600 |
| 2005/0209352 A1 | 9/2005 | Dairoku et al. | |
| 2005/0209411 A1 | 9/2005 | Nestler et al. | |
| 2005/0215734 A1 | 9/2005 | Dairoku et al. | |
| 2005/0288182 A1 | 12/2005 | Torii et al. | |
| 2006/0036043 A1 | 2/2006 | Nestler et al. | |
| 2006/0073969 A1 | 4/2006 | Torii et al. | |
| 2006/0074160 A1 | 4/2006 | Handa et al. | |
| 2006/0089512 A1 | 4/2006 | Bennett et al. | |
| 2006/0089611 A1 | 4/2006 | Herfert et al. | |
| 2006/0153854 A1 | 7/2006 | Bhat et al. | |
| 2007/0106013 A1 | 5/2007 | Adachi et al. | |
| 2007/0129570 A1 | 6/2007 | Shima et al. | |
| 2007/0178786 A1 | 8/2007 | Nawata et al. | |
| 2007/0197749 A1 | 8/2007 | Matsuda et al. | |
| 2007/0225422 A1 | 9/2007 | Sakamoto et al. | |
| 2007/0293632 A1 | 12/2007 | Riegel et al. | |
| 2008/0004408 A1 | 1/2008 | Stueven et al. | |
| 2008/0016152 A1 | 1/2008 | Morisada et al. | |
| 2008/0075937 A1 | 3/2008 | Wada et al. | |
| 2008/0091048 A1 | 4/2008 | Nordhoff et al. | |
| 2008/0114140 A1 | 5/2008 | Daniel et al. | |
| 2008/0119626 A1 | 5/2008 | Fujimaru et al. | |
| 2008/0161512 A1 | 7/2008 | Kawano et al. | |
| 2008/0194863 A1 | 8/2008 | Weismantel et al. | |
| 2008/0221277 A1 | 9/2008 | Walden et al. | |
| 2008/0242816 A1 | 10/2008 | Weismantel et al. | |
| 2008/0269372 A1 | 10/2008 | Dairoku et al. | |
| 2008/0280128 A1 | 11/2008 | Furno et al. | |
| 2008/0306209 A1 | 12/2008 | Stueven et al. | |
| 2009/0023006 A1 | 1/2009 | Bub et al. | |
| 2009/0036855 A1 | 2/2009 | Wada et al. | |
| 2009/0068440 A1 | 3/2009 | Bub et al. | |
| 2009/0105389 A1 | 4/2009 | Walden et al. | |
| 2009/0118549 A1 | 5/2009 | Matsunami et al. | |
| 2009/0134357 A1 | 5/2009 | Bub et al. | |
| 2009/0136736 A1 | 5/2009 | Nawata et al. | |
| 2009/0182294 A1 | 7/2009 | Ikeuchi et al. | |
| 2009/0202805 A1 | 8/2009 | Furno et al. | |
| 2009/0221746 A1 | 9/2009 | De Marco et al. | |
| 2009/0227741 A1 | 9/2009 | Walden et al. | |
| 2009/0239995 A1 | 9/2009 | Bub et al. | |
| 2009/0270538 A1 | 10/2009 | Ikeuchi et al. | |
| 2009/0275470 A1 | 11/2009 | Nagasawa et al. | |
| 2009/0314258 A1 | 12/2009 | Azou | |
| 2010/0009846 A1 | 1/2010 | Ikeuchi et al. | |
| 2010/0041550 A1 | 2/2010 | Riegel et al. | |
| 2010/0273647 A1 | 10/2010 | Nawata et al. | |
| 2010/0286287 A1 | 11/2010 | Walden | |
| 2011/0042612 A1 | 2/2011 | Riegel et al. | |
| 2011/0046279 A9 | 2/2011 | Ikeuchi et al. | |
| 2011/0105791 A1 | 5/2011 | Kuppinger et al. | |
| 2011/0144294 A1 | 6/2011 | Bub et al. | |
| 2012/0059138 A1 | 3/2012 | De Marco et al. | |

FOREIGN PATENT DOCUMENTS

| | | |
|---|---|---|
| EP | 0450923 | 10/1991 |
| EP | 0450924 | 10/1991 |
| EP | 0574260 | 12/1993 |
| EP | 0605150 | 7/1994 |
| EP | 0668080 | 8/1995 |
| EP | 0811636 | 12/1997 |
| EP | 0812873 | 12/1997 |
| EP | 0922717 | 6/1999 |

(56) References Cited

FOREIGN PATENT DOCUMENTS

| | | |
|---|---|---|
| EP | 0940148 | 9/1999 |
| EP | 0955086 | 11/1999 |
| EP | 1178059 | 2/2002 |
| EP | 1645596 | 4/2006 |
| EP | 1711541 | 10/2006 |
| EP | 1799721 | 6/2007 |
| EP | 1814913 | 8/2007 |
| JP | 3-031306 | 2/1991 |
| JP | 3-31306 | 2/1991 |
| JP | 4-331205 | 11/1992 |
| JP | 6-056931 | 3/1994 |
| JP | 6-211934 | 8/1994 |
| JP | 7-224304 | 8/1995 |
| JP | 7-242709 | 9/1995 |
| JP | 2624089 | 6/1997 |
| JP | 2000-327926 | 11/2000 |
| JP | 3107873 | 11/2000 |
| JP | 2002-179617 | 6/2002 |
| JP | 2003-052742 | 2/2003 |
| JP | 2005-186016 | 7/2005 |
| JP | 2006-219661 | 8/2006 |
| JP | 2006-225456 | 8/2006 |
| JP | 2008-537553 | 9/2008 |
| WO | WO 96/15165 | 5/1996 |
| WO | 99/42494 | 8/1999 |
| WO | 99/42496 | 8/1999 |
| WO | 99/43720 | 9/1999 |
| WO | 02/085959 | 10/2002 |
| WO | 2003/051940 | 6/2003 |
| WO | 2003/053482 | 7/2003 |
| WO | 2003/059961 | 7/2003 |
| WO | 2003/095510 | 11/2003 |
| WO | 2004/052819 | 6/2004 |
| WO | 2004/052949 | 6/2004 |
| WO | 2004/69293 | 8/2004 |
| WO | 2004/69915 | 8/2004 |
| WO | 2005/016393 | 2/2005 |
| WO | 2005/075070 | 8/2005 |
| WO | 2006/08024 | 1/2006 |
| WO | 2006/008905 | 1/2006 |
| WO | 2006/052641 | 5/2006 |
| WO | 2006/087084 | 8/2006 |
| WO | 2006/088115 | 8/2006 |
| WO | 2006/092271 | 9/2006 |
| WO | 2006/092272 | 9/2006 |
| WO | 2006/109882 | 10/2006 |
| WO | 2006/136336 | 12/2006 |
| WO | 2007/28747 | 3/2007 |
| WO | 2007/072969 | 6/2007 |
| WO | 2007/109128 | 9/2007 |
| WO | 2007/119528 | 10/2007 |
| WO | 2007/121037 | 10/2007 |
| WO | 2007/121937 | 11/2007 |
| WO | 2007/132926 | 11/2007 |
| WO | 2008/09842 | 1/2008 |
| WO | 2008/09843 | 1/2008 |
| WO | 2008/023039 | 2/2008 |
| WO | 2008/023040 | 2/2008 |
| WO | 2008/026772 | 3/2008 |
| WO | WO 2008/027488 A2 | 3/2008 |
| WO | 2008/090961 | 7/2008 |
| WO | 2008/092842 | 8/2008 |
| WO | 2008/092843 | 8/2008 |
| WO | 2008/096713 | 8/2008 |
| WO | 2008/114847 | 9/2008 |
| WO | 2009/005114 | 1/2009 |
| WO | 2009/011717 | 1/2009 |
| WO | 2009/016055 | 2/2009 |
| WO | 2009/060062 | 5/2009 |

OTHER PUBLICATIONS

Chinese Office Action, dated Oct. 10, 2013, in corresponding CN Appln. No. 201080044201.1, and its English translation.

International Search Report for PCT/JP2010/067158, dated Nov. 9, 2010.

Japanese Notice of Reasons for Rejection, dated Aug. 5, 2014, in corresponding JP Appln. No. 2011-534336, and its English translation.

Chinese Office Action, dated Aug. 14, 2014, in corresponding CN Appln. No. 201080044201.1, and its English translation.

Chinese Office Action, dated Apr. 3, 2015, in corresponding Chinese Application No. 201080044201.1, and its English translation.

Frank, Marcus, Superabsorbents (vol. 35), Ullmann's Encyclopedia of Industrial Chemistry, 2012, Wiley-VCH Verlag GmbH & Co. KGaA, Weinheim, pp. 213-232.

Brief Communication dated Jan. 9, 2018, regarding related EP Patent No. 2484702 B1, informing that a letter from the Opponent was submitted Dec. 27, 2017.

Interlocutory Decision in Opposition Proceedings dated May 3, 2018, which issued in corresponding European Patent No. 2484702.

Sammons to Attend Oral Proceedings Pursuant to Rule 115(1) EPC, Dated Mar. 27, 2017.

Communication dated Sep. 5, 2018, which issued in the corresponding EP Patent Application No. 10820690.5 informing that the grounds of Appeal were filed on Aug. 31, 2018, including English translation.

Notice of Opposition dated Sep. 2, 2016, Pat. No. EP 2 484 702 B1, "Polyacrylic Acid Salt-Based Water Absorbent Resin and Method Producing Same," incl. Eng. Translation.

Nölte, Joachim: ICP Emissionsspektrometrie für Praktiker (Grundlagen, Methodenentwicklung, Anwendungsbeispiele (ICP Emission Spectrometry for Practitioners—Principles, Method Development, Application Examples), Wiley-VCH Verlag GmbH, Weinheim 2002, p. 200 ff. with Eng. Translation.

Bruno Lange/Zdeněk V. Vejdělek, Photometrische Analyse (Photometric Analysis), VCH Verlagsgesellschaft GmbH, Weinheim 1987, p. 95 ff. with Eng. Translation.

Joachim Weiβ, Ionenchromotographie (Ion Chromatography), Wiley-VCH Verlag GmbH, Weinheim, Germany, 2001, p. 322 ff. with Eng. Translation.

Dimerization in Acrylic Acid—Formation and Effect, BASF Corporation, 1992.

Communication of a Notice of Opposition, dated Sep. 9, 2016, issued in counterpart Application No. 10820690.5, 6 pages.

* cited by examiner

POLYACRYLIC ACID (SALT)-BASED WATER ABSORBENT RESIN AND METHOD FOR PRODUCING SAME

TECHNICAL FIELD

The present invention relates to a method for producing a polyacrylic acid (salt)-based water absorbent resin. More particularly, the present invention relates to a polyacrylic acid (salt)-based water absorbent resin for absorbers used in disposable diapers, sanitary napkins, and the like, and to a method for producing the same. The present invention also relates to a polyacrylic acid (salt)-based water absorbent resin having excellent anti-yellowing performance, having no odor, and exhibiting excellent absorption capability, and to a method for producing the same.

BACKGROUND ART

In recent years, water absorbent resins having high water-absorption performance have been developed, and have been often used mainly for disposable commodities including absorbent articles, such as disposable diapers and sanitary napkins, water retention agents for agriculture and horticulture, industrial water stop agents, and the like. For such water absorbent resins, many monomers and hydrophilic polymers have been proposed as raw materials, and in particular, polyacrylic acid (salt)-based water absorbent resins using acrylic acid and/or salts thereof as monomers have been most widely used for industrial purposes because of their high water-absorption performance. In the case of such polyacrylic acid (salt)-based water absorbent resins, acrylic acid is neutralized before or after polymerization to produce polyacrylic acid salts. Such neutralization and polymerization are disclosed in Patent Documents 1 to 4. In addition, such acrylic acid has been known to contain acrylic acid dimer (Non-patent Literature Document 1).

As water-absorption properties desired for such water absorbent resins as described above, many properties (parameters) have been known, such as centrifuge retention capacity, absorbency against pressure, water-absorption rate, liquid permeability without load, liquid permeability with load, impact resistance, urine resistance, flowability, gel strength, color, and particle size. In addition, many regulations (parameter measurement methods) have been proposed for one physical property (e.g., centrifuge retention capacity) from various points of view.

Water absorbent resins have been developed with a focus on these many physical properties. However, there has been a problem that even if the above many physical properties (e.g., "centrifuge retention capacity", "absorbency against pressure") are controlled, the performance of water absorbent resins when they are put to practical use in absorbers such as disposable diapers remains less than satisfactory. Further, since water absorbent resins are used mainly for hygiene materials such as disposable diapers and sanitary napkins, water absorbent resins are required to be white at the time of shipment from factory, so as not to provide sense of foreign matter due to coloring when powdery water absorbent resins are combined with white pulp in hygiene materials. Further, although water absorbent resins are generally white powder, they are known to be colored (colored yellow to brown) over time after shipment, such as during storage and transportation, and after they are used in hygiene materials, and it has been desired that even when absorbent articles are stored for a long period of time, water absorbent resins of the absorbent articles remain white. In recent years, the proportion (% by mass) of water absorbent resins used in hygiene materials has been increasing, and therefore, the problem of coloring has been becoming more important.

In response, various proposals for improvement of whiteness and prevention of coloring in water absorbent resins are disclosed in, for example, Patent Documents 5 to 31. More specifically, the following are known as methods for controlling a polymerization inhibitor in a monomer: a technique in which the amounts of methoxyphenols in acrylic acid are set to be 10 to 160 ppm (Patent Document 5); a technique in which the amount of hydroquinone in acrylic acid is controlled to be 0.2 ppm or smaller (Patent Document 6); a technique in which a monomer is treated with activated carbon (Patent Document 7); a technique in which tocophenol is used as an inhibitor (Patent Document 8); a technique in which an N-oxyl compound, a manganese compound, or the like is used as a polymerization inhibitor (Patent Document 9); and a technique in which methoxyphenol and a specific polyvalent metal salt are used (Patent Documents 10 and 11).

Further, the addition of anti-coloring agents for water absorbent resins has been known, of which examples may include: the addition of a reducing agent such as a hypophosphorous acid salt (Patent Document 12); the addition of an antioxidant agent (Patent Documents 13 and 14); the addition of a metal chelator and optionally another reducing agent (Patent Documents 15 to 19); and the addition of an organic carboxylic acid and optionally another compound (Patent Documents 20 to 23). Further, Patent Documents 24 to 26 have been known as techniques focusing on a polymerization initiator. Further, there have also been proposed techniques focusing on the amount of iron, as a substance responsible for coloring, in aluminum or a reducing agent (Patent Documents 27 and 28). There has also been known a technique in which ammonium acrylate is used for a monomer (Patent Document 29). Still further, there has also be known the control of the amount of oxygen at a drying step or a surface-crosslinking step (Patent Documents 30 and 31).

However, even with the coloring prevention methods in Patent Documents 5 to 31, variations occur in whiteness of particulate water absorbent resins obtained by continuous polymerization. Particulate water absorbent resins are strongly demanded to be white, and therefore, there is still room for improvement in whiteness. In addition, according to conventional coloring prevention techniques in which the purity of a raw material for particulate water absorbent resins, such as acrylic acid, is highly increased, or the polymerization or drying conditions of water absorbent resins are made mild, or a new anti-coloring agent (e.g., a reducing agent) is used, there is a possibility that the production cost is increased, the productivity is reduced, or the safety properties and water-absorption properties are deteriorated due to the use of an anti-coloring agent.

In addition to the problem of coloring disclosed in Patent Documents 5 to 31, there has been known a problem of the odors of water absorbent resins themselves. Water absorbent resins are required to have no abnormal odor even before being used, so as not to provide a sense of unpleasantness to users of hygiene materials such as disposable diapers or sanitary napkins in which the water absorbent resins are used. In recent years, with an improvement in the performance of water absorbent resins, there have been cases where an unpleasant odor or an abnormal odor, which is considered to be derived from a newly-used substance, has become a problem.

In response, various methods of reducing an odor have been proposed. More specifically, it has been proposed to reduce the odors of the following substances: an acrylic acid oligomer (Patent Document 32); acetic acid and propionic acid (Patent Document 33); a volatile organic solvent (Patent Document 34); a sulfur reducing agent (Patent Document 35); and an alcoholic volatile substance (Patent Document 36). However, these methods are less than satisfactory in that excellent anti-yellowing performance and excellent absorption capability cannot be exhibited. In particular, when a reducing agent is used and high physical properties are achieved, and especially when an absorbency against pressure (AAP) of not lower than 20 [g/g] or a saline flow conductivity (SFC) of not lower than $30[\times 10^{-7} \cdot cm^3 \cdot s \cdot g^{-1}]$ is achieved, an abnormal odor may occur from unknown origin other than the reducing agent.

As described above, it cannot be said that the conventional techniques have sufficiently solved the problem of coloring and other problems (e.g., those of cost, water-absorption performance, and odor). In particular, it is quite difficult to solve the problem of coloring while achieving high water-absorption performance. According to the conventional techniques, coloring is likely to occur especially in the case of a water absorbent resin having an excellent balance between centrifuge retention capacity (CRC) and saline flow conductivity (SFC), for example, in the case of a water absorbent resin having a CRC of not lower than 25 [g/g] and an SFC of not lower than $50[\times 10^{-7} \cdot cm^3 \cdot s \cdot g^{-1}]$, while the balance between the CRC and the SFC may greatly be deteriorated even by the addition of an anti-coloring agent in a small amount.

For example, there is a case where an aluminum compound is used as a liquid permeability improver. As described above, however, an aluminum compound is known to contain iron which is a causal substance for coloring (Patent Document 27). A water absorbent resin to which an aluminum compound is added is likely to be colored. If it is attempted to reduce the coloring by using an anti-coloring agent as described above (Patent Documents 12 to 23), a large amount of the anti-coloring agent may be needed, resulting in a deterioration of the balance between the CRC and the SFC.

PRIOR ART DOCUMENTS

Patent Documents

Patent Document 1: U.S. Pat. No. 5,210,298
Patent Document 2: U.S. Patent Application Publication No. 2008/242816
Patent Document 3: WO 2007/28747
Patent Document 4: U.S. Patent Application Publication No. 2008/194863
Patent Document 5: WO 2003/051940
Patent Document 6: U.S. Pat. No. 6,444,744
Patent Document 7: WO 2004/052819
Patent Document 8: WO 2003/053482
Patent Document 9: WO 2008/096713
Patent Document 10: WO 2008/092843
Patent Document 11: WO 2008/092842
Patent Document 12: U.S. Pat. No. 6,359,049
Patent Document 13: WO 2009/060062
Patent Document 14: WO 2009/011717
Patent Document 15: U.S. Patent Application Publication No. 2005/085604
Patent Document 16: WO 2003/059961
Patent Document 17: European Patent No. 1645596
Patent Document 18: Japanese Patent No. 3107873
Patent Document 19: WO 2009/005114
Patent Document 20: WO 2008/026772
Patent Document 21: Japanese Patent Laid-open Publication No. 2000-327926
Patent Document 22: Japanese Patent Laid-open Publication No. 2003-052742
Patent Document 23: Japanese Patent Laid-open Publication No. 2005-186016
Patent Document 24: Japanese Patent Laid-open Publication No. Hei 4-331205
Patent Document 25: U.S. Patent Application Publication No. 2006/089611
Patent Document 26: U.S. Pat. No. 7,528,291
Patent Document 27: WO 2007/072969
Patent Document 28: U.S. Patent Application Publication No. 2006/074160
Patent Document 29: WO 2006/109882
Patent Document 30: U.S. Patent Application Publication No. 2007/293632
Patent Document 31: WO 2006/008905
Patent Document 32: WO 2004/052949
Patent Document 33: WO 2003/095510
Patent Document 34: U.S. Patent Application Publication No. 2009/036855
Patent Document 35: WO 2006/088115
Patent Document 36: U.S. Patent Application Publication No. 2008/075937

Non-patent Literature Documents

Non-patent Literature Document 1: Plant Operation Progress, Vol. 7, No. 3 (1988), pp. 183-189

SUMMARY OF THE INVENTION

Problem to be Solved by the Invention

A problem to be solved by the present invention is to provide a particulate polyacrylic acid (salt)-based water absorbent resin for absorbers, which can exhibit excellent water-absorption performance, has excellent coloring prevention performance over time, has no odor, and is suitable for practical use.

Means for Solving the Problem

In view of the above problem, an object of the present invention is to provide a water absorbent resin excellent in whiteness. The present inventors have conducted diligent studies to suppress variation in whiteness. As a result, the present inventors have discovered that water in acrylic acid is one of the factors that affect whiteness. Further, the present inventors have found that a water absorbent resin excellent in whiteness can be stably produced by setting the water content in a prescribed range.

In addition, the present inventors have conducted diligent studies to suppress coloring over time. As a result, the present inventors have found that a water absorbent resin, of which color maintains excellent whiteness over time, can be stably produced by causing a certain amount of formic acid to be present in the water absorbent resin.

Further, the present inventors have conducted studies to suppress coloring over time, focusing on iron which is responsible for coloring. In view of the fact that iron is brought into a water absorbent resin mainly by the addition of a basic composition for neutralizing acrylic acid and the addition of a polyvalent metal compound used as a liquid permeability improver (Patent Documents 27 and 28), the present inventors have further studied the prevention of coloring. As a result, the present inventors have found that coloring over time can be suppressed by: setting the iron content of a basic composition in a prescribed range; adding a cationic polymer instead of a polyvalent metal compound; and causing formic acid to be present in a water absorbent resin in a prescribed amount, in particular, in such a small amount that the water-absorption performance is not deteriorated. Further, the present inventors have found that a water absorbent resin obtained by the above method does not have problems of odor and reduction in water-absorption performance, which are caused by the addition of additives, or any other problems, and exhibits significantly high liquid permeability. Thus, the present inventors have completed the present invention.

That is, in order to solve the above problem, there are provided the first to fourth production methods of a water absorbent resin as described below. In addition, in order to solve the above problem, there is provided a water absorbent resin as described below. In order to solve the above problem, there is provided the method for using acrylic acid as described below.

(First Production Method)

The method for producing a polyacrylic acid (salt)-based water absorbent resin (the first production method) according to the present invention, sequentially comprises the steps of: storing or producing acrylic acid; mixing acrylic acid containing a polymerization inhibitor with water, a crosslinking agent, and optionally, a basic composition, and/or neutralizing them, to prepare an aqueous monomer solution; polymerizing the aqueous monomer solution; drying a water-containing gel-like crosslinked polymer thus obtained; and optionally carrying out surface crosslinking, wherein the acrylic acid containing the polymerization inhibitor has a water content of 1,000 ppm (by mass; the same applies hereinafter) or lower, and/or the aqueous monomer solution has a formic acid content of 1 to 700 ppm, relative to the monomer.

(Second Production Method)

The method for producing a polyacrylic acid (salt)-based water absorbent resin (the second production method) according to the present invention, sequentially comprises the steps of: storing or producing acrylic acid; mixing acrylic acid containing a polymerization inhibitor with water, a crosslinking agent, and optionally, a basic composition, and/or neutralizing them, to prepare an aqueous monomer solution; polymerizing the aqueous monomer solution; drying a water-containing gel-like crosslinked polymer thus obtained; and optionally carrying out surface crosslinking, wherein the acrylic acid containing the polymerization inhibitor has a formic acid content of 1 to 700 ppm (by mass).

(Third Production Method)

The method for producing a polyacrylic acid (salt)-based water absorbent resin (the third production method) according to the present invention, sequentially comprises the steps of: storing or producing acrylic acid; mixing acrylic acid containing a polymerization inhibitor with water, a crosslinking agent, and optionally, a basic composition, and/or neutralizing them, to prepare an aqueous monomer solution; polymerizing the aqueous monomer solution; drying a water-containing gel-like crosslinked polymer thus obtained; and optionally carrying out surface crosslinking, wherein the acrylic acid containing the polymerization inhibitor has a water content of 1,000 ppm (by mass, the same applies hereinafter) or lower, and/or the aqueous monomer solution has a formic acid content of 1 to 700 ppm, relative to the monomer, and/or the following conditions (1) to (3) are satisfied:

(1) the basic composition has an iron content of 0.007 to 7 ppm;

(2) 0.01 to 5 parts by mass of a cationic polymer is mixed in the polymer, relative to 100 parts by mass of the polymer, after the drying step; and (3) 0.0001 to 5 parts by mass of formic acid is allowed to be present and/or mixed in the monomer at the time of polymerization and/or the polymer after the polymerization, relative to 100 parts by mass of the monomer at the time of polymerization and/or the polymer after the polymerization, and wherein the monomer at the time of polymerization has a formic acid content of 0 to 700 ppm, relative to the monomer.

(Fourth Production Method)

The method for producing a polyacrylic acid (salt)-based water absorbent resin (the fourth production method) according to the present invention, sequentially comprises the steps of: storing or producing acrylic acid; mixing acrylic acid containing a polymerization inhibitor with water, a crosslinking agent, and optionally, a basic composition, and/or neutralizing them, to prepare an aqueous monomer solution; polymerizing the aqueous monomer solution; drying a water-containing gel-like crosslinked polymer thus obtained; and optionally carrying out surface crosslinking, wherein the following conditions (1) to (3) are satisfied:

(1) the basic composition has an iron content of 0.007 to 7 ppm;

(2) 0.01 to 5 parts by mass of a cationic polymer is mixed in the polymer, relative to 100 parts by mass of the polymer, after the drying step;

(3) 0.0001 to 5 parts by mass of formic acid is allowed to be present and/or mixed in the monomer at the time of polymerization and/or the polymer after the polymerization, relative to 100 parts by mass of the monomer at the time of polymerization and/or the polymer after the polymerization, wherein the monomer at the time of polymerization has a formic acid content of 0 to 700 ppm, relative to the monomer.

(Water Absorbent Resin)

The polyacrylic acid (salt)-based water absorbent resin of the present invention comprises formic acid in an amount of 1 to 500 ppm, wherein when the water absorbent resin has a cationic polymer content of 0.01 to 5 parts by mass, in 100 parts by mass of a polymer, the water absorbent resin has an iron content of 2 ppm or lower and a formic acid content of 1 to 50,000 ppm.

(Using Method)

The method for using acrylic acid according to the present invention is characterized in that acrylic acid is used in polymerization for a water absorbent resin, the acrylic acid comprising 10 to 160 ppm of methoxyphenol which is a polymerization inhibitor and having a water content of 1,000 ppm (by mass, the same applies hereinafter) or lower and/or a formic acid content of 0.5 to 700 ppm.

In this connection, in the present invention, the "formic acid" means formic acid and salts thereof. The same effects can be obtained also in the case where formic acid (salt) becomes acid-dissociated in an aqueous monomer solution or in a water absorbent resin, and such a case is included within the scope of the present invention. The formic acid content in the present invention is calculated by considering formic acid and salts of formic acid as formic acid (acid form). It is additionally remarked that the degree of acid dissociation of formic acid is higher than that of acrylic acid, and therefore, formic acid also becomes acid-dissociated in a salt obtained by (partial) neutralization of acrylic acid. Further, a water absorbent resin composition containing a cationic polymer and formic acid is also included in the water absorbent resin obtained by the present invention, and such a water absorbent resin composition is also referred to as a "water absorbent resin".

Effects of the Invention

A water absorbent resin for absorbers is provided, which has excellent coloring prevention performance over time, has no odor, contains very small amounts of residual monomers, and is suitable for practical use.

MODE FOR CARRYING OUT THE INVENTION

Figure 1:
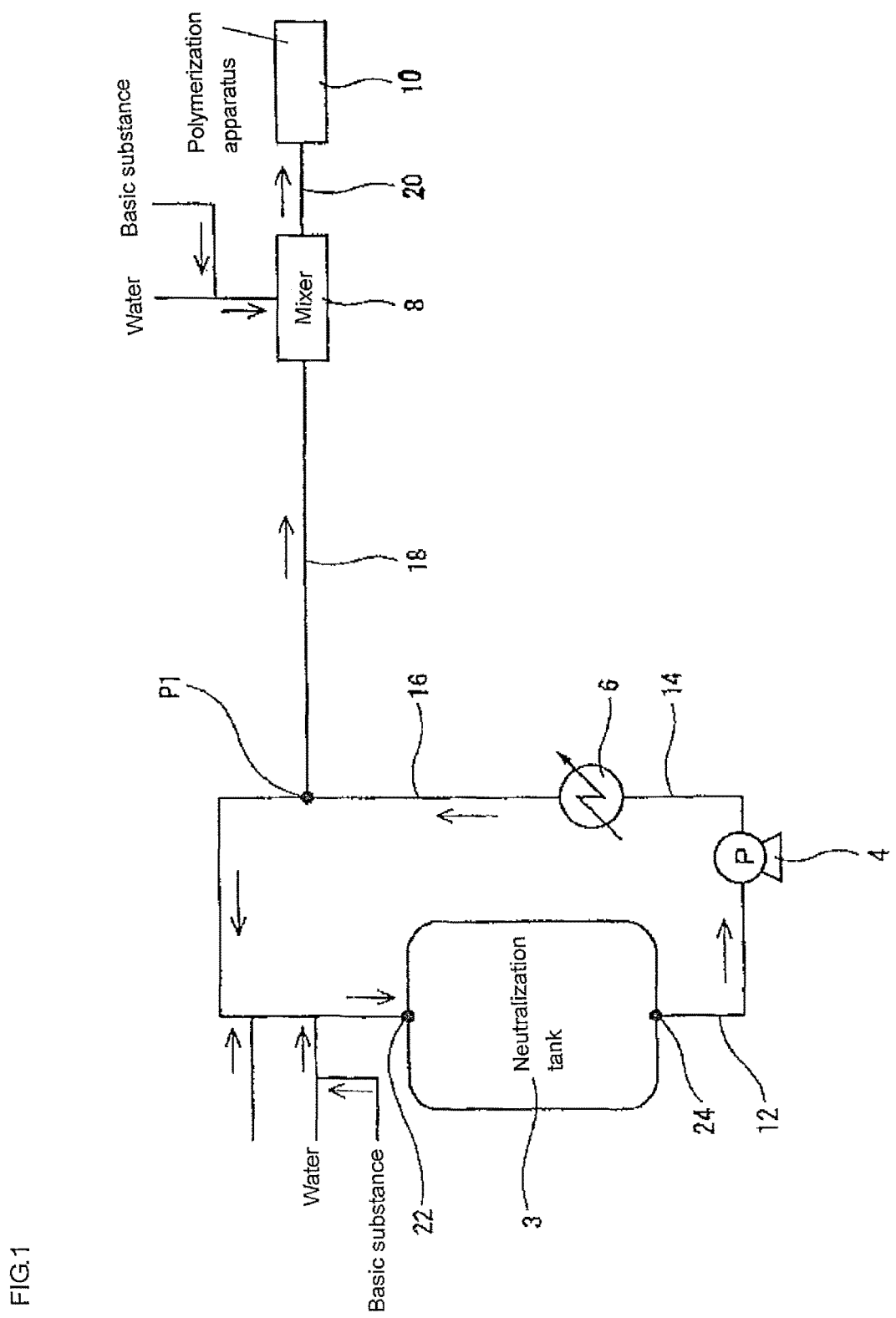
FIG. 1 is a conceptual diagram showing an apparatus (in which a neutralization system is circulated) used for a production method according to a preferred embodiment of the present invention.

A water absorbent resin and its production methods according to the present invention will be described below in detail. The scope of the present invention, however, is not limited by the following descriptions, and the present invention can also be carried out with appropriate variations or modifications, which are not exemplified below, without departing from the intent of the present invention.

[1] Definition of Terms (1-1) "Water Absorbent Resin"

In the present specification, a "water absorbent resin" means a water-swellable and water-insoluble polymer gelling agent, and refers to one that has the following physical properties. That is, the "water absorbent resin" means a polymer gelling agent that has a centrifuge retention capacity (CRC defined in ERT 441.2-02 (2002)) of necessarily not lower than 5 [g/g], more preferably 10 to 100 [g/g], and still more preferably 20 to 80 [g/g], and that contains water solubles (Extractables defined in ERT470.2-02 (2002)) in an amount of necessarily 0% to 50% by mass, more preferably 0% to 30% by mass, still more preferably 0% to 20% by mass, and particularly preferably 0% to 10% by mass. In this connection, the water absorbent resin is not limited to the form, the whole (100%) of which consists of a polymer, and may contain additives and the like described below to the extent that the above performances can be maintained. Preferably, the water absorbent resin may contain formic acid as described below.

The water absorbent resin is not limited to the form, the whole (100% by mass) of which consists of a polymer, and may contain additives described below and the like to the extent that the above performances can be maintained. In addition, the water absorbent resin may contain formic acid and the like as described below. Further, when the water absorbent resin of the present invention is a water absorbent resin composition (mixture) containing a cationic polymer and formic acid as described below, the amounts of water and additives may preferably be 30% by mass or smaller, more preferably 20% by mass or smaller, and still more preferably 10% by mass or smaller, relative to the whole of the water absorbent resin composition. In addition, the water absorbent resin is not limited to a final product, and may mean, for convenience, an intermediate in the production of the water absorbent resin (e.g., a dried water absorbent resin, a water absorbent resin before surface crosslinking).

(1-2) "Polyacrylic Acid (Salt)"

In the present specification, a "polyacrylic acid (salt)" means a polymer that is formed mainly of acrylic acid (salt) as the repeating unit and that contains optionally graft components. More specifically, the polyacrylic acid (salt) means a polymer that contains acrylic acid (salt) as a monomer except cross-lining agents in an amount of necessarily 50 to 100 mol %, more preferably 70 to 100 mol %, still more preferably 90 to 100 mol %, and particularly preferably substantially 100 mol %. The salt as the polymer may include necessarily water-soluble salts, more preferably monovalent salts, and still more preferably alkali metal salts or ammonium salts. In particular, alkali metal salts may be preferred, and sodium salts may particularly be preferred.

(1-3) "EDANA" and "ERT"

"EDANA" is an abbreviated expression for European Disposables and Nonwovens Association, and "ERT" is an abbreviated expression for the measurement methods of water absorbent resins (ERT/EDANA Recommended Test Methods) under the European standards (approximately the world standards). In the present specification, the physical properties of water absorbent resins are measured by reference to the original text of ERT (known literature, revised in 2002), unless otherwise indicated.

(a) "CRC" (ERT441.2-02), Centrifuge Retention Capacity

This is an absorbency (unit: [g/g]) after 0.200 g of a water absorbent resin in a nonwoven bag is freely swollen with a 0.9% by mass saline solution for 30 minutes and then water is removed at 250 G with a centrifugal separator.

(b) "AAP" (ERT442.2-02), Absorbency Against Pressure.

This is an absorbency (unit: [g/g]) after 0.900 g of a water absorbent resin is swollen with a 0.9% by mass saline solution under a load of 21 g/cm$^2$ for 1 hour. The load is separately changed as appropriate, and for example, the measurement is carried out under a load of 50 g/cm$^2$.

(c) "Extractables" (ERT470.2-02), Water Solubles

This is the value (unit: % by mass) obtained by the measurement in which 1.000 g of a water absorbent resin is added to 200 mL of a 0.9% by mass saline solution, followed by stirring for 16 hours, and then the amount of polymer dissolved is measured by pH titration.

(d) "Particle Size Distribution (ERT420.2-02)", Particle Size Distribution Measured by Sieve Classification (e) Other Prescriptions for Water-Soluble Resins by EDANA (Prescribed in 2002)

"pH" (ERT400.2-02), pH of Water Absorbent Resin

"Moisture Content" (ERT430.2-2), Moisture Content of Water Absorbent Resin

"Flow Rate" (ERT450.2-02), Flow Rate of Water Absorbent Resin Powder

"Density" (ERT460.2-02), Bulk Specific Density of Water Absorbent Resin (1-4) Liquid Permeability The flow of a liquid flowing between the particles of a swollen gel with load or without load is referred to as "liquid permeability". Typical measurement methods of this "liquid permeability" may include SFC (Saline Flow Conductivity) and GBP (Gel Bed Permeability).

"SFC (Saline Flow Conductivity)" means the permeability of a 0.69% by mass saline against a water absorbent resin under a load of 0.3 psi. SFC is measured according to the SFC test method disclosed in the specification of U.S. Pat. No. 5,669,894.

"GBP" means the permeability of a 0.69% by mass saline against a water absorbent resin under a load or when freely swollen. GBP is measured according to the GBP test method disclosed in the pamphlet of WO 2005/016393.

(1-5) Initial Color and Color Over Time

"Initial color" (also known as initial coloring) in the present invention means the color of a water absorbent resin just after its production or release to users. Usually, the color before factory release is managed as the initial color. With respect to the measurement method of color, there may be exemplified the methods (Lab values, YI values, WB values, and others) disclosed in the pamphlet of WO 2009/005114.

In addition, "color over time" means the color of a water absorbent resin after stored in an unused state for a long period of time or after put into distribution, and the change from the initial color is referred to as "coloring over time". Water absorbent resins are colored over time, which may lead to a decrease in the commercial value of disposable diapers. The coloring over time develops over several months to several years, and therefore, examination is carried out by the accelerating test (accelerating test under high temperature and high humidity) disclosed in the pamphlet of WO 2009/005114.

(1-6) Others

In the present specification, "X to Y" indicating a range means "not lower (smaller) than X and not higher (greater) than Y". In addition, "t (ton)" as the unit of mass means "Metric ton", and further, "ppm" means "ppm by mass" unless otherwise indicated.

[2] Acrylic Acid (Salt)

In the present invention, it is characterized by a method for producing a polyacrylic acid (salt)-based water absorbent resin, sequentially comprising the steps of: storing or producing acrylic acid; mixing acrylic acid containing a polymerization inhibitor with water, a crosslinking agent, and optionally, a basic composition, and/or neutralizing them, to prepare an aqueous monomer solution; polymerizing the aqueous monomer solution; drying a water-containing gel-like crosslinked polymer thus obtained; and optionally carrying out surface crosslinking, wherein the acrylic acid containing the polymerization inhibitor has a water content of 1,000 ppm (by mass; the same applies hereinafter) or lower (case 1), and/or the aqueous monomer solution has a formic acid content of 1 to 700 ppm, relative to the monomer (case 2).

In addition, the present invention may include a method for producing a polyacrylic acid (salt)-based water absorbent resin, sequentially comprising the steps of: storing or producing acrylic acid; mixing acrylic acid containing a polymerization inhibitor with water, a crosslinking agent, and optionally, a basic composition, and/or neutralizing them, to prepare an aqueous monomer solution; polymerizing the aqueous monomer solution; drying a water-containing gel-like crosslinked polymer thus obtained; and optionally carrying out surface crosslinking, wherein the following conditions (1) to (3) are satisfied (case 3):

(1) the basic composition has an iron content of 0.007 to 7 ppm;

(2) 0.01 to 5 parts by mass of a cationic polymer is mixed in the polymer, relative to 100 parts by mass of the polymer, after the drying step; and (3) 0.0001 to 5 parts by mass of formic acid is allowed to be present and/or mixed in the monomer at the time of polymerization and/or the polymer after the polymerization, relative to 100 parts by mass of the monomer at the time of polymerization and/or the polymer after the polymerization, and wherein the monomer at the time of polymerization has a formic acid content of 0 to 700 ppm, relative to the monomer.

(2-1) Acrylic Acid in Case 1

In case 1, in order to achieve the objects of the present invention (coloring prevention and durability), the water content of acrylic acid containing a polymerization inhibitor is set to be 1,000 ppm or less. The water content may be preferred in the following order: 750 ppm or less; 500 ppm or less; 300 ppm or less; 200 ppm or less; 100 ppm or less; 80 ppm or less; and 50 ppm or less. The water content may be preferred to be as low as possible, but in view of dehydration cost, the water content may be sufficient, even if it is about 1 ppm or further about 5 ppm. In order to obtain acrylic acid having such a low water content, distillation or crystallization may be repeated in the purification of acrylic acid to adjust its water content to a prescribed value, or acrylic acid may be brought into contact with an inorganic or organic dehydrating agent to adjust its water content to a prescribed value. When its water content is higher than 1,000 ppm, coloring (particularly, coloring over time) in a water absorbent resin to be obtained tends to worsen.

Such acrylic acid can be obtained by an appropriate control through distillation or crystallization in the step of producing the acrylic acid. The acrylic acid after the production is stored in such a manner that its water content is not increased beyond the range described above due to moisture absorption and other causes. In this connection, since acrylic acid has a melting point of 14° C., an 80% by mass aqueous solution of acrylic acid is often used to prevent its freezing in winter, and a technique has been also known in which an 80% by mass aqueous solution of acrylic acid is used as a raw material of a water absorbent resin (e.g., Examples and Comparative Examples in the pamphlet of WO 02/085959). In addition, it has been also known that about 0.2% to 1% by mass of water is contained in acrylic acid as a minor component, and there is also an example in which acrylic acid having a purity of 99.8% by mass is used for producing a water absorbent resin (e.g., Comparative Example 2 in the specification of U.S. Pat. No. 4,507,438). The present invention is characterized by the use, in the steps of producing a water absorbent resin, of acrylic acid, of which water content is reduced in the step of producing acrylic acid and further controlled even after the production.

(2-2) Acrylic Acid in Case 2

In case 2, the formic acid content of the aqueous monomer solution is set to be 1 to 700 ppm or lower, relative to the monomer.

The formic acid content of the aqueous monomer solution may be 1 ppm or higher, preferably 2 ppm or higher, more preferably 3 ppm or higher, still more preferably 4 ppm or higher, further still more preferably 5 ppm or higher, even further still more preferably 10 ppm or higher, and particularly preferably 20 ppm or higher, relative to the monomer. The upper limit is 700 ppm or lower, which may also be appropriately determined in a preferred range of 500 ppm or lower, or 200 ppm or lower. The effect of coloring prevention in the present application cannot be obtained, if the formic acid content of the aqueous monomer solution is lower than 1 ppm, relative to the monomer. In addition, water solubles in a water absorbent resin are increased, if the formic acid content of the aqueous monomer solution is higher than 700 ppm, relative to the monomer.

As the method for preparing an aqueous monomer solution containing formic acid in the range described above, there can be mentioned a method in which formic acid is added to an aqueous monomer solution; a method in which acrylic acid containing formic acid as an impurity in the range described below is used; and a method in which different types of acrylic acid containing different amounts of formic acid are mixed and then used. In particular, plant-derived acrylic acid obtained by specific production methods may suitably be used because it contains a greater amount of formic acid than ordinary petroleum-derived acrylic acid. In addition, these methods may be used in combination.

When acrylic acid contains formic acid, the formic acid content of the acrylic acid may be 0.5 ppm or higher, preferably 1 ppm or higher, more preferably 2 to 700 ppm, still more preferably 3 to 500 ppm, further still more preferably 4 to 400 ppm, particularly preferably 5 to 200 ppm, and most preferably 10 to 100 ppm.

Also in case 2, in order to solve the problems of the present invention, acrylic acid, in particular, acrylic acid obtained by the acrylic acid production step, may preferably have a water content in the range described above. Therefore, the acrylic acid production step of obtaining acrylic acid containing a specific amount of water and/or a specific amount of formic acid is directly connected to the steps of producing a water absorbent resin by various transportation means, such as a tanker, a tank lorry, and a pipeline, preferably by a pipeline.

For acrylic acid in case 2, in order to achieve the objects of the present invention (coloring prevention and durability), it is preferable to control the water content, in addition to the formic acid content described above, of acrylic acid, similarly to case 1.

That is, in the present invention, suitable acrylic acid may be such that acrylic acid containing a polymerization inhibitor has a water content of 1,000 ppm (by mass, the same applies hereinafter) or lower, and/or a formic acid content of 1 to 700 ppm. As the production method of a water absorbent resin using the acrylic acid, the present invention provides a method for producing a polyacrylic acid (salt)-based water absorbent resin, successively comprising the steps of: storing or producing acrylic acid; mixing acrylic acid containing a polymerization inhibitor with water, a crosslinking agent, and optionally, a basic composition, and/or neutralizing them, to prepare an aqueous monomer solution; polymerizing the aqueous monomer solution; drying a water-containing gel-like crosslinked polymer thus obtained; and optionally carrying out surface crosslinking, wherein the acrylic acid containing the polymerization inhibitor has a water content of 1,000 ppm or lower, and/or a formic acid content of 1 to 700 ppm. The water content and the formic acid content of the acrylic acid may preferably be both satisfied, and may more preferably be the formic acid content or the water content described above.

(2-3) Acrylic Acid in Case 3

In case 3, 0.0001 to 5 parts by mass of formic acid is allowed to be present and/or mixed in a monomer at the time of polymerization and/or a polymer after the polymerization, relative to 100 parts by mass of the monomer at the time of polymerization and/or the polymer after the polymerization, wherein the monomer at the time of polymerization has a formic acid content of 0 to 700 ppm, relative to the monomer. In this connection, formic acid may be absent or present in a very small amount in the monomer at the time of polymerization. Preferably, formic acid may previously be contained in acrylic acid at the time of preparing a monomer, and the concentration of formic acid in an aqueous monomer solution may be 1 to 700 ppm, relative to the monomer. It has been found that coloring (coloring over time) when a cationic polymer is mixed can be reduced by using a monomer containing a small amount of formic acid for polymerization. It is assumed that formic acid present in the monomer at the time of polymerization is present uniformly within a polymer to prevent coloring of a water absorbent resin powder (such a mechanism does not limit the present invention).

Also in case 3, in order to solve the problems of the present invention, an aqueous monomer solution may preferably contain formic acid, and further, acrylic acid to be used may preferably contain formic acid in the range described above. In this case, the formic acid content of the aqueous monomer solution may be preferred in the following order: 1 ppm or higher; 2 ppm or higher; 3 ppm or higher; 4 ppm or higher; 5 ppm or higher; 10 ppm or higher; and 20 ppm or higher, relative to the monomer. The upper limit may be preferred in the following order: 700 ppm or lower; 500 ppm or lower; 200 ppm or lower; and 100 ppm or lower. When the formic acid content is higher than 700 ppm, water solubles in a water absorbent resin tend to increase, which is not preferred.

Also in case 3 where a cationic polymer is used, in order to solve the problems of the present invention, acrylic acid may preferably contain formic acid in the range described above and/or contain water in the range described in case 1. Therefore, the acrylic acid production step for obtaining acrylic acid containing a specific amount of water and/or a specific amount of formic acid is directly connected to the steps of producing a water absorbent resin by various transportation means, such as a tanker, a tank lorry, and a pipeline, preferably by a pipeline.

The method for preparing an aqueous monomer solution containing formic acid in the range described above is the same as that of case 2.

Also in the acrylic acid of case 3, in order to achieve the objects of the present invention (coloring prevention and durability), the water content of the acrylic acid may preferably be controlled similarly to case 1, in addition to the formic acid content similarly to case 2.

A liquid containing the monomer may usually contain a polymerization inhibitor. A preferred polymerization inhibitor is a phenolic compound. As the phenolic compound, there can be mentioned alkylphenols and alkoxyphenols. As preferred substituent groups of these compounds, there can be exemplified t-butyl groups, methyl groups, and ethyl groups. A typical polymerization inhibitor is p-methoxyphenol.

The concentration of a polymerization inhibitor in an aqueous monomer solution may preferably be 1 to 200 ppm, more preferably 2 to 180 ppm, still more preferably 10 to 160 ppm, further still more preferably 20 to 100 ppm, and particularly preferably 30 to 80 ppm, relative to the monomer. The concentration of a polymerization inhibitor set to be in the range described above makes it possible to prevent a delay in the polymerization reaction and to suppress the coloring of a particulate water absorbent resin. In order to improve the light resistance of a water absorbent resin, that is, the light stability of a swelling gel, particularly by the use of p-methoxyphenol, a prescribed amount of p-methoxyphenol may preferably be used in a monomer and contained in a water absorbent resin to be obtained.

The acrylic acid (common to cases 1 to 3) which has been described above may suitably be used in the polymerization for water absorbent resins to provide less colored water absorbent resins. That is, the present invention provides, as a method for using acrylic acid, the use of acrylic acid in the polymerization for water absorbent resins, the acrylic acid comprising 10 to 160 ppm of methoxyphenol as a polymerization inhibitor and having a water content of 1,000 ppm or lower and/or a formic acid content of 0.5 to 700 ppm.

(Prior Art; Common to Cases 1 to 3)

In the method for producing a water absorbent resin, there has hitherto been known a technique of controlling minor components in a monomer to solve the various problems described above.

As specifically described above in Background Art, there have been known techniques of adjusting the amount of an acrylic acid oligomer in acrylic acid (Patent Document 32), or adjusting the amounts of acetic acid and propionic acid (Patent Document 33), in order to reduce the odor of a water absorbent resin. In order to prevent the coloring of a water absorbent resin, there have been known a technique of controlling the amount of methoxyphenol in acrylic acid to be 10 to 160 ppm (Patent Document 5); a technique of controlling the amount of hydroquinone in acrylic acid to be 0.2 ppm or lower (Patent Document 6); and a method of treating a monomer with activated carbon (Patent Document 7). Further, in addition to Patent Documents described above in Background Art, there are Patent Documents 38 to 43 that focus on the raw materials for water absorbent resins, and the following have been proposed to reduce the amount of residual monomers in a water absorbent resin: a method of purifying a monomer to reduce the heavy metal content to 0.1 ppm or lower in the monomer, followed by polymerization (Japanese Patent Laid-open Publication No. Hei 3-31306, Patent Document 37); a method of using acrylic acid containing a very small amount of acrylic acid dimer or oligomer (Japanese Patent Laid-open Publication No. Hei 6-211934, Patent Document 38); a technique of using a monomer containing a very small amount of acrylic acid dimer and iron is used (Japanese Patent Laid-open Publication No. 2006-219661, Patent Document 39); and a technique of controlling the amount of β-hydroxy propionic acid in an acrylic acid salt to be 1,000 ppm or lower (European Patent No. 574260, Patent Document 40). In order to improve polymerizability, there has been known a method of using acrylic acid containing a very small amount of protoanemonin (U.S. Patent Application Publication No. 2004/110913, Patent Document 41). In order to reduce water solubles, there has been known a technique of using acrylic acid containing a very small amount of allyl acrylate (European Patent No. 1814913, Patent Document 42). In addition, there has also been known a technique of using acrylic acid containing 50 ppm or lower of maleic acid (U.S. Patent Application Publication No. 2008/091048, Patent Document 43) and a technique of using caustic soda containing a prescribed amount of iron for neutralization (U.S. Patent Application Publication No. 2008/016152, Patent Document 44).

Further, Non-patent Literature Document 1 (Plant Operation Progress, vol. 7, No. 3 (1988), pp. 183-189) as a general document about acrylic acid discloses the fact that the amount of dimer in acrylic acid is increased depending on water, temperature, and time, and Patent Document 45 (Japanese Patent Laid-open Publication No. 2002-179617) discloses acrylic acid containing 300 ppm or lower of water and 20 ppm or lower of aldehydes, although both of these documents do not disclose a water absorbent resin.

As disclosed above, in Patent Documents 1 to 45 and Non-patent Literature Document 1, it has been known that water in acrylic acid has an influence on dimer and therefore residual monomers; however, the prior art does not suggest that formic acid and water in acrylic acid have an influence on the coloring of a water absorbent resin. In addition, as disclosed in, for example, Patent Documents 5 to 11, 27, and 28, Fe ion and polymerization inhibitors are known to be a cause of the coloring of a water absorbent resin; however, the influence of water in acrylic acid has not been known.

(Formic Acid and Water Absorbent Resin; Cases 2 and 3)

Patent Document 6 discloses a technique of reducing the pH of a water absorbent resin to 5.5 or lower to prevent coloring over time, and discloses formic acid as an example of the acid to be used for the intended purpose. In addition, it has been known, for example, that organic carboxylic acids and optionally other compounds are added as anti-coloring agents for water absorbent resins (Patent Documents 20 to 23), and formic acid is disclosed as an example of the organic carboxylic acid to be used for the intended purpose. In addition, Patent Document 46 (U.S. Pat. No. 4,698,404) and Patent Document 47 (U.S. Pat. No. 6,335,406) disclose formic acid as an example of the chain transfer agent to be used in polymerization. Patent Document 48 (U.S. Pat. No. 4,693,713) discloses a water absorbent resin composition containing a carboxylic acid salt and the like for blood absorption, and discloses a formic acid salt as an example of the carboxylic acid salt. Patent Document 49 (Japanese Patent Laid-open Publication No. 2006-225456) discloses formic acid as an example of the reducing agent to be used in redox polymerization. Patent Documents 50 to 52 (WO 2008/092842, WO 2008/092843, and WO 2007/121937) disclose a production method of a water absorbent resin using a polyvalent metal salt of an organic acid, and disclose formic acid as an example of the organic acid.

These Patent Documents do not disclose the influence of a cationic polymer or a prescribed amount of formic acid in acrylic acid, and further, the influence of a prescribed amount of water or a prescribed amount of polymerization inhibitor, on coloring over time. In addition, the influence of neutralization of the circulation type is not disclosed therein.

(Other Minor Components; Common to Cases 1 to 3)

From the viewpoint of improving the physical properties and characteristics of a water absorbent resin, the amount of protoanemonin and/or furfural contained in acrylic acid may preferably be controlled to be 0 to 20 ppm. More specifically, the amount of protoanemonin and/or furfural contained in acrylic acid may preferably be 10 ppm or lower, more preferably in a range of 0.01 to 5 ppm, still more preferably 0.05 to 2 ppm, and particularly preferably 0.1 to 1 ppm. Further, the amounts of aldehydes, other than furfural, and/or maleic acid may be preferred to be as low as possible. The amount of aldehydes, other than furfural, and/or maleic acid may preferably be 0 to 5 ppm, more preferably 0 to 3 ppm, still more preferably 0 to 1 ppm, and particularly preferably 0 ppm (less than the detection limit), relative to acrylic acid. As the aldehydes other than furfural, there can be mentioned, for example, benzaldehyde, acrolein, and acetaldehyde. Further, the amount of saturated carboxylic acids, such as acetic acid and/or propionic acid, which are contained in acrylic acid, may preferably be 1,000 ppm or lower, more preferably 10 to 800 ppm, and particularly preferably 100 to 500 ppm, relative to acrylic acid.

There has also been known a technique of purifying acrylic acid (acrylic acid containing minor components as impurities) to remove a polymerization inhibitor, and acrylic acid dimer, which are impurities, before polymerization for producing a water absorbent resin (Patent Documents 6, 37, 38, and 40 which have been described above, and Examples in these documents). However, when acrylic acid is distilled before polymerization, the amount of p-methoxyphenol contained in the distilled acrylic acid is substantially N.D. (Non Detectable/the detection limit is 1 ppm/as determined by UV) due to a difference between the boiling points of acrylic acid and p-methoxyphenol. Therefore, even if a technique of purifying acrylic acid, which has hitherto been usually carried out, is applied to commercially available acrylic acid containing greater than 200 ppm of p-methoxyphenol, it is impossible or extremely difficult to adjust the p-methoxyphenol content to a specific range of 10 to 200 ppm. In order to achieve such adjustment, it becomes need to intentionally carry out adjustment or addition.

Further, from the viewpoint of odor, the amount of saturated carboxylic acids (in particular, acetic acid and propionic acid) in acrylic acid may also preferably be controlled to be 1% by mass or smaller, more preferably 0.5% by mass or smaller, and still more preferably 0.3% by mass or smaller. Since saturated carboxylic acids (in particular, propionic acid) present at the time of polymerization improves absorbency (CRC), it is effective that saturated carboxylic acids (in particular, propionic acid) are contained in acrylic acid at the time of polymerization in an amount of 0.01% by mass or greater, preferably 0.03% by mass or greater, more preferably 0.05% by mass or greater, and particularly preferably 0.1% by mass or greater. That is, it has been found that propionic acid in acrylic acid improves the absorbency (CRC) of a water absorbent resin after polymerization, and therefore, it is preferred that a prescribed amount of propionic acid may be contained at the time of polymerization.

(Acrylic Acid Derived from Plants; Common to Cases 2 and 3)

In cases 2 and 3, it is preferred to use plant-derived acrylic acid obtained by a specific production method. Such acrylic acid contains 1 to 700 ppm of formic acid. More specifically, the production method is such that glycerin obtained from oils and fats, or other sources, is treated to produce acrolein, which is then oxidized to produce acrylic acid. The acrylic acid thus obtained may preferably be purified by a distillation method or a crystallization method. The formic acid content of the acrylic acid can be controlled depending on the purification method and the purification conditions. In particular, acrylic acid containing a great amount of formic acid is more likely to be obtained by a distillation method. In this connection, when the formic acid content of acrylic acid is too great, the acrylic acid may be used by being mixed with acrylic acid containing a small amount of formic acid.

In the various production methods described above, as the starting material, there can be mentioned, for example, ethylene, propanol, butene, glycerin, and biogas. The route of producing these substances from biomass is as follows. That is, there can be mentioned, for example, a method of producing ethanol from biomass and then obtaining ethylene and/or butene from the ethanol; a method of producing ethanol from biomass and then obtaining butanol and/or butene from the ethanol; a method of producing butanol from biomass and then obtaining butene from the butanol; a method of producing acetone from biomass and then obtaining i-propanol from the acetone; a method of producing n-propanol and/or iso-propanol from biomass; a method of obtaining BDF and glycerin from biomass; and a method of obtaining synthesis gas (CO, $H_2$) from biomass.

The production methods of acrylic acid derived from biomass are disclosed in, for example, WO 2006/08024, WO 2007/119528, WO 2007/132926, and U.S. Patent Application Publication No. 2007/0129570. WO 2006/08024 discloses the fact that propanal is generated as a by-product when acrolein is obtained from glycerin. The oxidation of acrolein containing such propanal makes it possible to easily obtain the acrylic acid of the present invention.

In this connection, the production methods of water absorbent resins using acrylic acid derived from biomass are disclosed in, for example, WO 2006/092271, WO 2006/092272, WO 2006/136336, WO 2008/023039, WO 2008/023040, and WO 2007/109128. However, the six Patent Documents neither disclose nor suggest the production method of a water absorbent resin according to the present invention.

(Combined Use of Acrylic Acid; Common to Cases 2 and 3)

In order to control the amount of minor components such as formic acid to a prescribed amount, different types of acrylic acid may optionally be mixed. In the case of such mixing, there may be used different types of acrylic acid containing different minor components, preferably acrylic acid produced from fossil materials and acrylic acid produced from non-fossil materials. In addition, as the different types of acrylic acid, there may be used different types of acrylic acid, which are different in their raw materials, their different oxidization systems (in particular, with different catalysts), or their different purification systems (distillation or crystallization). The different types of acrylic acid may be made different in the amount of impurities contained therein, in particular, the amount of propionic acid contained therein. When two kinds of acrylic acid are used, their use ratio (mass ratio) may appropriately be determined, but it may usually be in a range of 1:99 to 99:1, preferably 10:90 to 90:10, more preferably 20:80 to 80 to 20, and particularly preferably 30:70 to 70:30. In this connection, acrylic acid other than two kinds of acrylic acid described above may be used in a range of 0% to 50% by mass, more preferably 0% to 30% by mass, and still more preferably 0% to 10% by mass, in the total amount of acrylic acid. The use ratio of different two or more kinds of acrylic acid may appropriately be determined depending on the prices (raw material costs), supply amounts, minor components (propionic acid and other minor components), and other factors of both kinds of acrylic acid. In particular, the use of plural (in particular, two kinds) of raw material sources from fossil materials and non-fossil materials for acrylic acid makes it possible to offset the raw material costs of water absorbent resins. In this connection, when a fossil material and a non-fossil material are used in combination, their ratio can be measured by the quantitative determination of $^{14}C$ in the monomer or water absorbent resin.

(Organic Compound Inert to Polymerization; Common to Cases 2 and 3)

In order to improve the relationship between absorbency (CRC) and extractables (Ext), acrylic acid or a monomer in cases 2 and 3 may preferably contain an organic compound inert to polymerization, which is exemplified in Patent Document 53 (U.S. Patent Application Publication No. 2008/119626). The organic compound inert to polymerization means an organic compound having no polymerizable unsaturated bonds such as in vinyl groups, allyl groups, and other groups.

In the present invention (cases 2 and 3), there may preferably be used a monomer containing 1 to 1,000 ppm of an organic compound inert to polymerization, having a solubility parameter of $1.0 \times 10^4$ to $2.5 \times 10^4$ $(Jm^{-3})^{1/2}$.

In the present specification, the solubility parameter ($\delta$) means cohesive energy density, and can be calculated by the following formula.

Solubility parameter($\delta$)[$(Jm^{-3})^{1/2}$]=$\rho \cdot \Sigma G/M$ [Mathematical Formula 1]

In the formula, $\rho$ is a density [g/cm$^3$]; G is Holly's cohesive energy density; $\Sigma G$ is the sum of cohesive energy constants of constituent atomic groups; $\rho$ and G are expressed by their values at 25±1° C.; and M represents a molecular weight.

In this connection, in the present specification, when $\delta$ is calculated in the unit system of $(cal \cdot m^3)^{1/2}$, its value may appropriately be converted into a value in the unit system of $(Jm^{-3})^{1/2}$.

For example, solubility parameters or $\delta$ values are used, which are shown in publications such as Polymer Handbook, Third Edition (published by WILLEY SCIENCE, pp. 527 to 539) and Kagaku Binran Kiso-hen (Chemical Handbook Basic Edition) (edited by the Chemical Society of Japan). If solubility parameters or $\delta$ values are not shown in the above publications, $\delta$ values are used, which are calculated by assigning Holly's cohesive energy constants shown on page 525 of Polymer Handbook, Third Edition (published by WILLEY SCIENCE) to the Small's formula shown on page 524.

In the present invention (cases 2 and 3), if a specific amount of such a specific compound is optionally used in a monomer, the relationship between "absorbency" and "water-soluble polymer", which are conflicting basic properties of a water absorbent resin, can be improved. This makes it easy to control polymerization reaction, and makes it possible to produce, with high productivity, a water absorbent resin that is less likely to be colored and that has high absorption properties. It is not preferred to use a monomer containing lower than 1 ppm of an organic compound inert to polymerization, having a solubility parameter of $1.0 \times 10^4$ to $2.5 \times 10^4$ $(Jm^{-3})^{1/2}$. This is because, depending on the type of polymerization method, the temperature of a polymer may be excessively increased due to heat generation at the time of polymerization, and thus polymerization control may become difficult, leading to deterioration in absorption properties. When a monomer containing greater than 1,000 ppm of an organic compound inert to polymerization is used, since such an amount is excessive for the intended purpose, the water-absorption performance may be reduced, or the organic compound inert to polymerization may remain in a water absorbent resin to be finally obtained, and thereby cause, for example, a problem about the odor of the water absorbent resin.

In addition, when the specific compound (organic compound inert to polymerization) is used, and especially when it is contained in acrylic acid, it is finally removed by a specific heating step (e.g., drying, surface treatment) to prevent a water absorbent resin from generating an odor or the like.

The organic compound inert to polymerization may optionally be used, and its amount may be 0 to 1,000 ppm, preferably 1 to 1,000 ppm, more preferably 1 to 500 ppm, still more preferably 1 to 300 ppm, further still more preferably 5 to 300 ppm, particularly preferably 10 to 300 ppm, and most preferably 10 to 100 ppm, relative to a monomer (acrylic acid composition).

The solubility parameter of the organic compound inert to polymerization should necessarily be $1.0 \times 10^4$ to $2.5 \times 10^4$ $(Jm^{-3})^{1/2}$ and may preferably be $1.0 \times 10^4$ to $2.2 \times 10^4$ $(Jm^{-3})^{1/2}$, more preferably $1.1 \times 10^4$ to $2.0 \times 10^4$ $(Jm^{-3})^{1/2}$, still more preferably $1.3 \times 10^4$ to $2.0 \times 10^4$ $(Jm^{-3})^{1/2}$, and most preferably $1.5 \times 10^4$ to $1.9 \times 10^4$ $(Jm^{-3})^{1/2}$.

Organic compounds having a solubility parameter of $1.0 \times 10^4$ to $2.5 \times 10^4$ $(Jm^{-3})^{1/2}$ mean organic compounds that are highly compatible with acrylic acid and have no polymerizable unsaturated bond, that is, oleophilic organic compounds. In such organic compounds inert to polymerization, organic compounds having no halogen may be preferred, and hydrocarbons consisting of only carbon and hydrogen may be more preferred, from the viewpoint of environmental load. In addition, organic compounds having a boiling point of 95° C. to 300° C. may be preferred, and organic compounds having a boiling point of 130° C. to 260° C. may be more preferred. When the solubility parameter is higher than $2.5 \times 10^4$ $(Jm^{-3})^{1/2}$, it is not preferred from the viewpoint of polymerization control and reactivity.

More specifically, the organic compound inert to polymerization is at least one compound selected from the group consisting of heptane (boiling point, 95° C.), dimethylcyclohexane (boiling point, 132° C.), ethylcyclohexane (boiling point, 101° C.), toluene (boiling point, 110° C.), ethylbenzene (boiling point, 136° C.), xylene (138° C. to 144° C.), diethyl ketone (boiling point, 101° C.), diisopropyl ketone (boiling point, 124° C. to 125° C.), methyl propyl ketone (boiling point, 102° C.), methyl isobutyl ketone (boiling point, 116° C.), n-propyl acetate (boiling point, 101° C.), n-butyl acetate (boiling point, 124° C. to 125° C.), diphenyl ether (boiling point, 259° C.), and diphenyl (boiling point, 255° C.).

In these organic compounds inert to polymerization, at least one compound may be preferred, which is selected from the group consisting of heptane, ethylbenzene, xylene, methyl isobutyl ketone, methyl t-butyl ketone, diphenylether, and diphenyl. A hydrophobic compound may be more preferred, and an aromatic compound may be still more preferred. From the viewpoint of polymerization properties and productivity, and also from the viewpoint of preventing polymer chains from being oxidized and degraded after completion of the polymerization step, toluene, diphenylether, and diphenyl may particularly be preferred, and toluene may be most preferred.

The organic compound inert to polymerization may preferably be contained in a monomer or acrylic acid before polymerization. As the preparation method, the organic compound inert to polymerization may be added to a monomer, i.e., after completion of preparation of acrylic acid or a monomer, or may be added to a monomer, i.e., at the time of preparation of acrylic acid, or may previously be contained in or added to the raw materials of a monomer, i.e., the constituent components of acrylic acid, such as acrylic acid, a crosslinking agent, water, and an alkali compound. Above all, the organic compound inert to polymerization may preferably be dissolved or contained previously in acrylic acid since the organic compound inert to polymerization is hydrophobic and usually insoluble in water. In the present invention (cases 2 and 3), it is preferred that the organic compound inert to polymerization may previously be contained in or added to acrylic acid to be used for preparation of a monomer. That is, it is preferred that the organic compound inert to polymerization may previously be dissolved or contained in unneutralized acrylic acid, and an aqueous solution of a monomer may be prepared using the unneutralized acrylic acid.

Such acrylic acid as described above can be obtained by, for example, a method of blending an organic compound inert to polymerization into an acrylic acid composition by the use of an organic compound inert to polymerization, having a solubility parameter of $1.0 \times 10^4$ to $2.5 \times 10^4$ $(Jm^{-3})^{1/2}$ in the step of producing acrylic acid or in the step of producing an acrylic acid composition; and removing a certain amount of the organic compound inert to polymerization in the purification step and allowing a certain amount of the organic compound inert to polymerization to remain in an acrylic acid composition to be finally obtained.

(Basic Composition; Common to Cases 1 to 3)

In the present specification, the "basic composition" used for neutralization means a composition containing a basic compound. In the present invention, the basic composition may preferably contain, in addition to the basic compound, iron, more specifically, a compound containing iron described below.

As the basic compound used in the present invention, there can be exemplified carbonates of alkali metals, hydrogen carbonates of alkali metals, hydroxides of alkali metals, ammonia, and organic amines. In order to obtain a water absorbent resin having more excellent physical properties, strong alkali substances, that is, hydroxides of alkali metals, such as sodium hydroxide, potassium hydroxide, and lithium hydroxide, may be preferred, and sodium hydroxide may particularly be preferred. In this connection, sodium hydroxide usually contains about 0% to about 5% by mass of sodium carbonate or sodium chloride, and sodium hydroxide containing a usual amount of sodium carbonate or sodium chloride may also be suitable for use in the present invention.

As disclosed in Patent Document 37, it has been known that when the amount of heavy metal in a monomer aqueous solution is greater than 0.1 ppm, the amount of residual monomers in a water absorbent resin is increased. However, it has been found that polymerization time is shortened, the amount of water solubles is decreased, and coloring is reduced, by the method of the present invention in which a monomer is prepared using acrylic acid containing specific minor components, and a basic composition containing a specific amount (0.007 to 7 ppm) of iron (preferably a basic composition containing iron and sodium hydroxide). In addition, Patent Document 3 discloses the distillation of acrylic acid and the treatment of sodium hydroxide with activated carbon, as methods of reducing the amount of heavy metal to 0.1 ppm or smaller, preferably 0.02 ppm or smaller. However, Patent Document 3 does not disclose methoxyphenols disclosed in the present invention. Even if 200 ppm or greater of methoxyphenols are contained in acrylic acid, when the acrylic acid (boiling point, 139° C.) is purified by distillation as disclosed in Patent Document 3, methoxyphenols which have high boiling points (boiling points, 113° C. to 115° C./5 mmHg, in the case of para-isomers) are removed, and the amount of methoxyphenols in the distilled acrylic acid becomes substantially 0 ppm (smaller than the detection limit). In addition, Patent Document 3 does not disclose that heavy metals are useful in polymerization for water absorbent resins.

That is, the basic composition (abbreviated as the base) used in the present invention contains a basic compound and iron. In cases 1 and 2, the basic composition necessarily contains iron in an amount of 0.01 to 10.0 ppm (calculated as the $Fe_2O_3$ content), relative to solid components of the basic composition. The iron content may preferably be 0.2 to 5.0 ppm, more preferably 0.5 to 4.0 ppm. In case 3, the iron content in the basic composition may be 0.007 to 7 ppm, preferably 0.14 to 3.5 ppm, and more preferably 0.35 to 2.8 ppm.

In this connection, in the present application which focuses on the absolute amount of Fe in iron itself or in a compound containing iron (e.g., $Fe_2O_3$ or its salts, iron hydroxide, iron complexes), the iron content calculated as the $Fe_2O_3$ content in the present invention represents the absolute amount of iron as the amount of $Fe_2O_3$ (molecular weight, 159.7) which is a typical iron compound. The amount of Fe (Fe in $Fe_2O_3$) can be calculated from the molecular weight of $Fe_2O_3$ as follows: the iron content in the present application (calculated as the $Fe_2O_3$ content)× 55.85×2/159.7). That is, when the iron content calculated as the $Fe_2O_3$ content is 0.01 to 10.0 ppm, the amount of Fe is 0.007 to 7 ppm.

When the iron content (calculated as the $Fe_2O_3$ content) in a base used for neutralization is 0.01 ppm or lower, in other words, when the amount of Fe is 0.007 ppm or smaller, there is a fear that polymerization may occur before the addition of a polymerization initiator, and in addition, there is also a possibility that the polymerization may be decelerated despite the addition of an initiator. Iron used in the present invention may be Fe ion. From the viewpoint of effects, trivalent iron may be preferred, and iron hydroxide and $Fe_2O_3 \cdot nH_2O$ may particularly be preferred.

(Neutralization of Acrylic Acid; Common to Cases 1 to 3)

In the production method of a water absorbent resin according to the present invention, acrylic acid may preferably be neutralized, and may preferably be circulated before and/or during neutralization. The following will describe a preferred neutralization method and a preferred circulation method of acrylic acid.

(Circulation of Acrylic Acid and Neutralization System Thereof; Common to Cases 1 to 3)

First, the following will describe, with reference to the drawings, the circulation of acrylic acid and a neutralization system thereof in preferred embodiments of the production method of a water absorbent resin according to the present invention.

Figure 2:
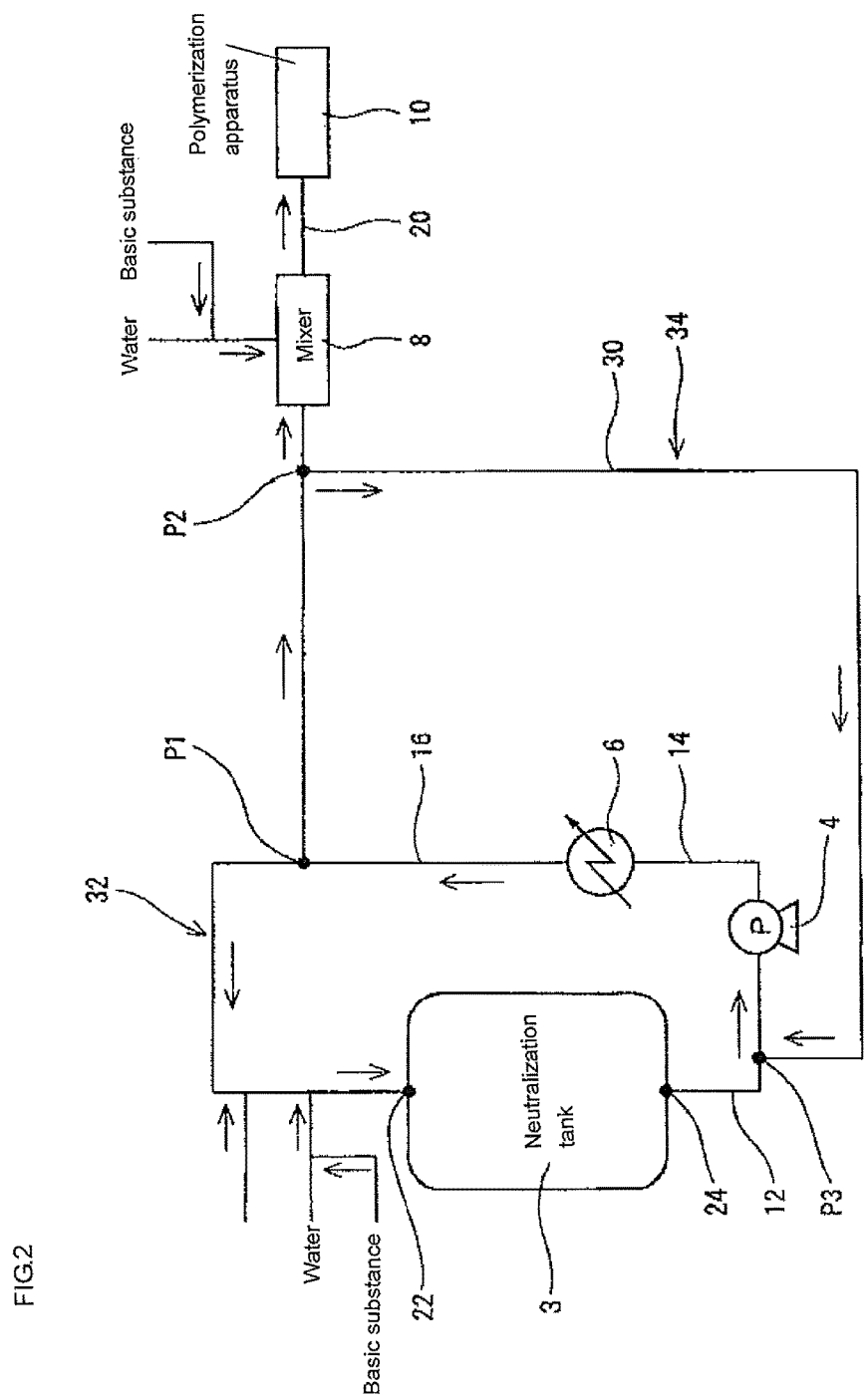
FIG. 2 is a conceptual diagram showing an apparatus (in which a neutralization system is circulated) used for a production method according to another preferred embodiment of the present invention.

FIG. 1 is a conceptual diagram showing equipment 2 used in a preferred embodiment (in which a neutralization system is circulated) of the production method of the present invention, and FIG. 2 is a conceptual diagram showing equipment 26 used in another preferred embodiment of the production method of the present invention. In FIGS. 1 and 2, a neutralization tank is used as a storage tank for acrylic acid (in which acrylic acid is circulated), and an aqueous monomer solution is regarded as acrylic acid supplied from the acrylic acid production step by a pipeline. Circulated acrylic acid is diluted with water, if necessary, to be the aqueous monomer solution shown in FIGS. 1 and 2. The aqueous monomer solution is further circulated and neutralized, and then supplied to a polymerization apparatus.

In the present invention, the circulation of a neutralization system and acrylic acid may be preferred; however, such circulation is not essential. In addition, the equipment 2 and the equipment 26 are only exemplary embodiments of the present invention, and the technical scope of the present invention is not limited by the pieces of equipment shown in FIGS. 1 and 2.

The equipment 2 shown in FIG. 1 includes a neutralization tank 3, a pump 4, a heat exchanger 6, a line mixer 8, a polymerization apparatus 10, a first pipe 12, a second pipe 14, a third pipe 16, a fourth pipe 18, and a fifth pipe 20. The equipment 26 shown in FIG. 2 further includes a sixth pipe 30, in addition to the components of the equipment 2 shown in FIG. 1.

In FIGS. 1 and 2, the neutralization tank 3 has an inlet 22 and an outlet 24. The first pipe 12 connects the outlet 24 and the pump 4. The second pipe 14 connects the pump 4 and the heat exchanger 6. The third pipe 16 connects the heat exchanger 6 and the inlet 22. The fourth pipe 18 connects a point P1 on the third pipe 16 and the line mixer 8. The fifth pipe 20 connects the line mixer 8 and the polymerization apparatus 10.

Further, in FIG. 2, the sixth pipe 30 connects a point P2 on the fourth pipe 18 and a point P3 on the first pipe 12.

In FIGS. 1 and 2, the first pipe 12, the second pipe 14, and the third pipe 16 form a closed flow path (hereinafter occasionally referred to as a "first loop 32").

Further, in FIG. 2, a part of the first pipe 12, the second pipe 14, a part of the third pipe 16, a part of the fourth pipe 18, and the sixth pipe 30 form a closed flow path (hereinafter occasionally referred to as a "second loop 34"). In this connection, the first loop 32 and the second loop 34 may be occasionally referred to as a "circulation loop".

In the present invention, the "closed loop" means a pipe system in which the start point and the end point of a liquid flow coincide with each other. The pipe system may include apparatuses such as a tank, a heat exchanger, and a pump, as long as the start point and the end point coincide with each other. The pipe system may be a closed flow path having a carved shape (a loop in a narrow sense), or may be a polygonal closed flow path formed by joining a plurality of linear pipes. The closed flow path may be three-dimensionally placed.

In the present invention, an apparatus group including the neutralization tank 3, the pump 4, the heat exchanger 6, and the first loop 32 (and further including the second loop 34 in the case of FIG. 2) is referred to as a "neutralization system". A mixed liquid described below in detail is circulated in the neutralization system. Further, in the present invention, the concept "circulation" may include not only the circulation of a mixed liquid in the closed flow path, but also the agitation of a mixed liquid by an agitation blade provided inside the neutralization tank 3.

Further, in the present invention, an apparatus group including the line mixer 8, the fifth pipe 20, and the polymerization apparatus 10 is referred to as a "polymerization system". In the polymerization system, a monomer component contained in a mixed liquid described below is polymerized to obtain a polymer gel. In addition, the polymerization system may include apparatuses, pipes, and the like, for adding, to the mixed liquid, a polymerization initiator, an internal crosslinking agent, a basic substance, and the like. Further, the polymerization system may include a plurality of the same apparatuses and pipes. More specifically, the polymerization system may include two or more polymerization apparatuses.

In the production method of a water absorbent resin according to the present invention, a liquid containing acrylic acid, and an aqueous basic solution, may preferably be supplied to the neutralization system continuously. In this connection, the liquid containing acrylic acid necessarily contains acrylic acid, and the aqueous basic solution means an aqueous solution obtained by mixing a basic substance (e.g., sodium hydroxide) and water.

In the production method of a water absorbent resin according to the present invention, acrylic acid may preferably be supplied to the acrylic acid storage step continuously from the acrylic acid production step or from acrylic acid transportation means such as a tanker and a tank lorry.

In the apparatus 2 and the apparatus 26 according to the present invention, the liquid containing acrylic acid and the aqueous basic solution are continuously supplied to the third pipe 16, and sent to the neutralization tank 3. It may be preferred to supply the liquid containing acrylic acid and the aqueous basic solution to the third pipe 16 as described above, instead of directly supplying the liquid containing acrylic acid and the aqueous basic solution to the neutralization tank 3, because by doing so, the efficiency of mixing these liquids can be enhanced. However, the effects of the present invention can be attained, even when the above method is changed to a method of directly supplying the liquid containing acrylic acid and the aqueous basic solution to the neutralization tank 3.

By the above operation, a mixed liquid can be obtained which contains an acrylate obtained by the neutralization reaction between acrylic acid and the basic substance. The mixed liquid is circulated in the first loop 32 (and further in the second loop 34 in the case of FIG. 2) by the operation of the pump 4. At this time, heat of neutralization is generated due to the neutralization reaction between acrylic acid and the basic substance. However, the temperature of the mixed liquid can be adjusted to and maintained in a desired range by cooling or heating the mixed liquid with the heat exchanger 6 located in the first loop 32. In this manner, a prescribed degree of neutralization can be achieved.

In the present invention, part of the mixed liquid circulating in the neutralization system is continuously supplied to the polymerization system. In the polymerization system, in order to further increase the degree of neutralization of the mixed liquid, a basic substance may continuously be supplied to the mixed liquid, if necessary. In this case, it may be preferred to carry out the mixing in the line mixer 8 from the viewpoint of mixing efficiency. In addition, an internal crosslinking agent, a polymerization initiator, and the like, may be added to the mixed liquid. In this case, although not shown in the figures, it may be preferred to add an internal crosslinking agent, a polymerization initiator, and the like, in the line mixer 8, or upstream or downstream from the line mixer 8, from the viewpoint of mixing efficiency.

By continuously supplying the mixed liquid to the polymerization apparatus 10, polymerization reaction may occur to produce a polymer gel (a water-containing gel-like crosslinked polymer). A particulate water absorbent resin can be obtained by subjecting the polymer gel to treatments such as drying described below.

In this connection, in the present invention, it may be preferred that the circulation of the mixed liquid in the neutralization system, the supply of the mixed liquid to the polymerization system, and the polymerization of the mixed liquid, may proceed concurrently with each other.

In the present invention, the materials of the apparatuses and pipes constituting the equipment 2 and the equipment 26 are not particularly limited. Preferably, stainless steel is used.

The inner surfaces of the equipments may preferably have mirror finish. This mirror finish makes it possible to reduce the suffering of damage to water absorbent resin powder. The damage reducing effect is further enhanced by applying mirror finish to stainless steel. As the stainless steel, there can be mentioned, for example, SUS304, SUS316, and SUS316L.

In the present invention, the surface roughness (Rz) defined in JIS B 0601-2001 on the inner surface may be controlled to not greater than 800 nm. The surface roughness (Rz) may preferably be smoothed to be not greater than 500 nm, more preferably not greater than 300 nm, still more preferably not greater than 200 nm, particularly preferably not greater than 185 nm, and most preferably not greater than 170 nm. In this connection, the surface roughness (Rz) means the maximum value of the maximum height (nm) of surface irregularities. The lower limit of the surface roughness (Rz) may be 0 nm, but there is no significant difference even when the surface roughness (Rz) is about 10 nm, and it is sufficient even when the surface roughness (Rz) is about 10 nm or further about 20 nm. The other surface roughness (Ra) is also defined in JIS B 0601-2001, and its preferred value may be regarded as being the same as that of Rz. Ra may more preferably be not greater than 250 nm, particularly preferably not greater than 200 nm. Such a surface roughness can be measured by a stylus type surface roughness tester according to JIS B 0651-2001.

(Mathematical Formulas 2 and 3; Common to Cases 1 to 3)

In the present invention, it may be preferred to define the relationship between the retention time of the mixed liquid in the neutralization system and the contact area of the mixed liquid with the apparatuses and pipes constituting the neutralization system. That is, in the production method of the present invention, a value X1 defined by the following mathematical formula 2 is 300 or less.

$$X1=(V1/F1)\cdot A1 \qquad \text{[Mathematical Formula 2]}$$

In mathematical formula 2, V1 [kg] is the amount of the mixed liquid present in the neutralization system, F1 [kg/hr] is the flow rate of the mixed liquid supplied to the polymerization system, and A1 [m²] is the contact area between the mixed liquid present in the neutralization system, and the apparatuses and pipes constituting the neutralization system. Accordingly, V1/F1 [hr] means the retention time of the mixed liquid in the neutralization system.

Further, in the present invention, it may be preferred to include the step of circulating acrylic acid in the storage tank, and the step of continuously supplying part of the circulating acrylic acid to the polymerization system, and a value X2 calculated by the following mathematical formula 3 may be not greater than 300.

$$X2=(V2/F2)\cdot A2 \qquad \text{[Mathematical Formula 3]}$$

In mathematical formula 3, V2 [kg] is the amount of acrylic acid before neutralization, F2 [kg/hr] is the flow rate of acrylic acid supplied to the neutralization system, and A2 [m²] is the contact area between the acrylic acid, and the apparatuses and pipes constituting the neutralization system.

"The amount of the mixed liquid present in the neutralization system (V1)" means the total amount of the mixed liquid present in the neutralization tank 3, the pump 4, the heat exchanger 6, and the first loop 32 (and the second loop 34 in the case of FIG. 2). That is, when the amount of the mixed liquid present in the neutralization tank 3 is V1a; the amount of the mixed liquid present in the pump 4 is V1b; the amount of the mixed liquid present in the heat exchanger 6 is V1c; and the amount of the mixed liquid present in the pipes constituting the circulation loop is V1d, the sum of them (V1a+V1b+V1c+V1d) is the amount of the mixed liquid present in the neutralization system. Accordingly, the mixed liquid present in the neutralization system does not include liquids present in apparatuses, pipes, and the like, which are not included in the circulation loop. When apparatuses, pipes, and the like, which are not shown, are present in the circulation loop, liquids present in these apparatuses, pipes, and the like, are included in the mixed liquid present in the neutralization system. In addition, V2 [kg] is the amount of acrylic acid before neutralization, that is, "the amount of acrylic acid present in the storage system for acrylic acid", and can be calculated in the same manner as the case of V1.

"The amount of the mixed liquid present in the neutralization system" and "the amount of acrylic acid present in the storage system for acrylic acid" are not particularly limited, but may preferably be 100 to 30,000 kg, more preferably 200 to 10,000 kg.

In a stationary state, the total amount of the liquids supplied to the neutralization system and the total amount of the mixed liquid supplied to the polymerization system are usually equal to each other, and therefore, the amount of the mixed liquid present in the neutralization system is constant. However, there may be a case where the balance between the amount of the liquids supplied to the neutralization system and the amount of the mixed liquid supplied to the polymerization system is disturbed, and thus the amount of the mixed liquid present in the neutralization system varies. In such a case, the value X1 can be obtained by measuring the amount of the liquid every prescribed time (e.g., 1 hour) and using an arithmetic average value of the measurement values.

"The flow rate of the mixed liquid supplied to the polymerization system (F1)" is measured by a flow meter provided in the pipe that connects the neutralization system and the polymerization system (more specifically, the fourth pipe 18 in the case of the equipment 2, and the pipe between the point P2 and the line mixer 8 in the case of the equipment 26). Usually, the flow rate can be calculated by dividing the total amount of the mixed liquid supplied to the polymerization system by the operation time. The flow rate is not particularly limited, but may preferably be 30 to 30,000 kg/hr, more preferably 100 to 10,000 kg/hr. "The flow rate of acrylic acid supplied to the neutralization system (F1)" can also be calculated in the same manner as above.

"The contact area (A1) between the mixed liquid present in the neutralization system, and the apparatuses and pipes constituting the neutralization system" means the contact area between the mixed liquid and the inner surfaces of all components in the neutralization system, such as tanks, apparatuses, and pipes. That is, when the contact area between the mixed liquid present in the neutralization tank 3 and the inner surface of the neutralization tank 3 is A1a; the contact area between the mixed liquid present in the pump 4 and the inner surface of the pump 4 is A1b; the contact area between the mixed liquid present in the heat exchanger 6 and the inner surface of the heat exchanger 6 is A1c; and the contact area between the mixed liquid present in the pipes constituting the circulation loop and the inner surfaces of the pipes constituting the circulation loop is A1d, the sum of them (A1a+A1b+A1c+A1d) is the contact area between the mixed liquid present in the neutralization system, and the apparatuses and pipes constituting the neutralization system. Accordingly, the contact area does not include the contact area between the mixed liquid present in apparatuses, pipes, and the like, which are not included in the circulation loop, and the inner surfaces of such apparatuses and pipes. When apparatuses, pipes, and the like, which are not shown, are present in the circulation loop, the contact area includes the contact area between the liquid present in these apparatuses, pipes, and the like, and the inner surfaces of the apparatuses, pipes, and the like. A2 [m²] is the contact area between acrylic acid, and the apparatuses and pipes constituting the neutralization system, and can be calculated in the same manner as described above.

Further, in the present invention, the tank, the devices, the pipes, and the like, need not be filled with the mixed liquid, and an empty portion may be present. In this case, the contact area described above means the area of the portion actually contacting with the mixed liquid, and does not include the area of the empty portion.

There is no particular limitation on the empty portion. For example, the neutralization tank 3 or an acrylic acid storage tank 3' may have an empty portion of 50 to 90 vol % of the volume of the neutralization tank. Further, in this case, from the viewpoint of preventing the polymerization of the mixed liquid, it may be preferred that the empty portion is sealed with a mixed gas of oxygen and/or an inert gas in which the concentration of oxygen is previously adjusted.

In a stationary state, the total amount of the liquids supplied to the neutralization system and the total amount of the mixed liquid supplied to the polymerization system are usually equal to each other, and therefore, the contact area between the mixed liquid present in the neutralization system, and the apparatuses and pipes constituting the neutralization system is constant. However, there may be a case where the balance between the amount supplied to the neutralization system and the amount supplied to the polymerization system is disturbed, and thus the amount of the mixed liquid present in the neutralization system varies. In such a case, the value X1 can be calculated by measuring the amount of the liquid every prescribed time (e.g., 1 hour) and obtaining an average contact area by means of an arithmetic average value of the measurement values. In the storage system for acrylic acid, the value X2 can be calculated in the same manner as described above.

In the present invention, the water content in acrylic acid containing a prescribed amount of a polymerization inhibitor may be set to be not higher than 1,000 ppm, and the value X1 calculated by mathematical formula 1 may be controlled to be not greater than 300, preferably 0.5 to 200, more preferably 1 to 70, still more preferably 10 to 65, and even still more preferably 20 to 62. By doing so, particulate water absorbent resin excellent in whiteness can be obtained.

In the present invention, the water content in acrylic acid containing a prescribed amount of a polymerization inhibitor may be set to be not higher than 1,000 ppm, and the value X2 calculated by mathematical formula 2 may be controlled to be not greater than 300, preferably 0.5 to 200, more preferably 1 to 70, still more preferably 10 to 65, and even still more preferably 20 to 62. By doing so, a particulate water absorbent resin excellent in whiteness can be obtained.

The positions of the points P1, P2, and P3 in the present invention are not particularly limited. The points P1, P2, and P3 may be located on the third pipe 16, the fourth pipe 18, and the first pipe 12, respectively. It may be preferred for the reason described below that make the position of the point P2 closer to the polymerization system.

When the operation of the polymerization system is stopped due to troubles of equipments, for maintenance, or the like, the supply of the mixed liquid to the polymerization system is also stopped. At this time, the mixed liquid is retained in the pipe connecting the neutralization system and the polymerization system, and the quality of the mixed liquid is deteriorated because of chemical reactions and the like. From the viewpoint of the quality of a particulate water absorbent resin, the mixed liquid having been retained is discarded.

Meanwhile, the mixed liquid in the circulation loop may circulate without being influenced by the operation state of the polymerization system. Accordingly, if the position of the point P2 is made closer to the polymerization system, the amount of the mixed liquid to be discarded can be reduced, and the length of a pipe for washing can be shortened. This can result in an enhancement of the productivity.

In addition, in a production plant for particulate water absorbent resins, there may be a case where the neutralization system and the polymerization system are located distant from each other for convenience of layout. In such a case, a particularly remarkable effect can be exhibited. Further, since the temperature of the mixed liquid can be kept optimal in the circulation loop, a remarkable effect is exhibited in resuming the polymerization.

In the equipment 26 including the two circulation loops, the mixed liquid of the neutralization tank 3 is circulated in the first loop 32, brought into the second loop 34 from the neutralization tank 3 or the first loop 32, carried to a position closer to the polymerization system than to the first loop 32, and then returned to the neutralization tank 3 or the first loop 32.

In this connection, when the length from the point P1 to the point P2 is Lb, and the length from the point P2 to the line mixer 8 is La in the fourth pipe 18 of the equipment 26, the length La may preferably be not longer than 20 m, more preferably not longer than 10 m. Further, the ratio of both the lengths (Lb/La) may preferably be not lower than 10, more preferably not lower than 20, and still more preferably not lower than 30. By satisfying these ranges, low cost and high productivity can be achieved.

In addition, when the total length of the first loop 32 is Lc and the total length of the second loop 34 is Ld in the equipment 26, their ratio (Ld/Lc) may preferably be not lower than 10, more preferably not lower than 20, and still more preferably not lower than 30. By setting the ratio (Ld/Lc) in this range, low cost and high productivity can be achieved.

(Neutralization Step; Common to Cases 1 to 3)

The neutralization step in the present invention is carried out in the neutralization system shown in FIG. 1 or 2, and the liquid (mixed liquid) containing a monomer, and the basic aqueous solution which have been described above are continuously supplied. In addition, from the viewpoint of handleability, it may be preferred that the mixed liquid is an aqueous solution, regardless of the monomer state (the solid or liquid state at normal temperature). In this connection, in the present invention, the "normal temperature" means a temperature in a range of 20° C. to 30° C.

Accordingly, the mixed liquid may preferably be 10% to 99% by mass of an aqueous monomer solution, more preferably 50% to 100% by mass of an aqueous acrylic acid solution. In addition, the temperature of the mixed liquid may preferably be 0° C. to 50° C., more preferably 25° C. to 50° C.

Further, when acrylic acid and other monomers are used in combination, the acrylic acid may preferably be used as a major component. In this case, the acrylic acid content, relative to the total amount of the monomers, may preferably be not lower than 50 mol %, more preferably not lower than 80 mol %, and still more preferably not lower than 95 mol % (the upper limit thereof is 100 mol %).

In the present invention, it may be preferred to supply, to the neutralization system, purified acrylic acid obtained through a crystallization step and/or a distillation step. At this time, from the viewpoint of reducing the amount of residual monomers in a particulate water absorbent resin and preventing coloring of the particulate water absorbent resin, the acrylic acid may preferably be supplied within 96 hours, more preferably within 72 hours, still more preferably within 48 hours, particularly preferably within 24 hours, and most preferably within 12 hours, after the crystallization step and/or the distillation step for acrylic acid.

In the present invention, it may be preferred that a production facility for acrylic acid serving as an acid group-containing monomer and the facility of the above neutralization system is built so as to be adjacent to each other, and directly connected to each other by piping (a pipeline). The length of the pipeline is not particularly limited, but may preferably be not greater than 30 km, more preferably not greater than 10 km, and still more preferably not greater than 5 km. A storage tank for acrylic acid may be provided in the middle of the pipeline, if necessary. Conventionally, storage and transportation in a production facility for acrylic acid require a certain time, and therefore, it takes about 1 week to several tens of days until acrylic acid is supplied to the neutralization system after being produced, which becomes responsible for the coloring of particulate water absorbent resins. However, the above pipeline allows acrylic acid to be supplied to the neutralization system within a short time, thereby preventing the coloring of particulate water absorbent resins.

In addition, it may be preferred that the temperature of acrylic acid is low when it is transported by the pipeline and when it is stored. More specifically, the temperature of acrylic acid may preferably be not higher than 30° C., more preferably in a range of the melting point thereof to 25° C. In this connection, when acrylic acid needs to be stored, the size of a storage tank may appropriately be determined by the production amount and is, for example, 1 to 500 m$^3$.

In addition, the type of the basic aqueous solution is not particularly limited, so long as it is neutralized with the monomer described above to produce a salt (e.g., a salt of sodium, lithium, potassium, ammonium, or an amine). From the viewpoint of performance and cost of a particulate water absorbent resin to be obtained, a basic aqueous solution for producing a salt of sodium may be preferred, and more specifically, an aqueous solution of sodium hydroxide may be preferred.

In addition, from the viewpoint of handleability, it may be preferred that the basic aqueous solution is an aqueous solution, regardless of the basic substance state (the solid or liquid state at normal temperature). Accordingly, the concentration of the basic aqueous solution may preferably be 5% to 80% by mass, more preferably 10% to 50% by mass. In addition, the temperature of the basic aqueous solution may preferably be 0° C. to 50° C., more preferably 25° C. to 50° C.

In the present invention, all of various acid group-containing monomers, particularly acrylic acid, supplied to the neutralization system, needs not be neutralized. Usually, part of acrylic acid remains unneutralized. That is, unneutralized acrylic acid and an acrylic acid salt are contained in the mixed liquid present in the neutralization system. In the present invention, unneutralized acrylic acid and a salt produced by neutralization are collectively referred to as a "monomer component".

In the present invention, the degree of neutralization of acrylic acid may preferably be 10 to 90 mol %, more preferably 20 to 80 mol %, and still more preferably 25 to 75 mol %. If the degree of neutralization of acrylic acid is controlled to be within the above range, the amount of residual monomers in a particulate water absorbent resin can be reduced, and a particulate water absorbent resin excellent in whiteness can be obtained.

In the present invention, the concentration of the monomer component (hereinafter, occasionally referred to as the "monomer concentration") in the mixed liquid present in the neutralization system may preferably be 30% to 70% by mass, more preferably 30% to 65% by mass, and still more preferably 45% to 65% by mass. If the monomer concentration is controlled to be within the above range, excellent productivity can be achieved, and the whiteness of a water absorbent resin is improved.

In the present invention, the temperature of the mixed liquid present in the neutralization system may preferably be 20° C. to 60° C., more preferably 30° C. to 50° C. If the temperature of the mixed liquid is controlled to be within the above range, polymerization reaction and generation of impurities can be inhibited.

In the present invention, the retention time (V/F) of the mixed liquid in the neutralization system may preferably be 0.1 to 10 hours, more preferably 0.1 to 5 hours, still more preferably 0.1 to 2 hours, and particularly preferably 0.1 to 1.7 hours. If the retention time is controlled to be within the above range, a particulate water absorbent resin with high whiteness can be obtained, and in addition, the amount of residual monomers in the particulate water absorbent resin can be reduced.

In the present invention, the flow rate F of the mixed liquid supplied to the polymerization system may preferably be 30 to 30,000 [kg/hr], more preferably 100 to 25,000 [kg/hr], and still more preferably 2,000 to 20,000 [kg/hr]. If the flow rate is controlled to be within the above range, a particulate water absorbent resin excellent in whiteness can be obtained, and excellent productivity can be achieved.

In addition, in the present invention, neutralization treatment may be carried out also in the polymerization step described below. In this case, the basic aqueous solution is further supplied in line mixer 8 to the mixed liquid supplied to the polymerization system. By this operation, the degree of neutralization can be increased. The degree of neutralization of the acid group-containing monomer may preferably be 30 to 90 mol %. In this connection, in the present invention, the neutralization treatment in the polymerization system is referred to as the "second-stage neutralization".

[3] Production Method of Polyacrylic Acid (Salt)-Based Water Absorbent Resins (Common to Cases 1 to 3)

The following will describe a production method of polyacrylic acid (salt)-based water absorbent resins, which is general or advantageous to the present invention. The step of adding a cationic polymer, which is a constituent feature of the invention of case 3, will be described below in (3-7). Accordingly, (3-1) to (3-6) are common to cases 1 to 3.

In addition, as described in "[2] Acrylic Acid (Salt)", formic acid, which is a constituent feature of the inventions in cases 2 and 3, is contained in an aqueous monomer solution, and/or is added in any one or two or more of the following steps (3-1) to (3-8). Preferably, formic acid is contained in an aqueous monomer solution, or is added in a gel grain refining step (3-2) or a cationic polymer addition step (3-7). Particularly preferably, formic acid is contained in an aqueous monomer solution, or is added in the cationic polymer addition step (3-7). In this connection, polyvinylamine (unhydrolyzed poly(N-vinylformamide) may be contained therein), which is a cationic polymer, and formic acid can be added at the same time in the cationic polymer addition step (3-7), and therefore, the process is simplified, which is advantageous.

The amount of formic acid to be added, in the case where formic acid is contained in an aqueous monomer solution, has been described above. In the case where formic acid is added in the following steps (3-1) to (3-8), although depending on the amount of a cationic polymer to be used, the amount of formic acid to be added may be 0.01% to 5% by mass, relative to a water absorbent resin (or solid components of a water-containing gel-like crosslinked polymer), and may preferably be within the range described below.

(3-1) Polymerization Step

A water absorbent resin used for the particulate water absorbent resin of the present invention has a constituent unit derived from acrylic acid. Preferably, the water absorbent resin has a constituent unit derived from acrylic acid as a main component. The production method of the water absorbent resin is not particularly limited. Preferably, the water absorbent resin is obtained by polymerizing a monomer component that includes acrylic acid and/or a salt thereof as a main component. In this connection, the constituent unit derived from the monomers corresponds to, for example, a structure in which the polymerizable double bonds of each monomer have been opened by polymerization reaction. The structure in which polymerizable double bonds have been opened means, for example, a structure in which double bonds between carbon atoms (C=C) have been changed to single bonds (—C—C—).

As an acrylic acid salt used in the present invention, a monovalent salt of acrylic acid is usually used, such as a salt of an alkali metal such as lithium, sodium, or potassium; an ammonium salt; and an amine salt. An alkali metal salt of acrylic acid may preferably be used, and a sodium salt or a potassium salt of acrylic acid may more preferably be used. In addition, a polyvalent salt such as a calcium salt and an aluminum salt may be used in combination, so long as water swellability is provided.

The water absorbent resin obtained in the present invention may preferably be partly neutralized. The degree of neutralization may preferably be not lower than 10 mol % and lower than 90 mol %, relative to the acid group, more preferably not lower than 40 mol % and lower than 80 mol %, relative to the acid group, and still more preferably not lower than 50 mol % and lower than 74 mol %, relative to the acid group. The case where the degree of neutralization is lower than 10 mol % is not preferred, because absorption performance, particularly absorbency, may significantly be reduced. In addition, the case where the degree of neutralization is 100 mol % or not lower than 90 mol % is not preferred, because a water absorbent resin with high absorption performance, particularly high absorbency against pressure, cannot be obtained, or coloring over time may become worsen. Further, from the viewpoint of coloring over time and absorption performance, the degree of neutralization may preferably be set to be lower than 74 mol %, particularly preferably lower than 72 mol %.

This neutralization may be carried out for monomer components before polymerization, or may also be carried out for a polymer during or after polymerization. Further, both the neutralization of monomer components and the neutralization of a polymer may be carried out in combination. Acrylic acid serving as the monomer component may preferably be neutralized.

The water content of the water absorbent resin obtained in the present invention may preferably be adjusted to be not higher than 10% by mass, more preferably not higher than 5% by mass, through the drying step and the like described below.

As the monomer, acrylic acid and/or a salt thereof (hereinafter, referred to as "acrylic acid (salt)" is used in the range described above, and other monomers may be used in combination. When other monomers are used in addition to acrylic acid (salt), the amount of other monomers to be used may be 0 to 50 mol %, preferably 0 to 30 mol %, and more preferably 0 to 10 mol %, relative to all the monomers (the total amount of monomers including acrylic acid (salt) used as a main component). The use of other monomers at the above proportion makes it possible to further improve the absorption properties of a water absorbent resin (and a water absorbent resin composition) finally obtained, and to further obtain a water absorbent resin (and a water absorbent resin composition) at a lower cost.

As monomers to be used in combination, there can be mentioned, for example, monomers exemplified in the U.S. and European Patents described below. More specifically, as monomers to be used in combination, there can be mentioned, for example, water-soluble or hydrophobic unsaturated monomers. As the water-soluble or hydrophobic unsaturated monomers, there can be mentioned, for example, methacrylic acid, maleic acid (anhydride), fumaric acid, crotonic acid, itaconic acid, vinylsulfonic acid, 2-(meth)acrylamido-2-methylpropane sulfonic acid, (meth)acryloxyalkane sulfonic acid, alkali metal salts thereof, ammonium salts thereof, N-vinyl-2-pyrrolidone, N-vinylacetamide, (meth)acrylamide, N-isopropyl(meth)acrylamide, N,N-dimethyl(meth)acrylamide, 2-hydroxyethyl(meth)acrylate, methoxy polyethylene glycol (meth)acrylate, polyethylene glycol (meth)acrylate, isobutylene, and lauryl (meth)acrylate. The polymer of the present invention may include those which contain any one of the above water-soluble or hydrophobic unsaturated monomers as a copolymerizable component.

The crosslinking method used in the present invention is not particularly limited, and there can be mentioned, for example, a method of adding a crosslinking agent during or after polymerization to cause post-crosslinking; a method of causing radical crosslinking by a radical polymerization initiator; and a method of causing radiation crosslinking by electron rays or the like. A preferred method is to cause crosslinking reaction at the same time as or after polymerization by previously adding a prescribed amount of an internal crosslinking agent to the monomer.

As the internal crosslinking agent to be used in the present invention, one kind, or two or more kinds, of internal crosslinking agents can be used, such as N,N'-methylenebisacrylamide, (poly)ethylene glycol di(meth)acrylate, (poly)propylene glycol di(meth)acrylate, (polyoxyethylene)trimethylolpropane tri(meth)acrylate, (polyoxyethylene)glycerol tri(meth)acrylate, trimethylolpropane di(meth)acrylate, polyethylene glycol di(β-acryloyloxypropionate), trimethylolpropane tri(β-acryloyloxypropionate), poly(meth)allyloxyalkane, polyethylene glycol diglycidyl ether, ethylene glycol, propylene glycol, glycerin, butanediol, erythritol, xylitol, sorbitol, and polyethylene glycol. In this connection, when one or more kinds of internal crosslinking agents are used, it may be preferred that compounds having two or more of polymerizable unsaturated groups are necessarily used at the time of polymerization, taking into consideration the absorption and other properties of a water absorbent resin to be obtained.

The amount of internal crosslinking agent to be used may preferably be 0.005 to 2 mol %, more preferably 0.01 to 1 mol %, and still more preferably 0.05 to 0.2 mol %, relative to the monomer. When the amount of internal crosslinking agent to be used is smaller than 0.005 mol % or higher than 2 mol %, there is a fear that desired absorption properties cannot be obtained.

In the case where reversed-phase suspension polymerization or aqueous solution polymerization is carried out in the polymerization step and a monomer component is used as an aqueous solution thereof, the concentration of the monomer component in the aqueous solution (hereinafter, referred to as the "aqueous monomer solution"), although it is not particularly limited to, may preferably 10% to 70% by mass, more preferably 15% to 65% by mass, and still more preferably 30% to 55% by mass, from the viewpoint of physical properties. In addition, in the case where aqueous solution polymerization or reversed-phase suspension polymerization is carried out, a solvent other than water may be used in combination, if necessary, and the kind of the solvent used in combination is not particularly limited.

In this connection, a water-soluble resin or a water absorbent resin may be added to the monomer, when polymerized, in an amount of, for example, 0% to 50% by mass, preferably 0% to 20% by mass, to improve the physical properties of a water absorbent resin. Further, various kinds of foaming agents (e.g., carbonates, azo compounds, air bubbles), surface-active agents, chelating agents, chain transfer agents, or the like, may be added to the monomer, when polymerized, in an amount of, for example, 0% to 5% by mass, preferably 0% to 1% by mass, to improve the physical properties of the water absorbent resin. In this connection, the use of a water-soluble resin or a water absorbent resin as described above at the time of polymerization provides a graft polymer or a water absorbent resin composition. In the present invention, a starch-acrylic acid polymer, a PVA-acrylic acid polymer, and the like, are generically referred to as a "polyacrylic acid (salt)-based water absorbent resin".

From the viewpoint of performance and ease of polymerization control, the unsaturated aqueous monomer solution may preferably be polymerized by aqueous solution polymerization or reversed-phase suspension polymerization. These types of polymerization can be carried out even under air atmosphere, and may preferably be carried out under atmosphere (e.g., the amount of oxygen is not greater than 1 vol %) of an inert gas such as nitrogen or argon. In addition, it may be preferred that the monomer component is used for polymerization after the dissolved oxygen has been sufficiently replaced by an inert gas (e.g., the amount of oxygen is smaller than 1 [mg/L]). The present invention is particularly suitable for aqueous solution polymerization to obtain water absorbent resins with high productivity and high physical properties, which polymerization has been difficult to control. As the particularly preferred types of aqueous solution polymerization, there can be mentioned continuous belt polymerization (disclosed in, for example, U.S. Pat. Nos. 4,893,999 and 6,241,928, and U.S. Patent Application Publication No. 2005/215734), and continuous or batch kneader polymerization (disclosed in, for example, U.S. Pat. Nos. 6,987,151 and 6,710,141).

The aqueous solution polymerization is a method of polymerizing an aqueous monomer solution without using a dispersion solvent, and is disclosed in, for example, U.S. Pat. Nos. 4,625,001, 4,873,299, 4,286,082, 4,973,632, 4,985,518, 5,124,416, 5,250,640, 5,264,495, 5,145,906, and 5,380,808, and European Patents Nos. 0811636, 0955086, 0922717, 1178059, 1711541, and 1799721. The monomers, crosslinking agents, polymerization initiators, and other additives disclosed in these patents can be applied in the present invention.

The reversed-phase suspension polymerization is a polymerization method of suspending an aqueous monomer solution in a hydrophobic organic solvent, and is disclosed in, for example, U.S. Pat. Nos. 4,093,776, 4,367,323, 4,446,261, 4,683,274, and 5,244,735.

Further, in the present invention, in the polymerization of the above monomer, the total time from the completion of the preparation of the monomer component to the start of the polymerization may preferably be as short as possible, in order to achieve an improvement in absorption properties and the prevention of yellowing, which are the problems to be solved by the present invention. The total time may preferably be not longer than 24 hours, more preferably not longer than 12 hours, still more preferably not longer than 3 hours, and particularly preferably not longer than 1 hour. In the case of industrial production, neutralization and preparation of the monomer component are carried out with a tank on a large scale, and therefore, it is usual that the retention time, that is, the total time is longer than 24 hours. However, it has been found that, as the time (the total time) after the preparation of the monomer component and/or the neutralization of acrylic acid becomes long, the amount of residual monomers is increased and a water absorbent resin becomes more likely to be yellowed. Thus, in order to shorten the retention time, it may be preferred that neutralization is continuously carried out, the monomer component is continuously prepared, and batch polymerization or continuous polymerization is carried out. Continuous polymerization may be more preferred.

In the aqueous solution polymerization methods, high-temperature polymerization may be preferred, in which the initiation temperature for the polymerization of an aqueous unsaturated monomer solution is not lower than 40° C., preferably not lower than 50° C., still more preferably not lower than 60° C., and particularly preferably not lower than 70° C. If the present invention is applied to water-containing gel-like crosslinked polymers obtained by such high-temperature polymerization (high-temperature initiation polymerization), the effects of the present invention can be exhibited to the maximum extent. In this connection, the upper limit of the initiation temperature is equal to or lower than the boiling point of the aqueous solution, preferably not higher than 105° C.

In addition, high-temperature polymerization (boiling polymerization) may be preferred, in which the peak temperature of polymerization may preferably be not lower than 95° C., more preferably not lower than 100° C., and still more preferably not lower than 105° C. If the present invention is applied to water-containing gel obtained by such boiling polymerization, the effects of the present invention, including particle size control, can be exhibited to the maximum extent. In this connection, the upper limit of the peak temperature may be satisfactory, if it is equal to or lower than the boiling point, preferably not higher than 130° C., and more preferably not higher than 120° C.

In this connection, the polymerization time is not particularly limited, but may appropriately be determined depending on the types of a hydrophilic monomer and a polymerization initiator, the reaction temperature, and other factors. The polymerization time may usually be 0.5 minutes to 3 hours, preferably 1 minute to 1 hour.

In polymerizing the aqueous monomer solution, polymerization initiators may be used, which include: persulfates such as potassium persulfate, ammonium persulfate, and sodium persulfate; hydroperoxides such as t-butyl hydroperoxide and hydrogen peroxide; azo compounds such as 2,2'-azobis(2-amidinopropane) dihydrochloride; 2-hydroxy-1-phenyl-propane-1-one; and benzoin methyl ether, and further include redox initiators using reducing agents such as L-ascorbic acid for promoting the decomposition of these polymerization initiators. The amount of polymerization initiator to be used may usually be 0.001 to 1 mol %, preferably 0.001 to 0.5 mol %, relative to the monomer.

In addition, polymerization reaction may be carried out by irradiating the reaction system with active energy rays such as radioactive rays, electron rays, and ultraviolet rays, instead of using a polymerization initiator. In addition, active energy rays, such as radioactive rays, electron rays, and ultraviolet rays, may be used in combination with a polymerization initiator.

In addition, it may be preferred that a chelating agent described below is added and polymerized to the aqueous monomer solution at the time of or during polymerization, from the viewpoint of more exhibiting the effects of the present invention.

(3-2) Gel Grain Refining Step

A water-containing gel-like crosslinked polymer obtained by polymerization may directly be dried, and is chopped, if necessary, with a gel pulverizer or other machines, followed by drying. The shape of the color-stable water absorbent resin particle of the present invention is not particularly limited, but can be any shape, such as granule-like, powder-like, flake-like, or fiber-like shape.

Accordingly, various methods can be used for the chopping. For example, a method is exemplified, of pulverizing the water-containing gel-like crosslinked polymer by extrusion from a screw-type extruder having a porous structure of any shape. It is also possible to further reduce the change in color by adding an aqueous solution of a chelating agent described below when the water-containing gel-like crosslinked polymer is pulverized by extrusion.

(3-3) Drying Step

The drying temperature suitably used in the present invention is not particularly limited. For example, the drying may be carried out at a temperature of 50° C. to 300° C., preferably 100° C. to 250° C., and more preferably 150° C. to 200° C. (the drying may preferably be carried out under reduced pressure in the case where the temperature is not higher than 100° C.). In particular, when acrylic acid contains the above organic compound inert to polymerization, the drying carried out at the above temperature range may be preferred, and in particular, high-temperature drying (at a temperature of preferably 100° C. to 250° C., more preferably 150° C. to 200° C.) may be more preferred, because the organic compound inert to polymerization can be removed from a water absorbent resin by such drying.

As the drying method, various methods can be employed, such as heat drying, hot-air drying, reduced-pressure drying, fluidized-bed drying, infrared drying, microwave drying, drum-dryer drying, azeotropic dehydration with a hydrophobic organic solvent, and high-humidity drying with high-temperature steam. As a preferred embodiment, there can be exemplified contact drying with a gas having a dew point of 40° C. to 100° C., preferably 50° C. to 90° C.

(3-4) Pulverization or Classification Step

Depending on the intended purpose, the color-stable-over-time water absorbent resin particles of the present invention obtained by drying may undergo pulverization, classification, blending, or other steps, if necessary, in order to control the particle size. Methods for these steps are disclosed in, for example, the pamphlet of WO 2004/69915.

A dried product is obtained by drying a water-containing gel-like crosslinked polymer produced after polymerization. The dried product may directly be used, that is, may be used as a dried powder (the amount of solid components may preferably be not smaller than 80% by mass). In addition, the particle size may be adjusted, if necessary, after the drying. The particle size of the water absorbent resin after the drying is adjusted to a specific particle size to improve physical properties at the surface crosslinking described below. The particle size can appropriately be adjusted by polymerization, pulverization, classification, granulation, fine powder collection, and other steps. In addition, in the case where the surface-crosslinking step is included, a similar classification step may preferably be included after the surface-crosslinking step. In this connection, the classification step after the drying step is referred to as a "first classification step", and the classification step after the surface-crosslinking step is referred to as a "second classification step".

The mass-average particle diameter (D50) before the surface crosslinking may be adjusted to 200 to 600 μm, preferably 200 to 550 μm, more preferably 250 to 500 μm, and particularly preferably 350 to 450 μm. In addition, there may preferably be contained few particles of smaller than 150 μm, the content of which may usually be adjusted to 0% to 5% by mass, preferably 0% to 3% by mass, and particularly preferably 0% to 1% by mass. Further, there may preferably be contained few particles of not smaller than 850 μm (preferably not smaller than 710 μm), the content of which may usually be adjusted to 0% to 5% by mass, preferably 0% to 3% by mass, and particularly preferably 0% to 1% by mass. In the present invention, particles of preferably 850 to 150 μm, more preferably 710 to 150 μm, may be surface crosslinked at a rate of not lower than 95% by mass, preferably not lower than 98% by mass (the upper limit is 100% by mass). The logarithmic standard deviation (σξ) of particle size distribution may be adjusted to 0.25 to 0.45, preferably 0.30 to 0.40, more preferably 0.32 to 0.38. These are measured with standard sieves, and the measurement method is disclosed in, for example, the pamphlet of WO 2004/69915, and EDANA-ERT420.2-02. The above particle size before surface crosslinking may preferably applies to the particle size after surface crosslinking, more preferably to the particle size of a final product (alternatively referred to as a water-absorbing agent or a particulate water absorbent resin).

(3-5) Fine Powder Recycle Step

In the present invention, fine powders may preferably be recycled. More specifically, the present invention may preferably include the step of recycling, to the drying step or another step prior to the drying step, fine powders of the water absorbent resin after the classification step. Recycling fine powders contributes to particle size control, as well as an improvement in water-absorption rate and liquid permeability. The amount of fine powders to be recycled may appropriately be determined in a range of 0.1% to 40% by mass, preferably 1% to 30% by mass, and particularly preferably 5% to 25% by mass, relative to the pulverized product.

As the fine powder recycle method, known methods are used, examples of which include: a method of recycling fine powders to a monomer (e.g., U.S. Pat. Nos. 5,455,284, 5,342,899, and 5,264,495, U.S. Patent Application Publication No. 2007/0225422); a method of recycling fine powders to a water-containing gel-like crosslinked polymer (U.S. Patent Application Publication No. 2008/0306209, U.S. Pat. Nos. 5,478,879 and 5,350,799); a method of recycling fine powders to a granulation step (U.S. Pat. Nos. 6,228,930 and 6,458,921); and a method of recycling fine powders to a gelation step (U.S. Pat. Nos. 4,950,692, 4,970,267, and 5,064,582). In particular, a method of recycling fine powders to a polymerization step or drying step (after granulating or hydrating the fine powders, if necessary) may be preferred.

(3-6) Surface-crosslinking Step

The color-stable-over-time water absorbent resin particle obtained by the present invention undergoes a heretofore-known surface-crosslinking treatment step after the above steps, and thereby becomes more suitable as a color-stable-over-time water absorbent resin for hygiene materials. In this connection, surface crosslinking may be carried out concurrently with drying, and may preferably be carried out after the drying step, more preferably after the classification step. The surface crosslinking means providing a portion having increased crosslink density in a surface layer of a water absorbent resin (the vicinity of the surface: an area within, usually, about several tens of micrometers from the surface of the water absorbent resin). Such portion can be formed by, for example, radical crosslinking at the surface, surface polymerization, and crosslinking reaction with a surface-crosslinking agent.

As the surface-crosslinking agent that can be used in the present invention, there can be exemplified various organic or inorganic crosslinking agents. From the viewpoint of physical properties and handleability, crosslinking agents capable of reacting with carboxyl groups may preferably be used. There can be exemplified, for example, polyvalent alcohol compounds, epoxy compounds, polyvalent amine compounds or their condensates with haloepoxy compounds, oxazoline compounds, mono-, di-, or poly-oxazolidinone compounds, polyvalent metal salts, alkylene carbonate compounds, oxetane compounds, and cyclic urea compounds.

More specifically, there can be mentioned compounds that are exemplified in U.S. Pat. Nos. 6,228,930, 6,071,976, and 6,254,990. There can be mentioned, but not limited to, for example, polyvalent alcohol compounds such as mono-, di-, tri-, tetra-, or poly-ethylene glycol, monopropylene glycol, 1,3-propanediol, dipropylene glycol, 2,3,4-trimethyl-1,3-pentane diol, polypropylene glycol, glycerin, polyglycerin, 2-butene-1,4-diol, 1,4-butane diol, 1,3-butane diol, 1,5-pentane diol, 1,6-hexane diol, and 1,2-cyclohexane dimethanol; epoxy compounds such as ethylene glycol diglycidyl ether and glycidol; polyvalent amine compounds such as ethylenediamine, diethylenetriamine, triethylenetetramine, tetraethylenepentamine, pentaethylenehexamine, polyethyleneimine, and polyamide polyamine; haloepoxy compounds such as epichlorohydrin, epibromohydrin, and α-methylepichlorohydrin; condensates of the polyvalent amine compounds with the haloepoxy compounds; oxazolidinone compounds such as 2-oxazolidinone; alkylene carbonate compounds such as ethylene carbonate; oxetane compounds; and cyclic urea compounds such as 2-imidazolidinone.

The amount of surface-crosslinking agent to be used, although depending on the kinds of compounds to be used, their combination, and other factors, may preferably be in a range of 0.001 to 10 parts by mass, more preferably in a range of 0.01 to 5 parts by mass, relative to 100 parts by mass of the water absorbent resin particles. In the present invention, water can be used together with a surface-crosslinking agent. In this case, the amount of water to be used may preferably be in a range of 0.5 to 20 parts by mass, more preferably in a range of 0.5 to 10 parts by weight, relative to 100 parts by mass of the water absorbent resin particles. Further, in the present invention, a hydrophilic organic solvent can be used other than water.

In this case, the amount of hydrophilic organic solvent to be used may be in a range of 0 to 10 parts by mass, preferably 0 to 5 parts by mass, relative to 100 parts by mass of the water absorbent resin particles. In addition, when a crosslinking agent solution is mixed in the water absorbent resin particles, water-insoluble fine-particle powder or surfactants may be allowed to coexist to the extent that the effects of the present invention cannot be inhibited, for example, at a rate of 0% to 10% by mass, preferably 0% to 5% by mass, and more preferably 0% to 1% by mass. The surfactants to be used and their amounts are exemplified in U.S. Pat. No. 7,473,739.

As a mixing device used for mixing the surface-crosslinking agent solution, various mixers can be used, but there can preferably be used a high-speed agitation-type mixer, particularly preferably a high-speed agitation-type continuous mixer, examples of which are Turbulizer (trade name; available from Hosokawa Micron Corporation, Japan) and Lodige mixer (trade name; available from Lodige industries, Germany).

After being mixed with a surface-crosslinking agent, the water absorbent resin may preferably be subjected to heating treatment, and then subjected to cooling treatment, if necessary. The heating temperature may be 70° C. to 300° C., preferably 120° C. to 250° C., and more preferably 150° C. to 250° C. The heating time may preferably be in a range of 1 minute to 2 hours. The heating treatment can be carried out with an ordinary dryer or heating furnace. The surface treatment in the production method of the particulate water absorbent resin of the present invention is a step of causing surface-crosslinking reaction for increasing the crosslink density of the surface of the water absorbent resin, and may preferably be carried out at a temperature range of 150° C. to 250° C., in order to obtain the performance of the particulate water absorbent resin of the present invention. When the temperature is lower than 150° C., the degree of the surface crosslinking of the particulate water absorbent resin is not sufficient, leading to a reduction in absorbency against pressure and saline flow conductivity. In addition, when the temperature is higher than 250° C., the particulate water absorbent resin may be colored, which is not preferred.

Such surface-crosslinking treatment methods are disclosed in various European patents such as European Patents Nos. 0349240, 0605150, 0450923, 0812873, 0450924, and 0668080; various Japanese patent publications such as Japanese Patent Laid-open Publications Nos. Hei 7-242709 and Hei 7-224304; various U.S. patents such as U.S. Pat. Nos. 5,409,771, 5,597,873, 5,385,983, 5,610,220, 5,633,316, 5,674,633, and 5,462,972; and various pamphlets of International Patent Applications such as WO 99/42494, WO 99/43720, and WO 99/42496. These surface-crosslinking methods can also be applied in the present invention. Further, in the surface-crosslinking step, a water-soluble polyvalent metal salt such as an aqueous aluminum sulfate solution may be further added after the crosslinking reaction. Such methods are disclosed in, for example, the pamphlets of WO 2004/69915 and WO 2004/69293, and can be applied in the present invention.

In addition, a polyvalent metal and/or a cationic polymer, which are described below, may be added concurrently with or after the surface crosslinking.

(3-7) Cationic Polymer Addition Step (Only in Case 3)

The production method of the invention of case 3 may include the step of adding a cationic polymer, and particularly include the step of adding a cationic polymer to the surface of the water absorbent resin powder. The added cationic polymer acts on the surface coating or the surface crosslinking of the water absorbent resin, and thereby improves, for example, the liquid permeability and the shape retentivity of the water absorbent resin. The cationic polymer may be a crosslinked polymer, a homopolymer, or a copolymer, and all or part of the cationic polymer may be water swellable or water insoluble, but a water-soluble cationic polymer may preferably be used. In this connection, the "water-soluble" means the property of a cationic polymer being dissolved in 100 g of 25° C. water in an amount of not smaller than 1 g, preferably not smaller than 10 g, and particularly preferably not smaller than 50 g.

The cationic polymer is added to the water absorbent resin after the drying step, preferably before, during (concurrently with), or after the surface-crosslinking step, more preferably concurrently with or after the surface crosslinking, and particularly preferably after the surface crosslinking. When the cationic polymer is added, the surface of the water absorbent resin is coated or reacted with the cationic polymer. In the invention of case 3, formic acid may preferably be added also to the surface of the water absorbent resin. By coating the surface of the water absorbent resin with formic acid and a cationic polymer, the liquid permeability and the shape retentivity are improved, and in addition, the coloring (coloring over time) of the water absorbent resin, which is likely to be caused by the addition of a cationic polymer, is dramatically reduced. This allows the water absorbent resin to be used in disposable diapers in a high concentration without causing coloring.

The cationic polymer may be added concurrently with or separately from formic acid, and both of these methods may be used in combination. From the viewpoint of the effects of the present invention, a mixture of the cationic polymer and formic acid may preferably be mixed in the water absorbent resin. It can be expected that coloring derived from the cationic polymer can efficiently be prevented by concurrently mixing the cationic polymer and formic acid in the water absorbent resin (the present invention is not limited by this mechanism).

(Mixed Solvent)

The cationic polymer and formic acid may be directly mixed in the water absorbent resin. In view of achieving an improvement in physical properties by uniform mixing, they may preferably be mixed in the water absorbent resin as a solution, more preferably as an aqueous solution. The amount of water or other solvents to be used (preferably hydrophilic solvents, particularly lower alcohols) can appropriately be determined depending on the kind and amount of cationic polymer to be used. The amount of water to be used may preferably be 0.01 to 20 parts by mass, more preferably 0.1 to 10 parts by mass, and particularly preferably 0.5 to 8 parts by mass. The concentration of the aqueous solution to be mixed may also appropriately be determined and may be, for example, 1% to 100% by mass, preferably 5% to 80% by mass, and more preferably 10% to 60% by mass.

(Mixing Amount)

The amount of cationic polymer to be mixed may appropriately be determined in a range of 0.01 to 5 parts by mass, preferably 0.05 to 4.5 parts by mass, more preferably 0.1 to 4 parts by mass, and still more preferably 0.3 to 3.5 parts by mass, relative to 100 parts by mass of the polymer.

The amount of formic acid to be mixed may appropriately be determined in a range of 0.0001 to 5 parts by mass, preferably 0.001 to 4.5 parts by mass, more preferably 0.01 to 4 parts by mass, still more preferably 0.1 to 3.5 parts by mass, relative to 100 parts by mass of the polymer.

The weight ratio of a cationic polymer to formic acid in the mixture may also appropriately be determined. The weight ratio (cationic polymer:formic acid) may preferably 1:20 to 20:1, more preferably 1:10 to 10:1, still more preferably 1:5 to 5:1, particularly preferably 1:3 to 3:1, and most preferably 1:2 to 2:1.

In this connection, the above formic acid amount is defined as the total formic acid content including not higher than 700 ppm (preferably 1 to 700 ppm) of formic acid that is contained, if necessary, at the time of polymerization. In addition, it is defined that the mass of a salt of formic acid is converted into the mass of formic acid (e.g., the mass of HCOONa (having a molecular weight of 68) is converted into the mass of HCOOH (having a molecular weight of 46))

(Mixing Method)

The cationic polymer and formic acid can be mixed by, for example, a mixer used in the surface crosslinking, a heating treatment apparatus, a cooling apparatus, or a mixer other than the mixer used in the surface crosslinking. The resulting mixture may be heated or dried after the mixing, if necessary, preferably at 20° C. to 150° C., more preferably 50° C. to 120° C.

(Addition Timing)

In the case where formic acid is contained in a monomer at the time of polymerization in the concentration described above, a mixture of the cationic polymer and formic acid, of which amount is greater than the amount of formic acid contained at the time of polymerization is mixed in the water absorbent resin. A preferred cationic polymer is polyvinylamine or a partial hydrolysate of poly(N-vinylformamide), but cationic polymers described below may also be used alone or in combination. One preferred method for the invention of case 3 is to use, as the cationic polymer, a complete or partial hydrolysate of poly(N-vinylformamide) containing a prescribed amount of formic acid, preferably a partial hydrolysate of poly(N-vinylformamide) containing a prescribed amount of formic acid. The amounts of formic acid to be used at the time of polymerization and at the time of addition of the cationic polymer, and the total amount of formic acid to be used, are all in the above ranges, relative to the water absorbent resin. If formic acid is added in this step, since formic acid does not evaporate unlike in the polymerization step and the drying step, a problem about an acidic odor derived from formic acid is less likely to arise, the loss of formic acid is small, and the effect of preventing coloring over time is high, relative to the amount of formic acid to be used, as compared to the case where formic acid is added in or before the polymerization step or the drying step. In addition, when higher than 700 ppm of formic acid is contained in an aqueous monomer solution, the amount of water solubles becomes greater than the amount of formic acid added. However, such a problem about water solubles does not occur after the polymerization step.

That is, in the case where a cationic polymer is used, a mixture of formic acid and the cationic polymer, particularly an aqueous solution of the mixture, is added, from the viewpoint of coloring prevention effect. Further, from the viewpoint of odor, formic acid is added as a salt form (an alkali metal salt or a cationic polymer salt). If formic acid and a cationic polymer are added separately from each other, the effect of preventing coloring derived from the cationic polymer may be reduced because formic acid is not uniformly added, and an odor may be caused by formic acid that is present in the surface of a water absorbent resin separately from the cationic polymer.

(Cationic Polymer)

The cationic polymer may preferably be polyvinylamine or a partial hydrolyzate of poly(N-vinylformamide). Other cationic polymers that may preferably be used are polymers containing at least one selected from primary amino groups, secondary amino groups, tertiary amino groups, their salts, and quaternary alkyl ammonium salts. In this case, the salts of amino groups mean products obtained by neutralization of amino-group nitrogen with an inorganic or organic acid or obtained by reaction of amino-group nitrogen with an electrophilic reagent. As the inorganic acid that can be used for the neutralization, there can be mentioned, for example, carbonic acid; boric acid; hydroacids such as hydrochloric acid and hydrofluoric acid; oxyacids such as sulfuric acid, sulfurous acid, nitric acid, nitrous acid, phosphoric acid, phosphinic acid, phosphorous acid, orthophosphoric acid, polyphosphoric acids such as metaphosphoric acid and pyrophosphoric acid, tripolyphosphoric acids, ultraphosphoric acid (acidic metaphosphoric acid), and perchloric acid; and salts of the oxyacids. As the organic acid, there can be mentioned, for example, compounds having acidic functional groups, such as carboxylic acids, sulfinic acids, sulfonic acids, phenolic acids, enols (tautomers of carbonyl compounds), mercaptans, imides (acid imides), oximes, and sulfonamides. More specifically, there can be exemplified, for example, oxyacids such as formic acid, acetic acid, propionic acid, glycolic acid, lactic acid, trichlorolactic acid, glyceric acid, malic acid, tartaric acid, citric acid, tartronic acid, and gallic acid; amino acids such as aspartic acid; and p-toluenesulfonic acid. As those which can be used as electrophilic reagents, there can be mentioned, for example, alkyl halides such as iodomethane, iodoethane, 2-iodopropane, benzyl iodide, bromomethane, bromoethane, 2-bromopropane, benzyl bromide, chloromethane, chloroethane, 2-chloropropane, and benzyl chloride; and alkyl sulfates such as diethyl sulfate and dimethyl sulfate. The inorganic acids, organic acids, and electrophilic reagents may be used alone, or two or more kinds of them may be used in combination.

Specific examples of the cationic polymer are polyethyleneimine, modified polyamidoamine obtained by grafting ethyleneimine, protonated polyamidoamine, condensates of polyamidoamine with epichlorohydrin, condensates of amines with epichlorohydrin, poly(vinylbenzyldialkylammonium), poly(diallylalkylammonium), poly(2-hydroxy-3-methacryloyloxypropyldialkylamine), polyetheramine, polyvinylamine, modified polyvinylamine, partial hydrolysates of poly(N-vinylformamide), partial hydrolysates of poly (N-vinylalkylamide), partial hydrolysates of (N-vinylformamide)-(N-vinylalkylamide) copolymers, polyalkylamines, polyvinylimidazole, polyvinylpyridine, polyvinylimidazoline, polyvinyl tetrahydropyridine, polydialkylaminoalkyl vinyl ether, polydialkylamino alkyl (meth)acrylate, polyallylamine, polyamidine, catinonized starch, catinonized cellulose, and cationic polyelectrolytes such as salts of these compounds and reaction products of these compounds with electrophilic reagents. The polyamidine as used herein means a polymer, of which molecule has an amidine ring, and may preferably be a polymer obtained by copolymerization of N-vinylformamide and acrylonitrile, followed by acid treatment. Specific examples of polyamidine may include, but not limited to, cationic polymers having an amidine structure, which are disclosed in Japanese Patent No. 2624089.

In particular, cationic polymers may be preferred, which have at least one selected from polyamidine or its salts, polyvinylamine or its salts, polyvinylamine-poly(N-vinylformamide) copolymers or their salts, and partial hydrolysates of poly(N-vinylformamide) or their salts, from the viewpoint of the effects of the present invention. Polyvinylamine or its salts, and partial hydrolysates of poly(N-vinylformamide) or their salts, may be more preferred. These cationic polymers may contain other repeating units in an amount of about 0 to 30 mol %, preferably about 0 to 10 mol %. The production method of these cationic polymers is not particularly limited. From the viewpoint of simplifying the process, a method of hydrolyzing poly(N-vinylformamide) may be preferred because a cationic polymer having amine groups and formic acid (salt) are produced, and the use of a mixture of this partial hydrolysate or its salt and formic acid makes it possible to add the cationic polymer and formic acid at the same time. In this connection, when a partial hydrolysate of poly(N-vinylformamide) is produced, purification is not carried out, or a purification method, which does not remove formic acid, need to be used, in order to allow a prescribed amount of formic acid to remain.

The degree of hydrolysis of a complete or partial hydrolysate (preferably, partial hydrolysate) of poly(N-vinylformamide) or its salt may preferably be 10 to 100 mol %, more preferably 20 to 95 mol %, and particularly preferably 30 to 90 mol %. In this connection, the degree of hydrolysis represents the ratio (%) of amine groups (mol number) produced by hydrolysis to formamide groups (mol number) before hydrolysis, where 100 mol % hydrolysate corresponds to polyvinylamine or its salt.

(Molecular Weight)

The cationic polymer may preferably have a weight-average molecular weight of not lower than 2,000, more preferably have a number-average molecular weight of not lower than 2,000, still more preferably have a weight-average molecular weight of not lower than 5,000, and most preferably have a weight-average molecular weight of not lower than 10,000 and a number-average molecular weight of not lower than 5,000. When the weight-average molecular weight is lower than 2,000, there is a fear that the desired effects cannot be obtained. In this connection, the average molecular weights, that is, the number-average molecular weight and the weight-average molecular weight are measured by a viscosity method and by an equilibrium sedimentation method, respectively. Alternatively, the average molecular weights can be measured by, for example, gel permeation chromatography or a static light scattering method. From the viewpoint of cost, the upper limit of the weight-average molecular weight may be satisfactory, if it is about 5,000,000, preferably about 1,000,000.

(Crosslinked Cationic Polymer)

A crosslinked cationic polymer can be obtained by introducing a crosslinking structure into a cationic polymer with heretofore-known methods such as a method of producing a crosslinked polymer by copolymerization of a monomer having a corresponding cationic group with another copolymerizable crosslinking agent; and a method of crosslinking a cationic polymer with a crosslinking agent having two or more groups capable of reacting with the functional group (e.g., an amino group) of the cationic polymer. The crosslinked cationic polymer may be provided with water swellability, and used in an amount of not greater than 200 parts by mass to obtain a composition of the crosslinked cationic polymer and a polyacrylic water absorbent resin, particularly a slightly-neutralized or unneutralized polyacrylic water absorbent resin, so that a water absorbent resin composition of the acid-base type may be produced.

As the crosslinking agent, when the functional group of the cationic polymer is an amino group, for example, heretofore-used compounds can be used, each of which has two or more of epoxy groups, ketone groups, aldehyde groups, amide groups, halogenated alkyl groups, isocyanate groups, carboxyl groups, acid anhydride groups, acid halide groups, amide linkage portions, ester linkage portions, active double bonds, or the like in one molecule. As such a crosslinking agent, there can be mentioned, but not limited to, for example, bisepoxy compounds, epichlorohydrin, halohydrins, dihalogenated compounds such as dibromoethylene, formalin, dialdehyde compounds such as glyoxal, diglycidyl ethers of (poly)ethylene glycols, diglycidyl ethers of (poly)propylene glycols, diglycidyl ethers of dialcohols such as neopentyl alcohol, polydiglycidyl ethers of glycerol, methylenebisacrylamide, and diacrylate compounds.

(Cation Density)

In addition, the cationic polymer of the present invention may preferably have a cation density of not lower than 2 [mmol/g], more preferably not lower than 4 [mmol/g], and most preferably not lower than 6 [mmol/g]. When the cation density is lower than 2 [mmol/g], there is a fear that the shape retentivity of a water absorbent resin aggregate becomes insufficient after swelling of a water absorbent resin obtained by mixing a water absorbent resin with the cationic polymer. The upper limit of the cation density may appropriately be determined depending on the kinds of repeating units, and may preferably be not higher than 30 [mmol/g], and more preferably not higher than 25 [mmol/g].

(3-8) Step of Adding Other Additives (Common to Cases 1 to 3)

(a) Chelating Agent

The production method of a particulate water absorbent resin according to the present invention may include the step of adding a chelating agent in order to improve the prevention of coloring and deterioration. From the viewpoint of the effects, the chelating agent in the present invention may be a polymer or a non-polymer, and may preferably be a non-polymer. The chelating agent may preferably be a compound, particularly a non-polymer compound, selected from amino-polyvalent carboxylic acids, organic polyvalent phosphoric acids, and amino-polyvalent phosphoric acids. Preferred chelating agents are exemplified in European Patent No. 940148.

From the viewpoint of the effects, the chelating agent may preferably have a molecular weight of 100 to 5,000, more preferably 200 to 1,000. In this connection, the polyvalent means the possession of two or more functional groups, preferably 2 to 30 functional groups, more preferably 3 to 20 functional groups, and still more preferably 4 to 10 functional groups, in one molecule.

The amount of chelating agent contained in the particulate water absorbent resin of the present invention may preferably be in a range of 0.001% to 0.1% by mass, more preferably 0.002% to 0.05% by mass, still more preferably 0.003% to 0.04% by mass, and particularly preferably 0.004% to 0.02% by mass. When the amount of chelating agent is smaller than 0.001% by mass, the degree of coloring over time of the particulate water absorbent resin becomes increased, which is not preferred. When the amount of chelating agent is greater than 0.1% by mass, the initial color of the particulate water absorbent resin becomes deteriorated, which is not preferred. In this connection, the coloring over time means the coloring of a particulate water absorbent resin when, for example, it is stored for a long period time under high temperature and high humidity, and the initial color means the color or the degree of coloring of a particulate water absorbent resin at the time when it has been produced.

(b) Inorganic Reducing Agent

The production method of the present invention may preferably include the step of adding an inorganic reducing agent in order to further improve the prevention of coloring and deterioration, as well as the reduction of residual monomers. As the inorganic reducing agent in the present invention, there can be mentioned sulfur atom-containing inorganic reducing agents and phosphorus atom-containing inorganic reducing agents. The inorganic reducing agent may be in the form of an acid, but may preferably be in the form of a salt. The salt may be a monovalent or polyvalent metal salt, preferably a monovalent metal salt. Preferred inorganic reducing agents are exemplified in U.S. Patent Application Publication No. 2006/074160. For example, a (hydrogen) sulfite may preferably be used.

The amount of inorganic reducing agent contained in the water absorbent resin of the present invention may preferably be in a range of 0.01% to 1.5% by mass, more preferably 0.05% to 1.0% by mass, and particularly preferably 0.05% to 0.5% by mass. When the amount of inorganic reducing agent is smaller than 0.01% by mass, the degree of coloring over time of the particulate water absorbent resin of the present invention becomes increased, which is not preferred. When the amount of inorganic reducing agent is greater than 1.5% by mass, the odor of the particulate water absorbent resin becomes strong, which is not preferred, and in particular, the odor becomes strong after the particulate water absorbent resin absorbs an aqueous liquid, which is not preferred.

From the viewpoint of odor, the inorganic reducing agent in the present invention may be added after the surface-crosslinking treatment step. When the inorganic reducing agent is added in or before the surface-crosslinking treatment step, the particulate water absorbent resin to be obtained may have an abnormal odor, which is not preferred, and in particular, the water absorbent resin to be obtained may emit an abnormal odor after absorbing an aqueous liquid, which is not preferred. Such an odor is not necessarily the odor of the inorganic reducing agent, and is assumed to be an odor generated in the surface-crosslinking step, particularly in the surface-crosslinking step aimed at a high SFC and a high AAP.

(c) α-Hydroxycarboxylic Acid Compound

The particulate water absorbent resin of the present invention may preferably contain an α-hydroxycarboxylic acid compound, in order to further improve the prevention of coloring and the like. The α-hydroxycarboxylic acid compound in the present invention means a carboxylic acid or its salt, which has a hydroxyl group in the molecule thereof, and in other words, is a hydroxycarboxylic acid compound having an α-hydroxyl group.

The α-hydroxycarboxylic acid compound may preferably be a non-polymer α-hydroxycarboxylic acid. From the viewpoint of ease and effect of addition, the molecular weight of the α-hydroxycarboxylic acid compound may preferably be in a range of 40 to 2,000, more preferably 60 to 1,000, and particularly preferably 100 to 500. The α-hydroxycarboxylic acid compound may preferably be water soluble. As such a α-hydroxycarboxylic acid compound, there can be mentioned, for example, glycolic acid, tartaric acid, lactic acid (salt), citric acid (salt), malic acid (salt), isocitric acid (salt), glyceric acid (salt), and poly-α-hydroxyacrylic acid (salt). In particular, lactic acid (salt) and malic acid (salt) may be preferred, and lactic acid (salt) may be more preferred.

From the viewpoint of cost performance, the amount of such α-hydroxycarboxylic acid compound to be used in the particulate water absorbent resin may preferably be in a range of 0.05% to 1.0% by mass, more preferably 0.05% to 0.5% by mass, and still more preferably 0.1% to 0.5% by mass. When the particulate water absorbent resin of the present invention, which contains p-methoxyphenol, a chelating agent, and an inorganic reducing agent in specific ranges of amounts, further contains an α-hydroxycarboxylic acid compound, the effects of the present invention described above can be further enhanced.

(d) Polyvalent Metal Salt

From the viewpoint of an improvement in the liquid permeability (SFC) and the like, the particulate water absorbent resin of the present invention may preferably contain a polyvalent metal salt. In this connection, in the invention of case 3, a cationic polymer may be used instead of a polyvalent metal salt, and therefore, a polyvalent metal salt need not be used. However, 0 to 1 part by mass of a polyvalent metal salt may be used in combination with a cationic polymer.

The polyvalent metal salt in the present invention may be an organic acid salt or an inorganic acid salt of a polyvalent metal, and may preferably be a salt of a polyvalent metal such as aluminum, zirconium, iron, titanium, calcium, magnesium, or zinc. The polyvalent metal salt may be water soluble or water insoluble, and may preferably be a water-soluble polyvalent metal salt. A water-soluble polyvalent metal salt can be used, which is dissolved in water at 25° C. in an amount of not smaller than 2% by mass, preferably not smaller than 5% by mass. More specifically, there can be exemplified inorganic acid salts such as aluminum chloride, polyaluminum chloride, aluminum sulfate, aluminum nitrate, aluminum potassium bis(sulfate), aluminum sodium bis(sulfate), potassium alum, ammonium alum, sodium alum, sodium aluminate, calcium chloride, calcium nitrate, magnesium chloride, magnesium sulfate, magnesium nitrate, zinc chloride, zinc sulfate, zinc nitrate, zirconium chloride, zirconium sulfate, and zirconium nitrate; and organic acid salts such as lactic acid salts and acetic acid salts of these polyvalent metals. Further, also from the viewpoint of solubility with a liquid to be absorbed such as urine, it may be preferred to use the salts having crystallization water.

Aluminum compounds may particularly be preferred, in which referred are aluminum chloride, poly(aluminum chloride), aluminum sulfate, aluminum nitrate, aluminum potassium bis(sulfate), aluminum sodium bis(sulfate), potassium alum, ammonium alum, sodium alum, and sodium aluminate. Aluminum sulfate may particularly be preferred. Aluminum sulfate 18 hydrate and powders of hydrate crystals such as aluminum sulfate 14 to 18 hydrates can most preferably be used. One kind of these may be used alone, or two or more kinds of these may be used in combination.

The surface crosslinking with a polyvalent metal is disclosed in the pamphlets of WO 2007/121037, WO 2008/09843, and WO 2008/09842; U.S. Pat. Nos. 7,157,141, 6,605,673, and 6,620,889; and U.S. Patent Application Publications Nos. 2005/0288182, 2005/0070671, 2007/0106013, and 2006/0073969.

The amount of the polyvalent metal salt contained in the particulate water absorbent resin of the present invention may be in a range of 0% to 5% by mass, preferably 0.001% to 3% by mass, and more preferably 0.01% to 2% by mass. When the amount of the polyvalent metal salt is greater than 5% by mass, absorption performance, particularly absorbency, may remarkably be reduced, which is not preferred, and coloring may also occur, which is not preferred.

(e) Surfactant

In the present invention, a surfactant may preferably be further mixed. The physical properties of a water absorbent resin are improved or stabilized by mixing and presence of a surfactant in the surface of the water absorbent resin. The surfactant may preferably be added to the water absorbent resin after the drying step, more preferably before, during (concurrently with), or after the surface-crosslinking step, and still more preferably concurrently with or after the mixing of a cationic polymer.

The surfactants that can be used are exemplified in, for example, U.S. Pat. No. 6,107,358, and the amount of surfactant to be used may be in a range of 0 to 1 part by mass, preferably 0.0001 to 0.5 parts by mass, and particularly preferably 0.001 to 0.1 parts by mass, relative to 100 parts by mass of the water absorbent resin. If the amount of surfactant to be used is greater, there is an unfavorable case where it is disadvantageous from the viewpoint of cost and the amount of returned liquid in a disposable diaper may be increased due to a reduction in the surface tension of the water absorbent resin.

(f) Water-insoluble Inorganic Fine Particles

In the present invention, water-insoluble inorganic fine particles may preferably be further mixed. The physical properties of a water absorbent resin are improved or stabilized by mixing and presence of a water-insoluble inorganic surfactant in the surface of the water absorbent resin. The surfactant may preferably be added to the water absorbent resin after the drying step, and more preferably before, during (concurrently with), or after the surface-crosslinking step. However, the water-insoluble inorganic fine particles may preferably be added concurrently with or after the mixing of a cationic polymer, particularly preferably after the mixing of a cationic polymer.

(g) Other Additives

Further, depending on the intended function, the following may be added, in order to provide various functions, in an amount of 0% to 3% by mass, preferably 0% to 1% by mass: phosphorus atom-containing compounds; oxidizing agents; organic reducing agents; organic powder such as metallic soap; deodorants; antimicrobial agents; pulp; and thermoplastic fibers. In this connection, as the surfactant, there can preferably be exemplified surfactants disclosed in the pamphlet of WO 2005/075070.

(Preferred Physical Properties; Common to Cases 1 to 3)

The production method of the present invention can preferably be applied as a production method of a water absorbent resin having high CRC and high liquid permeability (SFC), which have been difficult to be achieved together with the prevention of coloring. The water absorbent resin obtained has a CRC of not lower than 25 [g/g], an AAP of not lower than 20 [g/g], and an SFC of not lower than $50[\times 10^{-7} \cdot cm^3 \cdot s \cdot g^{-1}]$. Further, the production method of the present invention can preferably be applied as a production method of a water absorbent resin having an AAP and an SFC in the ranges described below and exhibiting other physical properties described below.

[4] Physical Properties of Particulate Water Absorbent Resin (4-1; Physical Properties of Water Absorbent Resin Obtained by Production Method in Case 2)

The production method in case 2 provides, as an excellent water absorbent resin that is less likely to be colored, a polyacrylic acid (salt)-based water absorbent resin containing 1 to 500 ppm of formic acid. A preferred range of the formic acid content is as described above.

In addition, the water absorbent resin obtained by the production method in case 2, which is an excellent water absorbent resin that is less likely to be colored, contains 1 to 500 ppm of formic acid derived mainly from a monomer to be polymerized. The formic acid content may preferably be in the range described above. In addition, the water absorbent resin may preferably contain 1 to 200 ppm of a phenolic compound (particularly, p-methoxyphenol) derived mainly from a monomer to be polymerized. The phenolic compound content may preferably be in the range described above. In addition, the water absorbent resin in case 2 may preferably contain iron (Fe) derived mainly from a base used for neutralization, in an amount of not greater than 2 ppm (about 2.8 ppm as the $Fe_2O_3$ content), more preferably not greater than 1.5 ppm, and still more preferably not greater than 1 ppm, and particularly preferably not greater than 0.5 ppm. The lower limit is 0.001 ppm, and preferably 0.01 ppm. (For example, when Fe is contained at 10 ppm (×55.85×2/158.7) in NaOH, if the degree of neutralization is 75%, about 33% of Fe remains in sodium polyacrylate to be obtained, and thus the Fe content is about 2 ppm.) A prescribed amount of iron promotes the decomposition of a water absorbent resin when it is discarded after use. However, an excessive amount of iron is not preferred because it causes deterioration during use and coloring before use.

Even if the water absorbent resin obtained by the production method in case 2 contains iron and methoxyphenol which are substances responsible for coloring, the water absorbent resin is less likely to be colored because of using formic acid. Further, the water absorbent resin in case 2 may preferably contain a polyvalent metal salt or a cationic polymer in the range described above, as a water absorbent resin having excellent resistance to coloring and excellent liquid permeability. Further, the water absorbent resin in case 2 may preferably contain a chelating agent and/or a hydroxycarboxylic acid (particularly, lactic acid) in the range described above, as a water absorbent resin having excellent resistance to coloring and excellent liquid permeability.

(4-2; Physical Properties of Water Absorbent Resin Obtained by Production Method in Case 3)

Meanwhile, the production method in case 3 provides a polyacrylic acid (salt)-based water absorbent resin that contains not greater than 2 ppm of iron, 1 to 50,000 ppm of formic acid, and a 0.01 to 5 parts by mass of a cationic polymer, relative to 100 parts by mass of the polymer. In the case where formic acid is added after the drying step, the surface of the water absorbent resin may preferably be coated with formic acid and a cationic polymer. Further, in the case where formic acid is contained at the time of polymerization, formic acid is contained also inside the water absorbent resin, and therefore, the effect of preventing coloring is further enhanced.

In case 3, preferred cationic polymers are as described above. Their contents and weight ratios are in the ranges described above. The cationic polymer may preferably be polyvinylamine or its salts, or a partial hydrolysate of poly(N-vinylformamide) or its salts. For example, the weight ratio of a cationic polymer to formic acid in the mixture may preferably be in a range of 1:20 to 20:1, more preferably in the range described above.

Also in case 3, it may be preferred that the p-methoxyphenol compound content is in a range of 1 to 200 ppm, preferably in the range described above, from the viewpoint of the light resistance of a water absorbent resin to be obtained, as well as from the viewpoint of stabilizing polymerization.

In order to solve the above problems, the water absorbent resin obtained by the production method in case 3 may preferably have a not smaller than CRC of not lower than 25 [g/g], an AAP of not lower than 20 [g/g], and an SFC of not lower than $50[\times 10^{-7} \cdot cm^3 \cdot s \cdot g^{-1}]$. In addition, the water absorbent resin may preferably contain a surfactant in the range described above. The weight ratio of a cationic polymer to formic acid may preferably be in a range of 1:20 to 20:1. The water absorbent resin may preferably contain water-insoluble inorganic fine particles in the range described above.

As in case 2, the water absorbent resin in case 3 also contains iron derived mainly from a base used for neutralization. The iron content is not higher than 2 ppm (about 2.8 ppm as the $Fe_2O_3$ content), preferably not higher than 1.5 ppm, more preferably not higher than 1 ppm, and still more preferably not higher than 0.5 ppm. In addition, the iron content may be not higher than 0.001 ppm, preferably not higher than 0.01 ppm, as the lower limit. In this connection, when neutralization is carried out with NaOH in which the iron content is 10 ppm as the $Fe_2O_3$ content, if the degree of neutralization is 75%, the iron content in sodium acrylate is about 3 ppm ((10×55.85×2/159.7)×40/88.55=about 3 ppm). Such a prescribed amount of iron promotes the decomposition of a water absorbent resin when it is discarded after use. However, an excessive amount of iron is not preferred because it becomes responsible for deterioration during use and coloring before use.

The iron content is controlled mainly by controlling the amount of iron in a base (particularly, sodium hydroxide) to be used for neutralization. In addition, the iron content can be controlled by, for example, controlling trace iron in raw materials (e.g., acrylic acid, crosslinking agent, water), or controlling, with resin coating, glass coating, or stainless steel, various apparatuses and pipes, such as a polymerization apparatus and pipes for monomer, for producing a water absorbent resin. In this connection, the iron content in a base or a water absorbent resin can be determined by, for example, ICP emission spectrometric analysis method described in JIS K1200-6, and the pamphlet of WO 2008/090961 can be utilized as a reference about the quantitative determination method.

Even if the water absorbent resin in case 3 contains iron and methoxyphenol which are substances responsible for coloring, the water absorbent resin is also less likely to be colored because of using formic acid. Further, the water absorbent resin in case 3 may preferably contain a polyvalent metal salt or a cationic polymer in the range described above, as a water absorbent resin having excellent resistance to coloring and excellent liquid permeability. Further, the water absorbent resin in case 3 may preferably contain a chelating agent and/or a hydroxycarboxylic acid (particularly, lactic acid) in the range described above, as a water absorbent resin having excellent resistance to coloring and excellent liquid permeability.

(4-3; Physical Properties of Water Absorbent Resin Common to Cases 1 to 3)

The water absorbent resin obtained by each of the production methods in cases 1, 2, and 3 of the present invention may preferably attain the following physical properties. When the water absorbent resin is intended for hygienic materials, particularly disposable diapers, it may be preferred to control at least one of the following (a) to (k), preferably two or more including AAP, and particularly preferably three or more including AAP, by the polymerization or the surface crosslinking which have been described above. If the following requirements are not satisfied, the water absorbent resin may exhibit no sufficient performance in a high-concentration disposal diaper described below.

Each of the production methods of the present invention can preferably be applied to a production method of a water absorbent resin described below. Each of the production methods of the present invention can preferably be applied to the control and improvement of liquid permeability (SFC) and water-absorption rate (FSR). In this connection, the physical properties described below and the physical properties in Examples are defined according to the EDNA method, unless otherwise indicated.

(a) Absorbency Against Pressure (AAP)

The AAP may be not lower than 20 [g/g], preferably not lower than 22 [g/g], more preferably not lower than 23 [g/g], still more preferably not lower than 24 [g/g], and most preferably not lower than 25 [g/g]. The upper limit of the AAP is not particularly limited, but may preferably be not higher than 30 [g/g]. If the AAP is lower than 20 [g/g], there is a fear that a water absorbent resin cannot be obtained, which exhibits, when used as a particulate water absorbent resin in a water-absorbing product, a reduced return of liquid (usually referred to as "Re-Wet") occurring when a pressure is applied to the water-absorbing product. The AAP can be adjusted by, for example, the surface crosslinking, particularly, the surface crosslinking after the particle size control.

(b) Liquid Permeability (SFC)

The SFC may preferably be not lower than $30[\times 10^{-7} \cdot cm^3 \cdot s \cdot g^{-1}]$, more preferably not lower than $50[\times 10^{-7} \cdot cm^3 \cdot s \cdot g^{-1}]$, still more preferably not lower than $70[\times 10^{-7} \cdot cm^3 \cdot s \cdot g^{-1}]$, and particularly preferably not lower than $80[\times 10^{-7} \cdot cm^3 \cdot s \cdot g^{-1}]$.

If the SFC is lower than $30[\times 10^{-7} \cdot cm^3 \cdot s \cdot g^{-1}]$, liquid permeability is not improved. Therefore, there is a fear that a water absorbent resin cannot be obtained, which exhibits an excellent liquid-absorption rate in a water-absorbing product when used as a particulate water-absorbing agent in the water-absorbing product. The upper limit of the SFC is not particularly limited, but may preferably be not higher than $3,000[\times 10^{-7} \cdot cm^3 \cdot s \cdot g^{-1}]$, more preferably not higher than $2,000[\times 10^{-7} \cdot cm^3 \cdot s \cdot g^{-1}]$. If the SFC is higher than $3,000[\times 10^{-7} \cdot cm^3 \cdot s \cdot g^{-1}]$, when the particulate water absorbent resin is used in a water-absorbing product, the water-absorbing product may cause liquid leakage. The SFC can be controlled by, for example, the surface crosslinking, the particle size control, the polyvalent metal salts, the cationic polymers, which have been described above. In particular, the SFC can be adjusted by the surface crosslinking to achieve a CRC in the range described below, after the particle size control, and further by the use of a cationic polymer.

(c) Centrifuge Retention Capacity (CRC)

The centrifuge retention capacity (CRC) may preferably be not lower than 5 [g/g], more preferably not lower than 15 [g/g], and still more preferably not lower than 25 [g/g]. The upper limit of the CRC is not particularly limited, but may preferably be not higher than 70 [g/g], more preferably not higher than 50 [g/g], and still more preferably not higher than 40 [g/g].

If the CRC is lower than 5 [g/g], the absorption amount when the particulate water absorbent resin is used as a water-absorbing agent is too small. In this case, therefore, the water absorbent resin is not suitable for use in hygiene materials such as disposable diapers. Further, if the CRC is higher than 70 [g/g], there is a possibility that a water absorbent resin cannot be obtained, which exhibits an excellent liquid-absorption rate in a water-absorbing product such as a disposal diaper when used as a particulate water absorbent resin in the water-absorbing product. The CRC can be controlled by, for example, the internal crosslinking agents or the surface-crosslinking agents, which have been described above. When the CRC is out of the above range, there is a possibility that the SFC and AAP also deviate from the ranges described in (a) and (b). Therefore, it may be preferred that the surface crosslinking is carried out so as to achieve a CRC in the range described above.

(d) Extractables

The amount of extractables may preferably be not greater than 35% by mass, more preferably not greater than 25% by mass, and still more preferably not greater than 15% by mass.

If the amount of extractables is greater than 35% by mass, the water absorbent resin may have reduced gel strength and deteriorated liquid permeability. In addition, there is a fear that a water absorbent resin cannot be obtained, which exhibits, when used as a particulate water-absorbing agent in a water-absorbing product, a reduced return of liquid (usually referred to as "Re-Wet") occurring when a pressure is applied to the water-absorbing product. The amount of extractables can be controlled by, for example, the internal crosslinking agents described above.

(e) Residual Monomers

In the particulate water absorbent resin according to the present invention, the amount of residual monomers may be controlled to be 0 to 500 ppm, preferably 0 to 400 ppm, and more preferably 0 to 300 ppm, from the viewpoint of safety.

(f) Free Swell Rate (FSR)

The free swell rate (FSR) by 1 g of the water absorbent resin against 20 g of a saline solution may preferably be not lower than 0.1 [g/g/sec], more preferably not lower than 0.15 [g/g/sec], still more preferably not lower than 0.20 [g/g/sec], and most preferably not lower than 0.25 [g/g/sec]. The upper limit of the FSR is not particularly limited, but may preferably be not higher than 5.0 [g/g/sec], more preferably not higher than 3.0 [g/g/sec]. The measurement method of the FSR is defined in the pamphlet of WO 2009/016055.

If the FSR is lower than 0.05 [g/g/sec], there is a fear that when, for example, the particulate water absorbent resin is used in a water-absorbing product, a liquid cannot be sufficiently absorbed, leading to a leakage of the liquid. The FSR can be controlled by, for example, the particle size control or the foaming polymerization, which have been described above.

(g) Particle Size

The particle size is in the range described above.

(h) Other Additives

Further, depending on the intended function, the following may be added, in order to provide various functions, in an amount of 0% to 3% by mass, preferably 0% to 1% by mass: surfactants, phosphorus atom-containing compounds, oxidizing agents, organic reducing agents, water-soluble inorganic or organic powder such as silica and metallic soap, deodorants, antimicrobial agents, pulp, and thermoplastic fibers. In this connection, as the surfactant, there can preferably be exemplified the surfactants disclosed in the pamphlet of WO 2005/075070.

(i) Moisture Content

The moisture content of the water absorbent resin may be not higher than 10% by mass, preferably higher than 0% by mass and not higher than 10% by mass, more preferably 1% to 10% by mass, still more preferably 2% to 8% by mass, still more preferably 2% to 7% by mass, even still more preferably 2% to 6% by mass, and particularly preferably 2% to 5% by mass. If the moisture content is out of this range, the water absorbent resin becomes poor in powder properties (flowability, transportability, damage resistance).

(j) Initial Color

The particulate water absorbent resin according to the present invention is suitable for use in hygiene materials such as disposable diapers, and may preferably be white powder. The particulate water absorbent resin according to the present invention may preferably exhibit an "L" (Lightness) value of at least 88, preferably not smaller than 89, and more preferably not smaller than 90, in a Hunter Lab colorimetric system measurement by means of a spectral color difference meter after the production of the water absorbent resin. The upper limit of the "L" value may usually be 100. If the "L" value is not lower than 88, a problem about color does not arise in products such as hygiene materials. In addition, the "b" value may be 0 to 12, preferably 0 to 10, and more preferably 0 to 9, and the "a" value may be −3 to 3, preferably −2 to 2, and more preferably −1 to 1.

In this connection, the initial color means a color of the particulate water-absorbing agent after production, and is generally a color measured before shipment from factory. In addition, the initial color may mean a color measured within a year after production in the case where, for example, the particulate water-absorbing agent is stored under an atmosphere at a temperature of not higher than 30° C. and at a relative humidity of 50% RH.

(k) Coloring Over Time

The particulate water absorbent resin according to the present invention is suitable for use in hygiene materials such as disposable diapers, and may preferably maintain a remarkably clean white state even after a long-term storage under high humidity or high temperature condition.

The state of the water absorbent resin after a long-time storage can be examined by carrying out a long-term storage color stability accelerating test, that is, by exposing the particulate water absorbent resin to the atmosphere at a temperature of 70° C.±1° C. and at a relative humidity of 65% RH±1% RH for seven days, and then measuring the "L" value (Lightness) in a Hunter Lab colorimetric system of the water absorbent resin by means of a spectral color difference meter.

The water absorbent resin according to the present invention may preferably exhibit an "L" (Lightness) value of at least 80, preferably not smaller than 81, more preferably not smaller than 82, and particularly preferably not smaller than 83, in a Hunter Lab colorimetric system measurement by means of a spectral color difference meter after the water absorbent resin has been subjected to the long-term storage color stability accelerating test. In this connection, the upper limit of the "L" value may usually be 100, and if the "L" value is not smaller than 80 after the accelerating test, this means that no substantial problem will arise even when the water absorbent resin is stored for a long period of time under a high humidity or a high temperature. In addition, the "b" value may be 0 to 15, preferably 0 to 12, and more preferably 0 to 10, and the "a" value may be −3 to 3, preferably −2 to 2, and more preferably −1 to 1.

[5] Intended Use

The intended use of the water absorbent resin of the present invention is not particularly limited, but may preferably be used in absorbent articles such as paper diapers, sanitary napkins, and incontinence pads. The water absorbent resin exhibits particularly excellent performance, when used in high-concentration diapers (the water absorbent resin is used in larger quantity per diaper) that have heretofore caused a problem about odor and coloring derived from raw materials, and particularly when used in the upper layer parts of absorbent products contained in the absorbent articles.

The content (core concentration) of the water absorbent resin in the absorbent product that may arbitrarily contain other absorbent materials (e.g., pulp fibers) in the absorbent article may be 30 to 100 mass %, preferably 40 to 100 mass %, more preferably 50 to 100 mass %, still more preferably 60 to 100 mass %, particularly preferably 70 to 100 mass %, and most preferably 75 to 95 mass %, to exhibit the effect of the present invention. For example, when the water absorbent resin of the present invention is used in the above concentration, particularly in the upper layer part of an absorbent product, it becomes possible to provide absorbent articles, of which absorbent products maintain a white state with sanitary impression, in addition to an improvement in the amount of liquid absorption as a whole by the absorbent articles according to efficient liquid distribution achieved by their excellent dispersibility of absorbed liquid such as urine because of their high liquid permeability (liquid permeability under pressure).

EXAMPLES

The present invention will be described below in more detail by reference to Examples and Comparative Examples. However, the present invention is not limited to these Examples, and Examples, which can be obtained by appropriately combining the respective technical means disclosed in different Examples, may be included in the scope of the present invention. In addition, "liter" may be represented as "L", and "% by mass" may be represented as "wt %", for convenience.

In this connection, all the electrical equipments to be used in Examples were used at 200V or 100V, unless otherwise indicated. Further, various physical properties of the water absorbent resin of the present invention, which are described in the claims and Examples, are those which were determined according to the following Measurement Examples under the conditions of a room temperature (20° C. to 25° C.) and a humidity of 50 RH %, unless otherwise indicated.

[Measurement Methods of Physical Properties]

[AAP (Absorbency Against Pressure)]

The measurements were carried out according to ERT442.2-02. In this connection, the measurements in the present invention were carried out by changing the load condition to 4.83 kPa (0.7 psi).

[SFC]

The measurements were carried out according to the SFC test method disclosed in U.S. Pat. No. 5,669,894.

[CRC (Centrifuge Retention Capacity)]

The measurements were carried out according to ERT441.2-02.

[Extractables]

The measurements were carried out according to ERT470.2-02.

[Residual Monomers]

The measurements were conducted in accordance with ERT410.2-02.

[PSD (Particle Size)]

The particle size distribution and the weight-average particle size (D50) were measured by putting samples through standard sieves as described below.

The measurement method of the particle size distribution of water absorbent resins (polymers) was as follows. Under the conditions of room temperature (20° C. to 25° C.) and a humidity of 50 RH %, 10.0 g of a water absorbent resin (polymer) was put into JIS standard sieves (THE IIDA TESTING SIEVE; having a diameter of 8 cm) with pore sizes of 2,000 µm, 1,400 µm, 1,000 µm, 850 µm, 710 µm, 600 µm, 500 µm, 425 µm, 300 µm, 212 µm, 150 µm, and 45 µm, and classification was carried out with a vibrating classifier (IIDA SIEVE SHAKER, TYPE: ES-65, SER. No. 0501) for five minutes.

As disclosed in, for example, U.S. Pat. No. 5,051,259, the weight-average particle size (D50) means a particle size corresponding to a standard sieve with a constant pore size, which is used when 50% by mass of the whole particles is sorted out. The residual percentage (R) was plotted on a log probability paper for each particle size using the particle size distribution of the water absorbent resin, which was obtained by the above measurement method of particle size distribution. From the result, a particle size corresponding to R=50% was read as the weight-average particle size (D50).

[Moisture Content]

First, 1 g of a water absorbent resin (polymer) was thinly spread on an aluminum plate having a diameter of 6 cm, was dried in a windless oven at 180° C. for 3 hours, and then weighed. The weights before and after the drying were substituted into the following formula 1 to determine the moisture content (% by mass). In this connection, the solid content (% by mass) is defined as (100—moisture content) (% by mass). In this connection, the solid contents of cationic polymers were also obtained by the same measurement and calculation as those for the solid contents of water absorbent resins.

Moisture content={(weight before drying)−(weight after drying)}/(weight before drying)×100 [Mathematical Formula 4]

[Color]

(a) Initial Color

The measurements were carried out using a spectral color difference meter, SZ-Σ80 COLOR MEASURING SYSTEM, available from NIPPON DENSHOKU INDUSTRIES CO., LTD. The conditions set for measurements were as follows. Reflection measurement was selected, a powder/paste container having an inner diameter of 30 mm and a height of 12 mm, which was attached to the spectral color difference meter, was used, a powder/paste standard circular white plate No. 2 was used as a standard, and a lighting pipe of 30Φ was used. The attached powder/paste container was charged with about 5 g of a water absorbent resin.

(b) Color Over Time

The colors of water absorbent resins were measured by the method described above in (a) after the water absorbent resins were left under high temperature and high humidity (left for seven days at 70° C. and 65% RH).

Example 1-1

When the water content in acrylic acid (AA1-1) purified with a crystallization method was measured by a Karl Fischer method moisture meter (available from Mitsubishi Chemical Analytech Co., Ltd., type KF-200), the result was 64 ppm. The acrylic acid was stored in a circulation-type tank at normal temperature for one week. In this connection, the filling rate of the tank was 75% by volume at this time.

A solution was prepared by mixing 35.2 parts by mass of the acrylic acid (AA1-1), in which the p-methoxyphenol content was adjusted to 70 ppm and the water content was 64 ppm; 29.4 parts by mass of a 48% by mass aqueous solution of sodium hydroxide; 0.23 parts by mass of polyethylene glycol diacrylate (an average number of n was 9); 0.22 parts by mass of a 1% by mass aqueous solution of trisodium diethylenetriamine pentaacetate (abbreviated as DTPA.3Na); and 33.6 parts by mass of deionized water. Then, 1.38 parts by mass of a 4% by mass aqueous solution of sodium persulfate was added to the prepared solution, followed by polymerization. The temperature of the aqueous monomer solution was 95° C. when the sodium persulfate was added. The polymerization rapidly proceeded, and then a water-containing gel-like crosslinked polymer (1-1) was obtained.

Subsequently, the water-containing gel-like crosslinked polymer (1-1) was pulverized into about 1 to 2 mm by a cutter mill (available from YOSHIKOH CORPORATION, type RC250). The pulverized gel was dried by a through-flow dryer (Satake Chemical Equipment Mfg., Ltd, type 71-S6) at 180° C. for 20 minutes to obtain a dried polymer (1-1). The obtained dried polymer (1-1) was pulverized by a roll mill, and then classified by a low-tap shaker, to obtain a water absorbent resin powder (1-1) having a particle size of not smaller than 150 μm and smaller than 850 μm.

A surface-crosslinking agent including a mixed liquid of 0.5 parts by mass of 1,4-butanediol and 3.0 parts by mass of water was added to 100 parts by mass of the obtained water absorbent resin powder (1-1), and then heating treatment was carried out using the through-flow dryer (type 71-S6, Satake Chemical Equipment Mfg., Ltd) at 200° C. for 60 minutes. Subsequently, the resulting product was put through a sieve having a pore size of 850 μm to obtain a surface-crosslinked particulate water absorbent resin (SAP 1-1). The particulate water absorbent resin (SAP 1-1) had a CRC of 26.2 [g/g]. The initial color and the color over time of the particulate water absorbent resin (SAP 1-1) are shown in Table 1.

Example 1-2

A surface-crosslinked particulate water absorbent resin (SAP 1-2) was obtained by the same operations as described in Example 1-1, except that acrylic acid (AA 1-2) was used in which the water content was adjusted to 291 ppm by adding water to the acrylic acid (AA 1-1) in Example 1-1. The initial color and the color over time of the obtained particulate water absorbent resin (SAP 1-2) are shown in Table 1.

Example 1-3

A surface-crosslinked particulate water absorbent resin (SAP 1-3) was obtained by the same operations as described in Example 1-1, except that acrylic acid (AA 1-3) was used in which the water content was adjusted to 594 ppm by adding water to the acrylic acid (AA 1-1) in Example 1-1. The initial color and the color over time of the obtained particulate water absorbent resin (SAP 1-3) are shown in Table 1.

Example 1-4

A surface-crosslinked particulate water absorbent resin (SAP 1-4) was obtained by the same operations as described in Example 1-1, except that acrylic acid (AA 1-4) was used in which the water content was adjusted to 966 ppm by adding water to the acrylic acid (AA 1-1) in Example 1-1. The initial color and the color over time of the obtained particulate water absorbent resin (SAP 1-4) are shown in Table 1.

Comparative Example 1-1

A surface-crosslinked particulate water absorbent resin (Comparative SAP 1-1) was obtained by the same operations as described in Example 1-1, except that acrylic acid (Comparative AA 1-1) was used in which the water content was adjusted to 6,794 ppm by adding water to the acrylic acid (AA 1-1) in Example 1-1. The initial color and the color over time of the obtained particulate water absorbent resin (Comparative SAP 1-1) are shown in Table 1.

Example 1-5

A surface-crosslinked particulate water absorbent resin (SAP 1-5) was obtained by the same operations as described in Example 1-2, except that acrylic acid (AA 1-5) having the same water content (291 ppm) as described in Example 1-2 was obtained by changing the conditions of the crystallization method. The initial color and the color over time of the obtained particulate water absorbent resin (SAP 1-5) are shown in Table 1.

Comparative Example 1-2

A surface-crosslinked comparative particulate water absorbent resin (Comparative SAP 1-2) was obtained by the same operations as described in Example 1-1, except that, according to Examples in the pamphlet of WO 02/085959, a 80% by mass aqueous solution of acrylic acid was used, and the amount of deionized water was adjusted such that the concentration of acrylic acid in the aqueous monomer solution was the same as described in Example 1-1. The initial color and the color over time of the obtained comparative particulate water absorbent resin (Comparative SAP 1-2) are shown in Table 1.

Comparative Example 1-3

A surface-crosslinked comparative particulate water absorbent resin (Comparative SAP 1-3) was obtained by the same operations as described in Example 1-1, except that, according to Comparative Examples in U.S. Pat. No. 4,507,438, acrylic acid having a purity of 99.8% by mass was used, and the amount of deionized water was finely adjusted such that the concentration of acrylic acid in the aqueous monomer solution was the same as described in Example 1-1. The initial color and the color over time of the obtained comparative particulate water absorbent resin (Comparative SAP 1-3) are shown in Table 1.

Comparative Example 1-4

The same operations as described in Example 1-1 were attempted without adding p-methoxyphenol to the acrylic acid (AA1-1) purified by the crystallization method in Example 1-1, a water absorbent resin was not able to be obtained because the acrylic acid was polymerized in the step of storing the acrylic acid.

Example 1-6

An apparatus having the structure shown in FIG. 2 was prepared. The apparatus has a neutralization tank having a volume of 300 L. Acrylic acid having a water content of 64 ppm and an aqueous solution of sodium hydroxide having a concentration of 19.6% by mass were continuously supplied to the neutralization tank, and were circulated in the first loop and the second loop, thereby obtaining a mixed liquid. The supply amounts per unit time were as follows.

Aqueous solution of acrylic acid: 164.5 [kg/hr]
Aqueous solution of sodium hydroxide: 118.5 [kg/hr]

In this connection, the supply amounts may vary, in which case the supply amounts are calculated by dividing the total amounts of the liquids supplied during the operation of the neutralization system by the operation time.

In the mixed liquid in the neutralization tank, the monomer concentration was 62.7% by mass, and the degree of neutralization was 25.5 mol %. The mixed liquid was supplied from the neutralization system to the polymerization system. The aqueous solution of sodium hydroxide and 0.05 mol % of polyethylene glycol diacrylate which is an internal crosslinking agent were added to the mixed liquid in the line mixer. A polymerization initiator was further mixed into the mixed liquid, and the mixed liquid was transported to the polymerization apparatus. In the mixed liquid immediately before introduction to the polymerization apparatus, the monomer concentration was 54.4% by mass, the degree of neutralization was 70.0 mol %, and the temperature was 97° C. The mixed liquid was continuously introduced to the belt-type polymerization apparatus. The temperature of the endless belt of the polymerization apparatus was 60° C. to 70° C. The mixed liquid was heated and irradiated with ultraviolet rays in the polymerization apparatus to obtain a water-containing gel-like crosslinked polymer (1-6). The water-containing gel-like crosslinked polymer (1-6) was dried, and then pulverized to obtain a water absorbent resin powder (1-6).

The obtained water absorbent resin powder (1-6) was sprayed with a mixed liquid of 1,4-butanediol, propylene glycol, and water, and then the surface of the water absorbent resin powder (1-6) was crosslinked to obtain a surface-crosslinked particulate water absorbent resin (SAP 1-6). The initial color and X1 of the obtained particulate water absorbent resin (SAP 1-6) are shown in Table 2. In this connection, in the production method of Example 1-6, the amount V1 of the liquid present in the neutralization system was 350 kg, the flow rate F1 of the liquid supplied from the neutralization system to the polymerization system per unit time

TABLE 1

| | Water content [ppm] | Initial color (before accelerating test) | | | Color over time (after accelerating test) | | | Coloring deterioration rate | |
|---|---|---|---|---|---|---|---|---|---|
| | | L | a | b | L | a | b | ΔL | Δb |
| Example 1-1 | 64 | 90.9 | −0.6 | 4.3 | 68.5 | 3.6 | 14.9 | −22.4 | −10.6 |
| Example 1-2 | 291 | 90.8 | −0.6 | 4.2 | 68.1 | 3.6 | 15.1 | −22.7 | −10.9 |
| Example 1-3 | 594 | 90.8 | −0.6 | 4.3 | 67.6 | 3.7 | 15.3 | −23.2 | −11.0 |
| Example 1-4 | 966 | 90.7 | −0.7 | 4.4 | 67.4 | 3.8 | 15.5 | −23.3 | −11.1 |
| Example 1-5 | 291 | 90.8 | −0.6 | 4.2 | 68.1 | 3.6 | 15.1 | −22.7 | −10.9 |
| Comparative Example 1-1 | 6,794 | 90.7 | −0.7 | 4.4 | 67.1 | 4.0 | 15.6 | −23.6 | −11.2 |
| Comparative Example 1-2 | 198,270 | 90.5 | −0.4 | 4.5 | 65.8 | 4.7 | 16.0 | −24.7 | −11.5 |
| Comparative Example 1-3 | 2,051 | 90.8 | −0.6 | 4.4 | 67.2 | 4.0 | 15.6 | −23.6 | −11.2 | was 283 [kg/hr], and the contact area A1 between the liquid present in the neutralization system and the neutralization system was 16.3 m², and therefore, the X1 is 20.

Example 1-7

A water-containing gel-like crosslinked polymer (1-7) was obtained in the same manner as described in Example 1-6, except that the supply amounts of the respective aqueous solutions per unit time were set as described below, and the flow rate F2 was set to 21.9 [kg/hr]. The water-containing gel-like crosslinked polymer (1-7) was subjected to the same drying treatment, pulverizing treatment, and surface-crosslinking treatment as those of Example 1-6, thereby obtaining a particulate water absorbent resin (SAP 1-7). The initial color and X1 of the obtained water absorbent resin (SAP 1-7) are shown in Table 2.
Acrylic acid: 12.7 [kg/hr]
Aqueous solution of sodium hydroxide: 9.2 [kg/hr]
In this connection, in the production method of Example 1-7, the amount V1 of the liquid present in the neutralization system was 350 kg, the flow rate F1 of the liquid supplied from the neutralization system to the polymerization system per unit time was 21.9 [kg/hr], and the contact area A1 between the liquid present in the neutralization system and the neutralization system was 16.3 m², and therefore, the X1 is 260.

Example 1-8

An apparatus having the structure shown in FIG. 2 was prepared. The apparatus has a neutralization tank having a volume of 4000 L. Acrylic acid having a water content of 64 ppm and an aqueous solution of sodium hydroxide having a concentration of 14.4% by mass were continuously supplied to the neutralization tank, and were circulated in the first loop and the second loop, thereby obtaining a mixed liquid. The supply amounts per unit time were as follows.
Acrylic acid: 3,038.5 [kg/hr]
Aqueous solution of sodium hydroxide: 4,317.5 [kg/hr]
In this connection, the supply amounts may vary, in which case the supply amounts are calculated by dividing the total amounts of the liquids supplied during the operation of the neutralization system by the operation time.

In the mixed liquid in the neutralization tank, the monomer concentration was 45.9% by mass, and the degree of neutralization was 36.8 mol %. The mixed liquid was supplied from the neutralization system to the polymerization system. The aqueous solution of sodium hydroxide and an internal crosslinking agent were added to the mixed liquid in the line mixer. A polymerization initiator was further mixed into the mixed liquid, and the mixed liquid was transported to the polymerization apparatus. In the mixed liquid immediately before introduction to the polymerization apparatus, the monomer concentration was 43.1% by mass, the degree of neutralization was 73.0 mol %, and the temperature was 93° C. The mixed liquid was continuously introduced to the belt-type polymerization apparatus. The temperature of the endless belt of the polymerization apparatus was 60° C. to 70° C. The mixed liquid was heated and irradiated with ultraviolet rays in the polymerization apparatus to obtain a water-containing gel-like crosslinked polymer (1-8). The water-containing gel-like crosslinked polymer (1-8) was subjected to the same drying treatment, pulverizing treatment, and surface-crosslinking treatment as those of Example 1-6, thereby obtaining a particulate water absorbent resin (SAP 1-8). The initial color and X1 of the obtained water absorbent resin (SAP 1-8) are shown in Table 2. In this connection, in the production method of Example 1-8, the amount V1 of the liquid present in the neutralization system was 3,680 kg, the flow rate F1 of the liquid supplied from the neutralization system to the polymerization system per unit time was 7,356 [kg/hr], and the contact area between the liquid present in the neutralization system and the neutralization system was 122 m².

Example 1-9

An apparatus having the structure shown in FIG. 1 was prepared. The apparatus has a neutralization tank having a volume of 4,000 L. Acrylic acid having a water content of 67 ppm and an aqueous solution of sodium hydroxide having a concentration of 14.2% by mass were continuously supplied to the neutralization tank, and were circulated in the first loop, thereby obtaining a mixed liquid. The supply amounts per unit time were as follows.
Acrylic acid: 895 [kg/hr]
Aqueous solution of sodium hydroxide: 1,272 [kg/hr]
In this connection, the supply amounts may vary, in which case the supply amounts are calculated by dividing the total amounts of the liquids supplied during the operation of the neutralization system by the operation time.

In the mixed liquid in the neutralization tank, the monomer concentration was 45.9% by mass, and the degree of neutralization was 36.8 mol %. The mixed liquid was supplied from the neutralization system to the polymerization system. The aqueous solution of sodium hydroxide and polyethylene glycol acrylate which is an internal crosslinking agent were added to the mixed liquid in the line mixer. A polymerization initiator was further mixed into the mixed liquid, and the mixed liquid was transported to the polymerization apparatus. In the mixed liquid immediately before introduction to the polymerization apparatus, the monomer concentration was 43.1% by mass, the degree of neutralization was 73.0 mol %, and the temperature was 93° C. The mixed liquid was continuously introduced to the belt-type polymerization apparatus. The temperature of the endless belt of the polymerization apparatus was 60° C. to 70° C. The mixed liquid was heated and irradiated with ultraviolet rays in the polymerization apparatus to obtain a water-containing gel-like crosslinked polymer (1-9). The water-containing gel-like crosslinked polymer (1-9) was dried, and then pulverized to obtain a water absorbent resin powder (1-9).

The obtained water absorbent resin powder (1-9) was sprayed with a mixed liquid of 1,4-butanediol, propylene glycol, and water, and then the surface of the water absorbent resin powder (1-9) was crosslinked to obtain a surface-crosslinked particulate water absorbent resin (SAP 1-9). The initial color and X1 of the obtained particulate water absorbent resin (SAP 1-9) are shown in Table 2. In this connection, in the production method of Example 1-9, the amount V of the liquid present in the neutralization system was 3,620 kg, the flow rate F of the liquid supplied from the neutralization system to the polymerization system per unit time was 2,167 [kg/hr], and the contact area between the liquid present in the neutralization system and the neutralization system was 113 m².

TABLE 2

|  | Water content [ppm] | X1 | Initial color WB |
| --- | --- | --- | --- |
| Example 1-6 | 64 | 20 | 91 |
| Example 1-7 | 64 | 260 | 65 |
| Example 1-8 | 64 | 61 | 86 |
| Example 1-9 | 67 | 189 | 68 |

(Conclusion)

As shown in Tables 1 and 2, the water absorbent resins obtained by the production methods of Examples (Case 1) have higher whiteness than the water-containing gel-like crosslinked polymers obtained by the production methods of Comparative Examples. This evaluation result clearly shows the superiority of the invention in case 1. In addition, it can be understood that the water content in acrylic acid has an influence on coloring.

Example 2-1

Methoquinone was added as an inhibitor to purified acrylic acid derived from petroleum. Crystallization was repeated to adjust the formic acid content to N.D. (the detection limit was 0.1 ppm) and the water content to 64 ppm, and then the methoquinone content was adjusted to 70 ppm. By mixing 0.0012 g of formic acid into 99.68 g of the acrylic acid containing no formic acid, acrylic acid having a formic acid content of about 12 ppm was prepared.

Subsequently, an aqueous monomer solution was prepared by mixing 99.68 g of the acrylic acid having a formic acid content of about 12 ppm; 85.57 g of 48.5% by mass sodium hydroxide; 154.91 g of pure water; and 3.61 g of 10% by mass polyethylene glycol diacrylate (n=9). In this connection, the iron content (calculated as the $Fe_2O_3$ content) of the sodium hydroxide was 3 ppm (as the measurement value). In this case, formic acid was contained at 10 ppm, relative to the monomer. The aqueous monomer solution was degassed with nitrogen. Thereafter, 5.533 g of 3% by mass sodium persulfate was added, and then 0.69 g of 1% by mass L-ascorbic acid was added, followed by polymerization, to obtain a water-containing gel-like crosslinked polymer (2-1).

The obtained water-containing gel-like crosslinked polymer (2-1) was subjected to gel pulverization using a meat chopper (available from Hiraga Kosakusho Co., Ltd.), and dried at 170° C. for 20 minutes by a through-flow static dryer (trade name "Through-flow Batch-type Dryer 71-S6", available from Satake Chemical Equipment Mfg., Ltd).

The obtained dried product was pulverized by a roll mill, and classification was carried out with standard sieves having pore sizes of 850 μm and 150 μm, to obtain a water absorbent resin powder (SAP 2-1).

The long-term storage color stability accelerating test was carried out for the water absorbent resin powder (SAP 2-1). The results are shown in Table 3, together with the physical properties of the water absorbent resin powder (SAP 2-1).

Example 2-2

A water absorbent resin powder (SAP 2-2) was obtained by the same operations as described in Example 2-1, except that the amount of formic acid to be added was 0.012 g (about 120 ppm, relative to acrylic acid; about 100 ppm, relative to the monomer). The long-term storage color stability accelerating test was carried out for the water absorbent resin powder (SAP 2-2). The results are shown in Table 3, together with the physical properties of the water absorbent resin powder (SAP 2-2).

Example 2-3

A water absorbent resin powder (SAP 2-3) was obtained by the same operations as described in Example 2-1, except that the amount of formic acid to be added was 0.06 g (about 600 ppm, relative to acrylic acid; about 500 ppm, relative to the monomer). The long-term storage color stability accelerating test was carried out for the water absorbent resin powder (SAP 2-3). The results are shown in Table 3, together with the physical properties of the water absorbent resin powder (SAP 2-3).

Comparative Example 2-1

A comparative water absorbent resin powder (Comparative SAP 2-1) was obtained by the same operations as described in Example 2-1, except that no formic acid was added.

The long-term storage color stability accelerating test was carried out for the comparative water absorbent resin powder (Comparative SAP 2-1). The results are shown in Table 3, together with the physical properties of the comparative water absorbent resin powder (Comparative SAP 2-1).

Example 2-4

In 100 parts by mass of the comparative water absorbent resin (Comparative SAP 2-1) in Comparative Example 2-1, 3 parts by mass of a 30% by mass aqueous solution of ethylene carbonate was mixed, and the mixture was heated at 200° C. for 30 minutes. Further, a formulated liquid was added to the mixture, in which formulated liquid aluminum sulfate 14-18 hydrate/sodium lactate/formic acid=0.9 parts by mass/0.1 parts by mass/0.01 parts by mass, relative to 100 parts by mass of the comparative water absorbent resin powder (Comparative SAP 2-1). In this manner, a water absorbent resin powder (SAP 2-4) was obtained.

The long-term storage color stability accelerating test was carried out for the water absorbent resin powder (SAP 2-4). The results are shown in Table 3, together with the physical properties of the water absorbent resin powder (SAP 2-4).

Comparative Example 2-2

A comparative water absorbent resin powder (Comparative SAP 2-2) was obtained by the same operations as described in Example 2-4, except that no formic acid was added.

The long-term storage color stability accelerating test was carried out for the comparative water absorbent resin powder (Comparative SAP 2-2). The results are shown in Table 3, together with the physical properties of the comparative water absorbent resin powder (Comparative SAP 2-2).

Example 2-5

A water absorbent resin powder (SAP 2-5) was obtained by the same operations as described in Comparative Example 2-1, except that acrylic acid derived from plants was used instead of acrylic acid derived from petroleum. In this connection, the acrylic acid was obtained from vegetable oils through glycerin. The acrylic acid was purified by a distillation method. The acrylic acid contained 10 ppm of formic acid. In addition, the aqueous monomer solution contained formic acid in an amount of 8 ppm, relative to the monomer.

The long-term storage color stability accelerating test was carried out for the water absorbent resin powder (SAP 2-5). The results are shown in Table 3, together with the physical properties of the water absorbent resin powder (SAP 2-5).

Comparative Example 2-3

A comparative water absorbent resin powder (Comparative SAP 2-3) was obtained using, in Example 2-2, 100 ppm of acetic acid exemplified in Patent Documents 20 to 23.

The long-term storage color stability accelerating test was carried out for the comparative water absorbent resin powder (Comparative SAP 2-3). The results are shown in Table 3, together with the physical properties of the comparative water absorbent resin powder (Comparative SAP 2-3).

Comparative Example 2-4

A comparative water absorbent resin powder (Comparative SAP 2-4) was obtained using, in Example 2-2, 100 ppm of propionic acid exemplified in Patent Documents 20 to 23, instead of formic acid.

The long-term storage color stability accelerating test was carried out for the comparative water absorbent resin powder (Comparative SAP 2-4). The results are shown in Table 3, together with the physical properties of the comparative water absorbent resin powder (Comparative SAP 2-4).

Comparative Example 2-5

A comparative water absorbent resin powder (Comparative SAP 2-5) was obtained using, in Example 2-2, 100 ppm of butyric acid exemplified in Patent Documents 20 to 23, instead of formic acid.

The long-term storage color stability accelerating test was carried out for the comparative water absorbent resin powder (Comparative SAP 2-5). The results are shown in Table 3, together with the physical properties of the comparative water absorbent resin powder (Comparative SAP 2-5).

Comparative Example 2-6

A comparative water absorbent resin powder (Comparative SAP 2-6) was obtained using, in Example 2-2, 100 ppm of benzoic acid preferably exemplified in Patent Documents 20 to 23.

The long-term storage color stability accelerating test was carried out for the comparative water absorbent resin powder (Comparative SAP 2-6). The results are shown in Table 3, together with the physical properties of the comparative water absorbent resin powder (Comparative SAP 2-6).

Comparative Example 2-7

A comparative water absorbent resin powder (Comparative SAP 2-7) was obtained using, in Example 2-3, 1,000 ppm of benzoic acid preferably exemplified in Patent Documents 20 to 23.

The long-term storage color stability accelerating test was carried out for the comparative water absorbent resin powder (Comparative SAP 2-7). The results are shown in Table 3, together with the physical properties of the comparative water absorbent resin powder (Comparative SAP 2-7).

Comparative Example 2-8

A comparative water absorbent resin powder (comparative SAP 2-8) was obtained using, in Example 2-1, the formic acid content described in Example 1 of Patent Document 46 (U.S. Pat. No. 4,698,404).

The long-term storage color stability accelerating test was carried out for the comparative water absorbent resin powder (Comparative SAP 2-8). The results are shown in Table 3, together with the physical properties of the comparative water absorbent resin powder (Comparative SAP 2-8).

Comparative Example 2-9

A comparative water absorbent resin powder (Comparative SAP 2-9) was obtained by adding 100 ppm of aluminum lactate according to Patent Documents 50 to 52 (the pamphlets of WO 2008/092842, WO 2008/092843, and WO 2007/121937).

The long-term storage color stability accelerating test was carried out for the comparative water absorbent resin powder (Comparative SAP 2-9). The results are shown in Table 3, together with the physical properties of the comparative water absorbent resin powder (Comparative SAP 2-9).

Comparative Example 2-10

According to Patent Document 6 that discloses a technique of preventing coloring over time by reducing pH to not higher than 5.5, a comparative water absorbent resin powder (Comparative SAP 2-10) was obtained by adding, in Comparative Example 2-1, formic acid as an acid used for the intended purpose, in an amount of 5% by mass, relative to the monomer. In this connection, the water-containing gel-like crosslinked polymer obtained after polymerization had adhesive properties.

The long-term storage color stability accelerating test was carried out for the comparative water absorbent resin powder (Comparative SAP 2-10). The results are shown in Table 3, together with the physical properties of the comparative water absorbent resin powder (Comparative SAP 2-10).

Example 2-6

A water absorbent resin powder (SAP 2-6) was obtained using, in Example 2-1, sodium hydroxide having a Fe content of 10 ppm, relative to NaOH.

The long-term storage color stability accelerating test was carried out for the comparative water absorbent resin powder (SAP 2-6). The results are shown in Table 3, together with the physical properties of the comparative water absorbent resin powder (SAP 2-6).

Example 2-7

A water absorbent resin powder (SAP 2-7) was obtained by adding, in Example 2-1, an organic solvent (toluene) inert to polymerization, which is disclosed in Patent Document 53, in an amount of 100 ppm, relative to acrylic acid, and carrying out polymerization in the same manner as described in Example 2-1.

The long-term storage color stability accelerating test was carried out for the comparative water absorbent resin powder (SAP 2-7). The results are shown in Table 3, together with the physical properties of the comparative water absorbent resin powder (SAP 2-7).

Example 2-8

A water absorbent resin powder (SAP 2-8) was obtained by adding, in Example 2-1, an organic solvent (diphenyl ether) inert to polymerization, which is disclosed in Patent Document 53, in an amount of 10 ppm, relative to acrylic acid, and carrying out polymerization in the same manner as described in Example 2-1.

The long-term storage color stability accelerating test was carried out for the comparative water absorbent resin powder (SAP 2-8). The results are shown in Table 3, together with the physical properties of the comparative water absorbent resin powder (SAP 2-8).

The acrylic acid (3-2) (formic acid 370 ppm (relative to acrylic acid)), the 48.5% by mass aqueous solution of sodium hydroxide, and ion-exchanged water, were mixed while being cooled, to prepare 5,500 parts by mass of an aqueous solution of sodium acrylate (having a monomer concentration of 37.2% by mass), in which the degree of neutralization was 75 mol %. The formic acid content was 300 ppm (relative to monomer), and the Fe content was about 0.24 ppm (relative to monomer), in the monomer after the neutralization.

An amount of 5,500 parts by mass of the aqueous solution of sodium acrylate (having a monomer concentration of 37.2% by mass), in which the degree of neutralization was

TABLE 3

| | Formic acid in aqueous monomer solution (relative to monomer) | Formic acid in water absorbent resin | CRC | Extractables | Coloring over time (70° C., 65% humidity, and 7 days) | | |
|---|---|---|---|---|---|---|---|
| | [ppm] | [ppm] | [g/g] | [wt %] | L | a | b |
| Example 2-1 | 10 | 6 | 38 | 18 | 66 | 3.3 | 14 |
| Example 2-2 | 100 | 67 | 39 | 18 | 68 | 2.9 | 14 |
| Example 2-3 | 500 | 346 | 39 | 18 | 67 | 3.0 | 14 |
| Comparative Example 2-1 | N.D. | N.D. | 38 | 18 | 63 | 3.5 | 14 |
| Example 2-4 | N.D. | 98 | 30 | — | 63 | 3.5 | 14 |
| Comparative Example 2-2 | N.D. | N.D. | 30 | — | 60 | 3.7 | 15 |
| Example 2-5 | 8 | 5 | 39 | 20 | 65 | 3.3 | 14 |
| Comparative Example 2-3 | N.D. | N.D. | 38 | 18 | 63 | 3.6 | 14 |
| Comparative Example 2-4 | N.D. | N.D. | 38 | 18 | 64 | 3.6 | 14 |
| Comparative Example 2-5 | N.D. | N.D. | 38 | 18 | 63 | 3.5 | 14 |
| Comparative Example 2-6 | N.D. | N.D. | 38 | 18 | 63 | 3.6 | 14 |
| Comparative Example 2-7 | N.D. | N.D. | 38 | 18 | 63 | 3.5 | 14 |
| Comparative Example 2-8 | 1,040 | 597 | 40 | 21 | 68 | 2.9 | 14 |
| Comparative Example 2-9 | N.D. | N.D. | 30 | — | 61 | 3.7 | 14 |
| Comparative Example 2-10 | 50,000 | 39,000 | 45 | 33 | 69 | 2.4 | 13 |
| Example 2-6 | 10 | 6 | 38 | 18 | 63 | 3.7 | 14 |
| Example 2-7 | 10 | 6 | 38 | 18 | 66 | 3.3 | 14 |
| Example 2-8 | 10 | 6 | 38 | 18 | 66 | 3.4 | 14 |

(Conclusion)

As shown in Table 3, the water absorbent resins obtained by the production methods of Examples (Case 2) have higher whiteness that the water absorbent resins obtained by the production methods of Comparative Examples. This evaluation result clearly shows the superiority of the invention in case 2.

Example 3-1

First, p-methoxyphenol was added as a polymerization inhibitor to purified acrylic acid derived from petroleum, and crystallization was carried out two or times to adjust the formic acid content to N.D. (the detection limit was 0.1 ppm) and adjust the water content to 64 ppm (as measured by the Karl Fischer method), and then the p-methoxyphenol content was adjusted to 70 ppm (acrylic acid (3-1)). Acrylic acid containing formic acid was prepared (acrylic acid (3-2)) by mixing 0.037 parts by mass of formic acid in 100 parts by mass of acrylic acid (3-1) containing no formic acid.

A 48.5% by mass aqueous solution of sodium hydroxide was prepared, which contains iron in an amount of 0.70 ppm (1 ppm as the $Fe_2O_3$ content), relative to sodium hydroxide.

75 mol %, and 0.10 mol % (relative to monomer) of polyethylene glycol diacrylate (the average addition mole number "n" of ethylene oxide was 9), were introduced into a reactor formed by attaching a lid to a double-arm kneader made of stainless steel, which was equipped with a jacket having an inner volume of 10 liters and having two sigma-shaped blades, and dissolution was carried out to prepare a reaction liquid. Then, the reaction liquid was degassed under an atmosphere of nitrogen gas for 30 minutes. Subsequently, 27.7 g of a 10% by mass aqueous solution of sodium persulfate, and 2.31 g of a 1% by mass aqueous solution of L-ascorbic acid, were added separately to the reaction liquid, while agitating the reaction liquid. Then, polymerization started after about 20 seconds. In order to prevent deterioration and coloring of a polymer, 20.5 g (200 ppm relative to monomer) of a 2% by mass aqueous solution of pentasodium ethylenediamine tetra(methylene phosphonate) was added as a chelating agent to the reaction system after 3 minutes from the start of polymerization. Thereafter, polymerization was carried out, while pulverizing the produced water-containing gel-like crosslinked polymer (3-1), and the polymerization peak temperature of 95° C. was indicated after 14 minutes. The particulate water-containing gel-like crosslinked polymer (3-1) was taken out after 30 minutes from the start of polymerization. The obtained particulate water-containing gel-like crosslinked polymer (3-1) had a weight-average particle size (D50) of about 1,500 μm and a solid content of 41% by mass.

The water-containing gel-like crosslinked polymer (3-1) was dried at 180° C. for 45 minutes by a through-flow static dryer (trade name "Through-flow Batch-type Dryer 71-S6", available from Satake Chemical Equipment Mfg., Ltd). Subsequently, the obtained dried product was pulverized by a roll mill, and classification and particle size adjustment were carried out by JIS standard sieves having pore sizes of 850 μm and 150 μm, to obtain a dried water absorbent resin powder (3-1) having a weight-average particle size (D50) of 390 μm and containing particles having sizes of smaller than 150 μm in a proportion of 2% by mass, relative to the whole particles.

First, 100 parts by mass of the dried water absorbent resin powder (3-1) was sprayed and mixed with a surface-crosslinking agent including 0.4 parts by mass of 1,4-butanediol, 0.6 parts by mass of propylene glycol, and 3.0 parts by mass of ion-exchanged water. Then, heating treatment was carried out for the mixture at 210° C. for 40 minutes to obtain a surface-crosslinked particulate water absorbent resin (3-1).

A 40% by mass aqueous solution of polyallylamine hydrochloride (having a weight-average molecular weight of about 10,000, available from Nitto Boseki Co., Ltd) was diluted 4 times with ion-exchanged water, and 5 parts by mass of the diluted aqueous solution was added and mixed in 100 parts by mass of the surface-crosslinked particulate water absorbent resin (3-1). Further, the mixture was heated at 90° C. for 1 hour to obtain a particulate water absorbent resin (SAP 3-1). The concentration of formic acid, the water absorption physical properties, and the color over time, of the particulate water absorbent resin (SAP 3-1), are shown in Table 4.

Example 3-2

Formic acid and the cationic polymer were added at the same time as an aqueous solution in Example 3-1. That is, a particulate water absorbent resin (SAP 3-2) was obtained by the same operations as described in Example 3-1, except that the acrylic acid (3-2) containing formic acid, which was used in Example 3-1, was replaced with the acrylic acid (3-1) containing no formic acid, and the polyallylamine hydrochloride was replaced with an aqueous solution of a mixture of a partial hydrolysate (having a solid content of 9% by mass, a weight-average molecular weight of about 40,000, and a degree of hydrolysis of about 50 mol %) of poly(N-vinylformamide) and formic acid.

In this connection, the solid contents in the mixture added to the particulate water absorbent resin (SAP 3-2), that is, the amount of the partial hydrolysate of poly(N-vinylformamide), and the amount of formic acid, were 0.4 parts by mass and 0.103 parts by mass, respectively, relative to 100 parts by mass of the surface-crosslinked water absorbent resin. The concentration of formic acid, the water absorption physical properties, and the color over time, of the particulate water absorbent resin (SAP 3-2), are shown in Table 4.

Example 3-3

A particulate water absorbent resin (SAP 3-3) was obtained by the same operations as described in Example 3-1, except that, after crystallization of acrylic acid, the adjustment of water content was carried out to prepare acrylic acid (3-3) having a water content of 2,000 ppm. The concentration of formic acid, the water absorption physical properties, and the color over time, of the particulate water absorbent resin (SAP 3-3), are shown in Table 4.

Comparative Example 3-1

A comparative particulate water absorbent resin (Comparative SAP 3-1) was obtained by the same operations as described in Example 3-1, except that the acrylic acid (3-1) containing no formic acid was used instead of the acrylic acid (3-2) containing formic acid. The concentration of formic acid, the water absorption physical properties, and the color over time, of the comparative particulate water absorbent resin (Comparative SAP 3-1), are shown in Table 4.

Comparative Example 3-2

A comparative particulate water absorbent resin (Comparative SAP 3-2) was obtained by the same operations as described in Example 3-2, except that an aluminum sulfate formulated liquid was used instead of a partial hydrolysate of poly(N-vinylformamide), by reference to Comparative Example 3 of Patent Document 19. The concentration of formic acid, the water absorption physical properties, and the color over time, of the comparative particulate water absorbent resin (Comparative SAP 3-2), are shown in Table 4.

In this connection, the aluminum sulfate formulated liquid was made of 1.0 parts by mass of a 50% by mass solution of liquid aluminum sulfate for tap water (available from Asakawa Kagaku Kogyo Kabushiki Kaisha), 0.3 parts by mass of a 60% by mass aqueous solution of sodium lactate (available from Musashino Chemical Laboratory, Ltd.), and 0.025 parts by mass of propylene glycol, and the addition amount was 1.26 parts by mass, relative to 100 parts by mass of the surface-crosslinked water absorbent resin. Further, the aluminum sulfate formulated liquid was added to the surface-crosslinked water absorbent resin, followed by heating at 60° C. for 1 hour.

Comparative Example 3-3

In Comparative Example 3-2, by reference to Example 17 of Patent Document 19, the step of adding a 40% by mass aqueous solution of sodium dihydrogen phosphate and heating at 60° C. for 30 minutes was additionally carried out between the surface-crosslinking step and the step of adding the aluminum sulfate formulated liquid. The addition amount was 0.76 parts by mass (0.31 parts by mass as sodium dihydrogen phosphate), relative to 100 parts by mass of the surface-crosslinked water absorbent resin. A comparative particulate water absorbent resin (Comparative SAP 3-2) was obtained by the same operations as described in Comparative Example 3-2, except for the above step. The concentration of formic acid, the water absorption physical properties, and the color over time, of the comparative particulate water absorbent resin (Comparative SAP 3-2), are shown in Table 4.

Comparative Example 3-4

A comparative particulate water absorbent resin (Comparative SAP 3-4) was obtained by the same operations as described in Example 3-1, in which no cationic polymer was added to the surface-crosslinked water absorbent resin. The concentration of formic acid, the water absorption physical properties, and the color over time, of the comparative particulate water absorbent resin (Comparative SAP 3-4), are shown in Table 4.

Comparative Example 3-5

A comparative particulate water absorbent resin (Comparative SAP 3-5) was obtained by the same operations as described in Example 3-1, except that a 48.5% by mass aqueous solution of sodium hydroxide was used, in which the iron content was 10.5 ppm (15 ppm as the $Fe_2O_3$ content), relative to sodium hydroxide. The concentration of formic acid, the water absorption physical properties, and the color over time, of the comparative particulate water absorbent resin (Comparative SAP 3-5), are shown in Table 4.

rials such as disposable diapers, sanitary napkins, and incontinence pads. Further, these water absorbent resins can be used for agricultural materials, civil engineering materials, and the like.

EXPLANATION OF NUMERALS 2, 26 Apparatuses
3 Neutralization tank
4 Pump
6 Heat exchanger
8 Line mixer
10 Polymerization apparatus
12 First piping
14 Second piping
16 Third piping
18 Fourth piping
20 Fifth piping

TABLE 4

| | Fe in basic composition | Formic acid | Additive after surface | Initial color | | | Color over time | | | CRC | SFC [× 10$^{-7}$ · |
|---|---|---|---|---|---|---|---|---|---|---|---|
| | [ppm] | ppm | crosslinking | L | a | b | L | a | b | [g/g] | cm$^3$ · s · g$^{-1}$] |
| Example 3-1 | 0.7 | 240 | Polyallylamine hydrochloride | 90 | −1.6 | 8 | 82 | 1.1 | 15 | 27 | 105 |
| Example 3-2 | 0.7 | 1,030 | Partial hydrolyzate of poly(N-vinyl-formamide) | 90 | −1.5 | 7 | 82 | 1.6 | 10 | 27 | 112 |
| Example 3-3 | 0.7 | 240 | Polyallylamine hydrochloride | 90 | −1.5 | 8 | 82 | 1.2 | 15 | 27 | 105 |
| Comparative Example 3-1 | 0.7 | N.D. | Polyallylamine hydrochloride | 90 | −1.6 | 8 | 79 | 1.4 | 16 | 27 | 106 |
| Comparative Example 3-2 | 0.7 | N.D. | Aluminum sulfate | 90 | −1.5 | 7 | 75 | 3.2 | 10 | 27 | 113 |
| Comparative Example 3-3 | 0.7 | N.D. | Aluminum sulfate + phosphates | 90 | −1.5 | 7 | 79 | 2.2 | 11 | 27 | 112 |
| Comparative Example 3-4 | 0.7 | 240 | None | 91 | −1.5 | 7 | 83 | 1.4 | 9 | 27 | 78 |
| Comparative Example 3-5 | 10.5 | 240 | Polyallylamine hydrochloride | 90 | −1.6 | 8 | 60 | 3.7 | 16 | 27 | 100 |

(Conclusion)

Table 4 shows the physical properties of the water absorbent resin obtained by the productions methods in case 3 of the present invention. From a comparison between Example 3-1 and Comparative Example 3-1, it can be understood that the coloring over time is reduced (an improvement in L, a, and b) by the presence of a prescribed amount of formic acid in a water absorbent resin. In addition, from a comparison between Examples 3-1, 3-2 and Comparative Examples 3-2, 3-3, it can be understood that the SFCs are substantially equal to each other, and the addition of a cationic polymer provides greater effect of an improvement in color over time than the addition of an aluminum sulfate composition. Further, from a comparison between Examples 3-1, 3-2 and Comparative Example 3-4, it can be understood that Comparative Example 3-4 is excellent in color over time, but is insufficient in liquid permeability (SFC) because no liquid permeability improving agent was used. Further, from a comparison between Example 3-1 and Comparative Example 3-5, it can be understood that the Fe content in a basic composition has a great influence on coloring.

INDUSTRIAL APPLICABILITY

Water absorbent resins obtained by the production methods of the present invention are suitable for hygiene mate- 30 Sixth piping
22 Inlet
24 Outlet
32 First loop
34 Second loop

The invention claimed is:
1. A method for producing a polyacrylic acid (salt)-based water absorbent resin, sequentially comprising the steps of:
    storing or producing acrylic acid;
    mixing acrylic acid containing a polymerization inhibitor with water, a crosslinking agent, and a basic composition, and/or neutralizing them, to prepare an aqueous monomer solution;
    polymerizing the aqueous monomer solution by use of a polymerization initiator and/or irradiation with active energy rays;
    drying a water-containing gel-like crosslinked polymer thus obtained; and
    optionally carrying out surface crosslinking,
    wherein the acrylic acid containing the polymerization inhibitor has a water content of less than 80 ppm (by mass, the same applies hereinafter), and the basic composition has an iron content of 0.0007 to 7 ppm, and optionally the aqueous monomer solution has a formic acid content of 1 to 700 ppm, relative to the monomer, and/or the following conditions (2) or (3) are satisfied:

(2) 0.01 to 5 parts by mass of a cationic polymer is mixed in the polymer, relative to 100 parts by mass of the polymer, after the drying step; and (3) 0.0001 to 5 parts by mass of formic acid is allowed to be present and/or mixed in the monomer at the time of polymerization and/or the polymer after the polymerization, relative to 100 parts by mass of the monomer at the time of polymerization and/or the polymer after the polymerization, and wherein the monomer at the time of polymerization has a formic acid content of 0 to 700 ppm, relative to the monomer.

2. The production method according to claim 1, wherein the acrylic acid has a water content of 1 to less than 80 ppm.

3. The production method according to claim 1, wherein the acrylic acid comprises not higher than 180 ppm of methoxyphenol as the polymerization inhibitor.

4. The production method according to claim 1, wherein the acrylic acid is derived from a plant.

5. The production method according to claim 1, further comprising the steps of:

circulating, in a neutralization system including the neutralization tank, a mixed solution containing a salt obtained by neutralization reaction of the acrylic acid with a basic substance; and continuously supplying part of the circulating mixed solution to a polymerization system, wherein value X1 calculated by the following formula 1 is not greater than 300:

$$X1 = (V1/F1) \cdot A1 \qquad \text{(Formula 1)}$$

wherein V1 in kg is an amount of the mixed solution present in the neutralization system, F1 in kg/hr is a flow rate of the mixed solution supplied to the polymerization system, and A1 in m² is a contact area between the mixed solution present in the neutralization system, and devices and pipes constituting the neutralization system.

6. The production method according to claim 1, further comprising the steps of: circulating the acrylic acid in the storage tank; and continuously supplying part of the circulating acrylic acid to the polymerization system, wherein value X2 calculated by the following formula 2 is not greater than 300:

$$X2 = (V2/F2) \cdot A2 \qquad \text{(Formula 2)}$$

wherein V2 in kg is an amount of acrylic acid before the neutralization, F2 in kg/hr is a flow rate of acrylic acid supplied to the neutralization system, and A2 in m² is a contact area between the acrylic acid, and devices and pipes constituting the neutralization system.

7. The production method according to claim 1, wherein the step of producing acrylic acid is connected by a pipeline to the steps of producing a water absorbent resin via the step of storing acrylic acid.

8. The production method according to claim 1, wherein acrylic acid is supplied to the neutralization system within 96 hours after the acrylic acid is purified by crystallization or distillation.

9. The production method according to claim 1, wherein a mixture of a cationic polymer and formic acid is mixed in the polyacrylic acid (salt)-based water absorbent resin, wherein the weight ratio in the mixture between the cationic polymer and the formic acid is in a range of 1:20 to 20:1.

10. The production method according to claim 1, wherein the cationic polymer is polyvinylamine or a salt thereof, or a partial hydrolysate of poly(N-vinylformamide) or a salt thereof.

11. The production method according to claim 1, further comprising the step of adding any of a chelating agent, an inorganic reducing agent, and an α-hydroxycarboxylic acid (salt).

12. The production method according to claim 1, wherein a surfactant and/or water-insoluble inorganic fine particles are further mixed in the polymer.

13. The production method according to claim 1, wherein the aqueous monomer solution has a monomer concentration of 10% to 70% by mass.

14. The production method according to claim 1, wherein continuous production is carried out in a production amount of not smaller than 100 kg/hr.

15. The production method according to claim 1, further comprising the steps of pulverizing and classifying.

16. The production method according to claim 15, further comprising the step of surface crosslinking after the steps of pulverizing and classifying.

17. The production method according to claim 16, wherein a surface-crosslinking agent used in the step of surface crosslinking is at least one compound selected from the group consisting of polyvalent alcohol compounds, epoxy compounds, polyvalent amine compounds or their condensates with haloepoxy compounds, oxazoline compounds, mono-, di-, or poly-oxazolidinone compounds, polyvalent metal salts, alkylene carbonate compounds, oxetane compounds, and cyclic urea compounds.

18. The production method according to claim 1, wherein the polyacrylic acid (salt)-based water absorbent resin obtained has a CRC of not lower than 25 g/g, an AAP of not lower than 20 g/g, and an SFC of not lower than $50 \times 10^{-7} \cdot cm^3 \cdot s \cdot g^{-1}$.

* * * * *